(12) United States Patent
Bali

(10) Patent No.: US 11,190,861 B2
(45) Date of Patent: Nov. 30, 2021

(54) GATEWAY APPARATUS AND METHODS FOR WIRELESS IOT (INTERNET OF THINGS) SERVICES

(71) Applicant: Charter Communications Operating, LLC, St. Louis, MO (US)

(72) Inventor: Ramneek Bali, Frisco, TX (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 16/384,805

(22) Filed: Apr. 15, 2019

(65) Prior Publication Data

US 2019/0349848 A1 Nov. 14, 2019

Related U.S. Application Data

(60) Provisional application No. 62/658,465, filed on Apr. 16, 2018.

(51) Int. Cl.
*H04L 5/00* (2006.01)
*H04Q 11/02* (2006.01)
(Continued)

(52) U.S. Cl.
CPC ............ *H04Q 11/02* (2013.01); *H04J 3/1652* (2013.01); *H04L 5/0007* (2013.01);
(Continued)

(58) Field of Classification Search
CPC .................................................... H04L 5/0007
See application file for complete search history.

(56) References Cited

U.S. PATENT DOCUMENTS 5,742,583 A 4/1998 Scott
6,757,837 B1 6/2004 Platt et al.
(Continued)

FOREIGN PATENT DOCUMENTS

WO WO-2004045125 A2 5/2004

OTHER PUBLICATIONS

3GPP, "3rd Generation Partnership Project; Technical Specification Group Radio Access Network," TS 38.473 (v15.0.0), Dec. 2017, NG-RAN, F1 application protocol (F1AP), Release 15.
(Continued)

*Primary Examiner* — Sulaiman Nooristany
(74) *Attorney, Agent, or Firm* — Gazdzinski & Associates, PC

(57) ABSTRACT

Gateway apparatus and methods for providing data services (including IoT data services) which leverage existing managed network (e.g., cable network) infrastructure. The disclosed methods and apparatus enable, among other things, delivery of IoT data services in a unified manner via a common portal or IoT gateway (IoTG) which may be both remotely accessed by a user, and remotely controlled/configured by the host network operator (e.g., MSO). In one variant, the premises devices include RF-enabled receivers (enhanced consumer premises equipment, or CPEe) configured to receive (and transmit) OFDM waveforms via a coaxial cable drop to the premises, and interface with the aforementioned IoTG to enable provision of both 5G high-speed data services and lower bandwidth IoT services to the premises, all via a single coaxial cable drop in the exemplary embodiment.

19 Claims, 45 Drawing Sheets

(51) Int. Cl.

| | | |
|---|---|---|
| *H04L 12/28* | (2006.01) | |
| *H04L 27/00* | (2006.01) | |
| *H04L 27/26* | (2006.01) | |
| *H04W 16/14* | (2009.01) | |
| *H04W 72/04* | (2009.01) | |
| *H04W 36/08* | (2009.01) | |
| *H04W 80/10* | (2009.01) | |
| *H04J 3/16* | (2006.01) | |
| *H04W 56/00* | (2009.01) | |
| *H04L 12/24* | (2006.01) | |
| *H04L 12/911* | (2013.01) | |
| *H04L 29/12* | (2006.01) | |
| *H04L 29/08* | (2006.01) | |
| *H04W 48/18* | (2009.01) | |
| *H04M 7/00* | (2006.01) | |
| *H04W 84/04* | (2009.01) | |

(52) U.S. Cl.
CPC ........ *H04L 5/0041* (2013.01); *H04L 12/2801* (2013.01); *H04L 27/0006* (2013.01); *H04L 27/2637* (2013.01); *H04L 41/5003* (2013.01); *H04L 47/821* (2013.01); *H04L 61/2007* (2013.01); *H04L 67/12* (2013.01); *H04W 16/14* (2013.01); *H04W 36/08* (2013.01); *H04W 48/18* (2013.01); *H04W 56/001* (2013.01); *H04W 72/0453* (2013.01); *H04W 80/10* (2013.01); *H04M 7/006* (2013.01); *H04Q 2213/13012* (2013.01); *H04W 84/042* (2013.01)

(56) References Cited

U.S. PATENT DOCUMENTS

| | | |
|---|---|---|
| 7,293,201 B2 | 11/2007 | Ansari |
| 7,581,012 B2 | 8/2009 | Shiouchi et al. |
| 8,265,028 B2 | 9/2012 | Davies et al. |
| 8,599,797 B2 | 12/2013 | Pelkonen |
| 8,719,847 B2 | 5/2014 | Agarwal et al. |
| 8,724,588 B2 | 5/2014 | Li et al. |
| 8,750,710 B1 | 6/2014 | Hirt et al. |
| 9,001,789 B2 | 4/2015 | Hosobe |
| 9,185,341 B2 | 11/2015 | Hardin |
| 9,948,349 B2 | 4/2018 | Malach |
| 10,452,342 B2 | 10/2019 | Triplett |
| 10,885,569 B2 | 1/2021 | Ogaz et al. |
| 2004/0139177 A1 | 7/2004 | Yook |
| 2005/0063317 A1 | 3/2005 | Risberg et al. |
| 2008/0279287 A1 | 11/2008 | Asahina |
| 2009/0163140 A1 | 6/2009 | Packham et al. |
| 2009/0176490 A1 | 7/2009 | Kazmi et al. |
| 2010/0008235 A1 | 1/2010 | Tinnakornsrisuphap et al. |
| 2010/0178912 A1 | 7/2010 | Gunnarsson et al. |
| 2010/0202450 A1 | 8/2010 | Ansari et al. |
| 2011/0117917 A1 | 5/2011 | Gresset et al. |
| 2011/0207456 A1 | 8/2011 | Radulescu et al. |
| 2011/0210849 A1 | 9/2011 | Howard et al. |
| 2012/0076009 A1 | 3/2012 | Pasko |
| 2012/0079507 A1 | 3/2012 | Agarwal et al. |
| 2012/0275315 A1 | 11/2012 | Schlangen et al. |
| 2013/0010686 A1 | 1/2013 | Shatzkarner |
| 2013/0077554 A1 | 3/2013 | Gauvreau |
| 2013/0191495 A1 | 7/2013 | Almstrand et al. |
| 2013/0252616 A1 | 9/2013 | Murakami |
| 2013/0258997 A1 | 10/2013 | Chen |
| 2013/0322504 A1 | 12/2013 | Asati et al. |
| 2014/0139422 A1 | 5/2014 | Mistry et al. |
| 2014/0215457 A1 | 7/2014 | Gava et al. |
| 2014/0370895 A1 | 12/2014 | Pandey et al. |
| 2015/0120000 A1 | 4/2015 | Coffey et al. |
| 2015/0229584 A1 | 8/2015 | Okamoto et al. |
| 2015/0365178 A1 | 12/2015 | Maattanen et al. |
| 2016/0013855 A1 | 1/2016 | Campos et al. |
| 2016/0020835 A1 | 1/2016 | Stadelmeier et al. |
| 2016/0094421 A1* | 3/2016 | Bali ................ H04L 43/04 709/223 |
| 2016/0174043 A1 | 6/2016 | Ko et al. |
| 2016/0174268 A1 | 6/2016 | Hu et al. |
| 2016/0212632 A1 | 7/2016 | Katamreddy et al. |
| 2016/0259923 A1 | 9/2016 | Papa et al. |
| 2016/0373974 A1 | 12/2016 | Gomes et al. |
| 2017/0026157 A1 | 1/2017 | Bugenhagen et al. |
| 2017/0140286 A1 | 5/2017 | Basu et al. |
| 2017/0187966 A1 | 6/2017 | Getting |
| 2017/0201912 A1 | 7/2017 | Zingler et al. |
| 2018/0034524 A1 | 2/2018 | Pao et al. |
| 2018/0098245 A1 | 4/2018 | Livanos et al. |
| 2018/0184337 A1 | 6/2018 | Jin et al. |
| 2018/0213452 A1 | 7/2018 | Kim et al. |
| 2018/0239425 A1 | 8/2018 | Jang |
| 2018/0352342 A1 | 10/2018 | Luccin et al. |
| 2018/0331935 A1 | 11/2018 | Ross et al. |
| 2018/0338277 A1 | 11/2018 | Byun et al. |
| 2018/0343685 A1 | 11/2018 | Hart et al. |
| 2018/0351809 A1 | 12/2018 | Meredith et al. |
| 2019/0007870 A1 | 1/2019 | Gupta et al. |
| 2019/0037630 A1 | 1/2019 | Zhang |
| 2019/0053193 A1 | 2/2019 | Park et al. |
| 2019/0075023 A1 | 3/2019 | Sirotkin |
| 2019/0104033 A1 | 4/2019 | Carey |
| 2019/0109643 A1 | 4/2019 | Campos et al. |
| 2019/0124572 A1 | 4/2019 | Park et al. |
| 2019/0124696 A1* | 4/2019 | Islam ................ H04W 56/001 |
| 2019/0158975 A1 | 5/2019 | Petersen |
| 2019/0229974 A1 | 7/2019 | Campos et al. |
| 2019/0245740 A1 | 8/2019 | Kachhla |
| 2019/0319814 A1 | 10/2019 | Das |
| 2019/0319858 A1 | 10/2019 | Das |
| 2019/0320250 A1 | 10/2019 | Hoole |
| 2019/0320322 A1 | 10/2019 | Jayawardene et al. |
| 2019/0320494 A1 | 10/2019 | Jayawardene et al. |
| 2019/0364492 A1 | 11/2019 | Azizi et al. |
| 2019/0379455 A1 | 12/2019 | Wang et al. |
| 2020/0091608 A1 | 3/2020 | Alpman et al. |
| 2020/0106678 A1 | 4/2020 | Grill et al. |
| 2020/0126551 A1 | 4/2020 | Xiong et al. |
| 2020/0186378 A1 | 6/2020 | Six et al. |
| 2020/0214065 A1 | 7/2020 | Tomala et al. |
| 2020/0281008 A1 | 9/2020 | Aboul-Magd et al. |
| 2021/0028915 A1 | 1/2021 | Jia et al. |

OTHER PUBLICATIONS

3GPP, "Evolved Universal Terrestrial Radio Access (E-UTRA), Carrier Aggregation, Base Station (BS) radio transmission and reception (Release 10)", Technical Specification Group Radio Access Network, Technical Report (TR 36.808 V10.1.0), 2013, 31 pages.

3GPP TS 36.413, V14.4, "3rd Generation Partnership Project; Technical Specification Group Radio Access Network; Evolved Universal Terrestrial Radio Access Network (E-UTRAN); S1 Application Protocol (S1AP) (Release 14)", Sep. 2017.

3GPP, "Study on New Radio Access Technology, Radio Interface Protocol Aspects (Release 14)", Technical Specification Group Radio Access Network, Technical Report (TR 38.804), V14.0.0 (Mar. 2017), 57 pages.

Bertenyi B., 3GPP TSG RAN, RAN Adjusts Schedule for2nd Wave of 5G Specifications, The Mobile Broadband Standard, A Global Initiative, Dec. 14, 2018, retrieved from the Internet: (https://www.3gpp.org/news-events/3gpp-news/2005-ran_r16_schedule), 2 pages.

Bluetooth Core Specification, Version 4.0, 2302 pages.

* cited by examiner

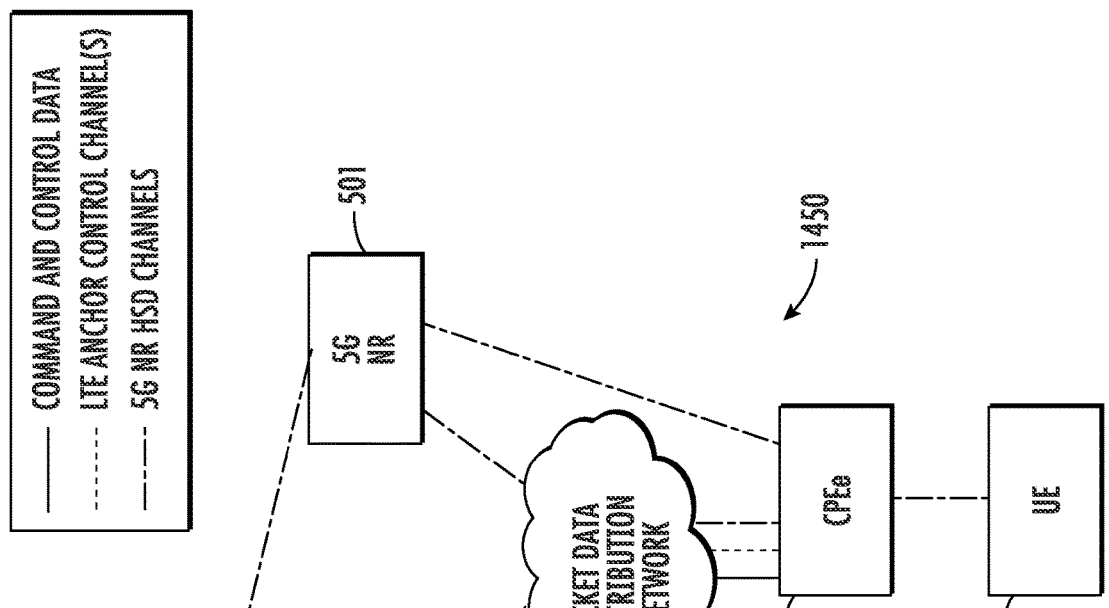
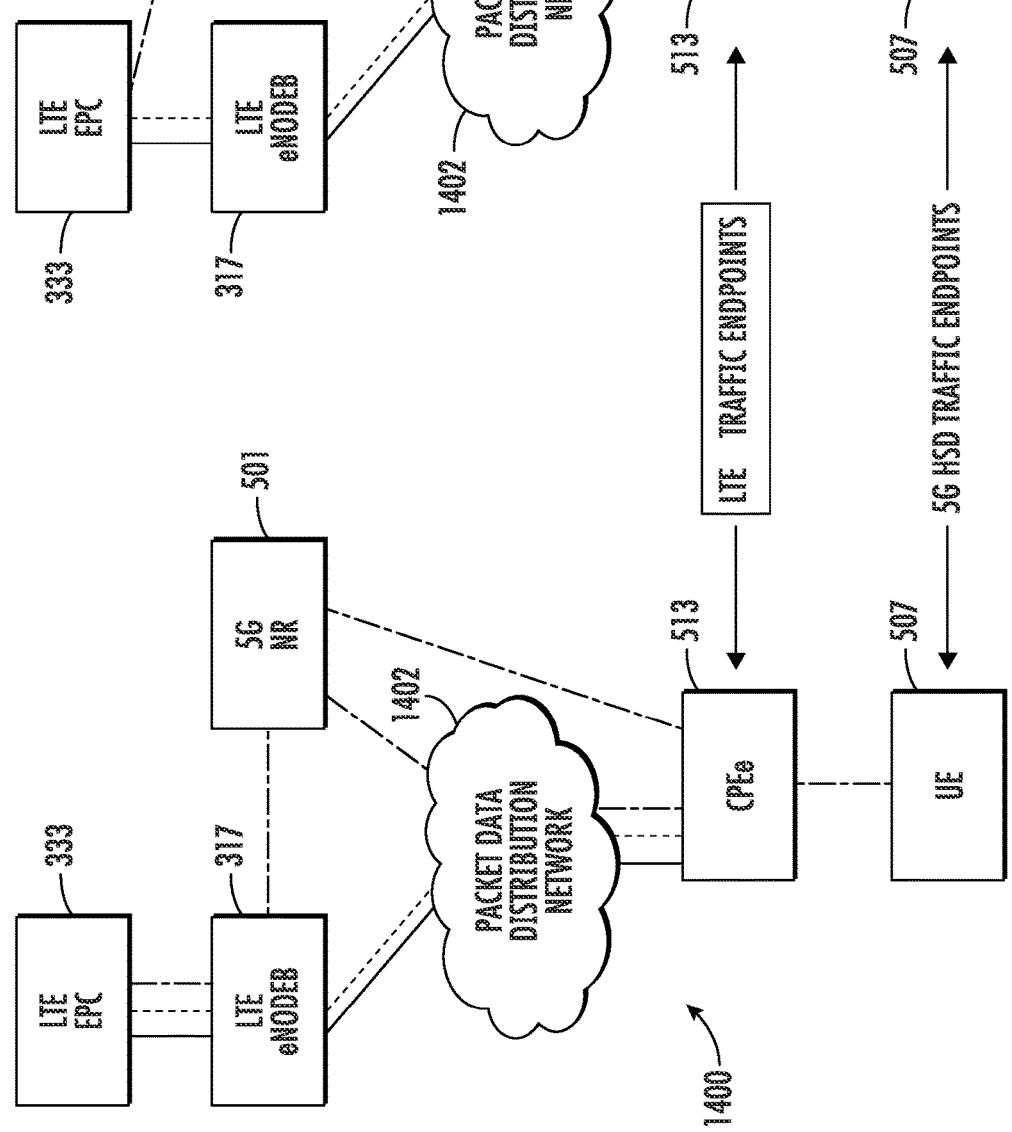

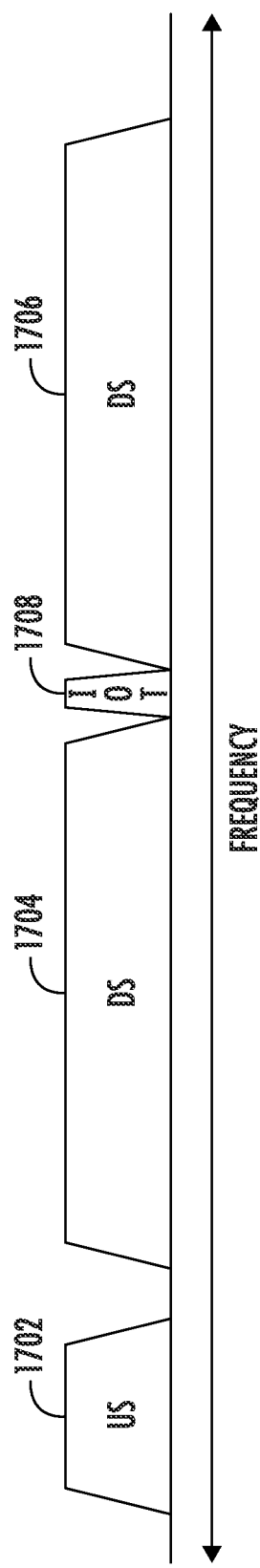
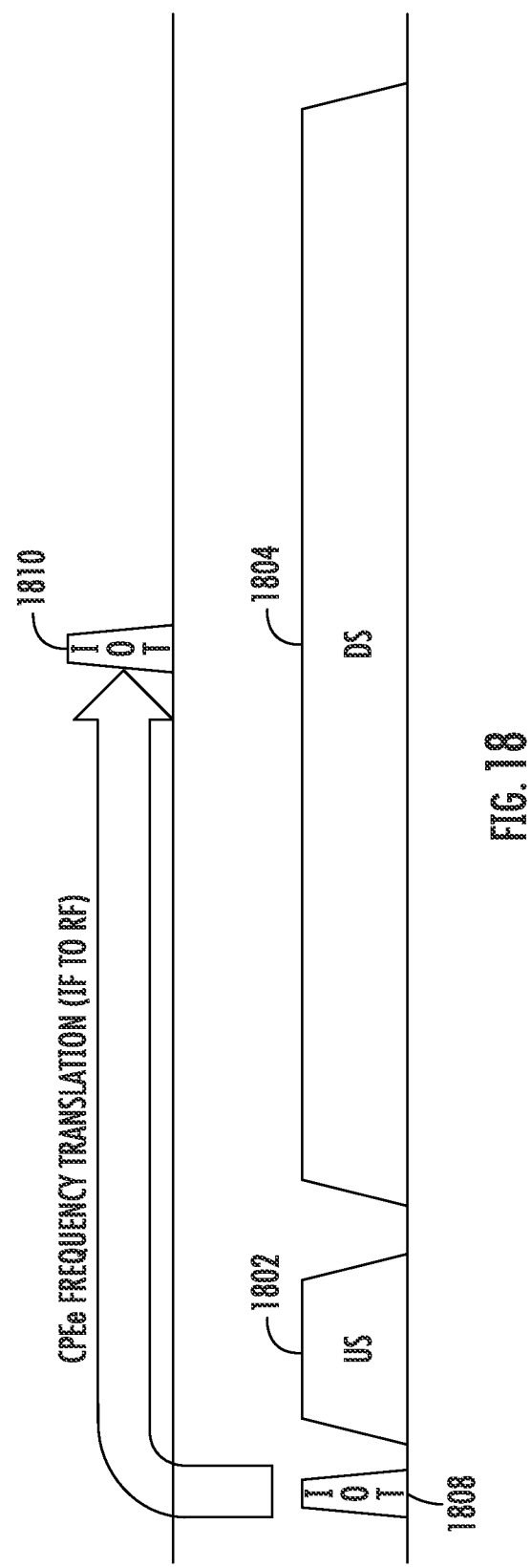

GATEWAY APPARATUS AND METHODS FOR WIRELESS IOT (INTERNET OF THINGS) SERVICES

PRIORITY AND RELATED APPLICATIONS

This application claims the benefit of priority to U.S. Provisional Patent Application No. 62/658,465 filed Apr. 16, 2018 and entitled "APPARATUS AND METHODS FOR INTEGRATED HIGH-CAPACITY DATA AND WIRELESS NETWORK SERVICES", which is incorporated herein by reference in its entirety.

This application is also related to co-owned and co-pending U.S. patent application Ser. Nos. 16/216,835 entitled "APPARATUS AND METHODS FOR INTEGRATED HIGH-CAPACITY DATA AND WIRELESS NETWORK SERVICES" filed Dec. 11, 2018, Ser. No. 16/261,234 entitled "APPARATUS AND METHODS FOR ENABLING MOBILITY OF A USER DEVICE IN AN ENHANCED WIRELESS NETWORK" filed Jan. 29, 2019, Ser. No. 16/384,706 entitled "APPARATUS AND METHODS FOR COORDINATED DELIVERY OF MULTIPLE DATA CHANNELS OVER PHYSICAL MEDIUM" filed Apr. 15, 2019, Ser. No. 16/384,561 entitled "APPARATUS AND METHODS FOR INTEGRATED HIGH-CAPACITY DATA AND WIRELESS IoT (INTERNET OF THINGS) SERVICES" filed Apr. 15, 2019, and Ser. No. 16/384,701 entitled "APPARATUS AND METHODS FOR ENHANCING QUALITY OF EXPERIENCE FOR OVER-THE-TOP DATA SERVICES OVER HIGH-CAPACITY WIRELESS NETWORKS" filed Apr. 15, 2019, each of the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of data networks and wireless devices, and specifically in one exemplary aspect to an architecture which integrates or unifies provision of high-speed data services including "Internet of Things" or IoT services, in a variety of different locations and use cases.

2. Description of Related Technology

Data communication services are now ubiquitous throughout user premises (e.g., home, office, and even vehicles). Such data communication services may be provided via a managed or unmanaged network. For instance, a typical home has services provided by one or more network service providers via a managed network such as a cable or satellite network. These services may include content delivery (e.g., linear television, on-demand content, personal or cloud DVR, "start over", etc.), as well as so-called "over the top" third party content. Similarly, Internet and telephony access is also typically provided, and may be bundled with the aforementioned content delivery functions into subscription packages, which are increasingly becoming more user- or premises-specific in their construction and content. Such services are also increasingly attempting to adopt the paradigm of "anywhere", anytime," so that users (subscribers) can access the desired services (e.g., watch a movie) via a number of different receiving and rendering platforms, such as in different rooms of their house, on their mobile device while traveling, etc.

Managed Cable Networks

Network operators deliver data services (e.g., broadband) and video products to customers using a variety of different devices, thereby enabling their users or subscribers to access data/content in a number of different contexts, both fixed (e.g., at their residence) and mobile (such as while traveling or away from home). FIGS. 1 and 2 are a functional block diagrams illustrating a typical prior art managed (e.g., cable) content delivery network architecture used to provide such data services to its users and subscribers.

Data/content delivery may be specific to the network operator, such as where video content is ingested by the network operator or its proxy, and delivered to the network users or subscribers as a product or service of the network operator. For instance, a cable multiple systems operator (MSO) may ingest content from multiple different sources (e.g., national networks, content aggregators, etc.), process the ingested content, and deliver it to the MSO subscribers via e.g., a hybrid fiber coax (HFC) cable/fiber network, such as to the subscriber's set-top box or DOCSIS cable modem. Such ingested content is transcoded to the necessary format as required (e.g., MPEG-2 or MPEG-4/AVC), framed and placed in the appropriate media container format ("packaged"), and transmitted via e.g., statistical multiplex into a multi-program transport stream (MPTS) on 6 MHz radio frequency (RF) channels for receipt by the subscribers RF tuner, demultiplexed and decoded, and rendered on the user's rendering device (e.g., digital TV) according to the prescribed coding format.

Within the cable plant, VOD and so-called switched digital video (SDV) may also be used to provide content, and utilize a single-program transport stream (SPTS) delivery modality. In U.S. cable systems for example, downstream RF channels used for transmission of television programs are 6 MHz wide, and occupy a 6 MHz spectral slot between 54 MHz and 860 MHz. Deployments of VOD services have to share this spectrum with already established analog and digital cable television services such as those described above. Within a given cable plant, all homes that are electrically connected to the same cable feed running through a neighborhood will receive the same downstream signal. For the purpose of managing e.g., VOD services, these homes are grouped into logical groups typically called Service Groups. Homes belonging to the same Service Group receive their VOD service on the same set of RF channels.

VOD service is typically offered over a given number (e.g., 4) of RF channels from the available spectrum in cable. Thus, a VOD Service Group consists of homes receiving VOD signals over the same 4 RF channels.

In most cable networks, programs are transmitted using MPEG (e.g., MPEG-2) audio/video compression. Since cable signals are transmitted using Quadrature Amplitude Modulation (QAM) scheme, available payload bitrate for typical modulation rates (QAM-256) used on HFC systems is roughly 38 Mbps. For example, in many VOD deployments, a typical rate of 3.75 Mbps is used to send one video program at resolution and quality equivalent to NTSC broadcast signals. In digital television terminology, this is called Standard Definition (SD) television resolution. Therefore, use of MPEG-2 and QAM modulation enables carriage of 10 SD sessions on one RF channel (10×3.75=37.5 Mbps<38 Mbps). Since a typical Service Group consists of 4 RF channels, 40 simultaneous SD VOD sessions can be accommodated within a Service Group.

Entertainment-quality transmission of HD (High Definition) signals requires about four times as much bandwidth as SD. For an exemplary MPEG-2 Main Profile—High Level (MP@HL) video compression, each HD program requires around 15 Mbps bitrate.

Wireless

A multitude of wireless networking technologies, also known as Radio Access Technologies ("RATs"), provide the underlying means of connection for radio-based communication networks to user devices. Such RATs often utilize licensed radio frequency spectrum (i.e., that allocated by the FCC per the Table of Frequency Allocations as codified at Section 2.106 of the Commission's Rules). Currently only frequency bands between 9 kHz and 275 GHz have been allocated (i.e., designated for use by one or more terrestrial or space radio communication services or the radio astronomy service under specified conditions). For example, a typical cellular service provider might utilize spectrum for so-called "3G" (third generation) and "4G" (fourth generation) wireless communications as shown in Table 1 below:

TABLE 1

| Technology | Bands |
|---|---|
| 3G | 850 MHz Cellular, Band 5 (GSM/GPRS/EDGE). |
|  | 1900 MHz PCS, Band 2 (GSM/GPRS/EDGE). |
|  | 850 MHz Cellular, Band 5 (UMTS/HSPA+ up to 21 Mbit/s). |
|  | 1900 MHz PCS, Band 2 (UMTS/HSPA+ up to 21 Mbit/s). |
| 4G | 700 MHz Lower B/C, Band 12/17 (LTE). |
|  | 850 MHz Cellular, Band 5 (LTE). |
|  | 1700/2100 MHz AWS, Band 4 (LTE). |
|  | 1900 MHz PCS, Band 2 (LTE). |
|  | 2300 MHz WCS, Band 30 (LTE). |

Alternatively, unlicensed spectrum may be utilized, such as that within the so-called ISM-bands. The ISM bands are defined by the ITU Radio Regulations (Article 5) in footnotes 5.138, 5.150, and 5.280 of the Radio Regulations. In the United States, uses of the ISM bands are governed by Part 18 of the Federal Communications Commission (FCC) rules, while Part 15 contains the rules for unlicensed communication devices, even those that share ISM frequencies. Table 2 below shows typical ISM frequency allocations:

TABLE 2

| Frequency range | Type | Center frequency | Availability | Licensed users |
|---|---|---|---|---|
| 6.765 MHz-6.795 MHz | A | 6.78 MHz | Subject to local acceptance | Fixed service & mobile service |
| 13.553 MHz-13.567 MHz | B | 13.56 MHz | Worldwide | Fixed & mobile services except aeronautical mobile (R) service |
| 26.957 MHz-27.283 MHz | B | 27.12 MHz | Worldwide | Fixed & mobile service except aeronautical mobile service, CB radio |
| 40.66 MHz-40.7 MHz | B | 40.68 MHz | Worldwide | Fixed, mobile services & earth exploration-satellite service |
| 433.05 MHz-434.79 MHz | A | 433.92 MHz | only in Region 1, subject to local acceptance | amateur service & radiolocation service, additional apply the provisions of footnote 5.280 |
| 902 MHz-928 MHz | B | 915 MHz | Region 2 only (with some exceptions) | Fixed, mobile except aeronautical mobile & radiolocation service; in Region 2 additional amateur service |
| 2.4 GHz-2.5 GHz | B | 2.45 GHz | Worldwide | Fixed, mobile, radiolocation, amateur & amateur-satellite service |
| 5.725 GHz-5.875 GHz | B | 5.8 GHz | Worldwide | Fixed-satellite, radiolocation, mobile, amateur & amateur-satellite service |
| 24 GHz-24.25 GHz | B | 24.125 GHz | Worldwide | Amateur, amateur-satellite, radiolocation & earth exploration-satellite service (active) |
| 61 GHz-61.5 GHz | A | 61.25 GHz | Subject to local acceptance | Fixed, inter-satellite, mobile & radiolocation service |
| 122 GHz-123 GHz | A | 122.5 GHz | Subject to local acceptance | Earth exploration-satellite (passive), fixed, inter-satellite, mobile, space research (passive) & amateur service |
| 244 GHz-246 GHz | A | 245 GHz | Subject to local acceptance | Radiolocation, radio astronomy, amateur & amateur-satellite service |

ISM bands are also been shared with (non-ISM) license-free communications applications such as wireless sensor networks in the 915 MHz and 2.450 GHz bands, as well as wireless LANs (e.g., Wi-Fi) and cordless phones in the 915 MHz, 2.450 GHz, and 5.800 GHz bands.

Additionally, the 5 GHz band has been allocated for use by, e.g., WLAN equipment, as shown in Table 3:

TABLE 3

| Band Name | Frequency Band | Dynamic Freq. Selection Required (DFS)? |
|---|---|---|
| UNII-1 | 5.15 to 5.25 GHz | No |
| UNII-2 | 5.25 to 5.35 GHz | Yes |
| UNII-2 Extended | 5.47 to 5.725 GHz | Yes |
| UNII-3 | 5.725 to 5.825 GHz | No |

User client devices (e.g., smartphone, tablet, phablet, laptop, smartwatch, or other wireless-enabled devices, mobile or otherwise) generally support multiple RATs that enable the devices to connect to one another, or to networks (e.g., the Internet, intranets, or extranets), often including RATs associated with both licensed and unlicensed spectrum. In particular, wireless access to other networks by client devices is made possible by wireless technologies that utilize networked hardware, such as a wireless access point ("WAP" or "AP"), small cells, femtocells, or cellular towers, serviced by a backend or backhaul portion of service provider network (e.g., a cable network). A user may generally access the network at a node or "hotspot," a physical location at which the user may obtain access by connecting to modems, routers, APs, etc. that are within wireless range.

One such technology that enables a user to engage in wireless communication (e.g., via services provided through the cable network operator) is Wi-Fi® (IEEE Std. 802.11), which has become a ubiquitously accepted standard for wireless networking in consumer electronics. Wi-Fi allows client devices to gain convenient high-speed access to networks (e.g., wireless local area networks (WLANs)) via one or more access points.

Commercially, Wi-Fi is able to provide services to a group of users within a venue or premises such as within a trusted home or business environment, or outside, e.g., cafes, hotels, business centers, restaurants, and other public areas. A typical Wi-Fi network setup may include the user's client device in wireless communication with an AP (and/or a modem connected to the AP) that are in communication with the backend, where the client device must be within a certain range that allows the client device to detect the signal from the AP and conduct communication with the AP.

Another wireless technology in widespread use is Long-Term Evolution standard (also colloquially referred to as "LTE," "4G," "LTE Advanced," among others). An LTE network is powered by an Evolved Packet Core ("EPC"), an Internet Protocol (IP)-based network architecture and eNodeB—Evolved NodeB or E-UTRAN node which part of the Radio Access Network (RAN), capable of providing high-speed wireless data communication services to many wireless-enabled devices of users with a wide coverage area.

Currently, most consumer devices include multi-RAT capability; e.g.; the capability to access multiple different RATs, whether simultaneously, or in a "fail over" manner (such as via a wireless connection manager process running on the device). For example, a smartphone may be enabled for LTE data access, but when unavailable, utilize one or more Wi-Fi technologies (e.g., 802.11g/n/ac) for data communications.

The capabilities of different RATs (such as LTE and Wi-Fi) can be very different, including regarding establishment of wireless service to a given client device. For example, there is a disparity between the signal strength threshold for initializing a connection via Wi-Fi vs. LTE (including those technologies configured to operate in unlicensed bands such as LTE-U and LTE-LAA). As a brief aside, LTE-U enables data communication via LTE in an unlicensed spectrum (e.g., 5 GHz) to provide additional radio spectrum for data transmission (e.g., to compensate for overflow traffic). LTE-LAA uses carrier aggregation to combine LTE in unlicensed spectrum (e.g., 5 GHz) with the licensed band. Typical levels of signal strength required for LTE-U or LTE-LAA service are approximately −80 to −84 dBm. In comparison, Wi-Fi can be detected by a client device based on a signal strength of approximately −72 to −80 dBm, i.e., a higher (i.e., less sensitive) detection threshold.

Increasing numbers of users (whether users of wireless interfaces of the aforementioned standards, or others) invariably lead to "crowding" of the spectrum, including interference. Interference may also exist from non-user sources such as solar radiation, electrical equipment, military uses, etc. In effect, a given amount of spectrum has physical limitations on the amount of bandwidth it can provide, and as more users are added in parallel, each user potentially experiences more interference and degradation of performance.

Moreover, technologies such as Wi-Fi have limited range (due in part to the unlicensed spectral power mask imposed in those bands), and may suffer from spatial propagation variations (especially inside structures such as buildings) and deployment density issues. Wi-Fi has become so ubiquitous that, especially in high-density scenarios such as hospitality units (e.g., hotels), enterprises, crowded venues, and the like, the contention issues may be unmanageable, even with a plethora of Wi-Fi APs installed to compensate. Yet further, there is generally no coordination between such APs, each in effect contending for bandwidth on its backhaul with others.

Additionally, lack of integration with other services provided by e.g., a managed network operator, typically exists with unlicensed technology such as Wi-Fi. Wi-Fi typically acts as a "data pipe" opaquely carried by the network operator/service provider.

5G New Radio (NR) and NG-RAN (Next Generation Radio Area Network)—

NG-RAN or "NextGen RAN (Radio Area Network)" is part of the 3GPP "5G" next generation radio system. 3GPP is currently specifying Release 15 NG-RAN, its components, and interactions among the involved nodes including so-called "gNBs" (next generation Node B's or eNBs). NG-RAN will provide very high-bandwidth, very low-latency (e.g., on the order of 1 ms or less "round trip") wireless communication and efficiently utilize, depending on application, both licensed and unlicensed spectrum of the type described supra in a wide variety of deployment scenarios, including indoor "spot" use, urban "macro" (large cell) coverage, rural coverage, use in vehicles, and "smart" grids and structures. NG-RAN will also integrate with 4G/4.5G systems and infrastructure, and moreover new LTE entities are used (e.g., an "evolved" LTE eNB or "eLTE eNB" which supports connectivity to both the EPC (Evolved Packet Core) and the NR "NGC" (Next Generation Core). As such, both "standalone" (SA) and "non-standalone" (NSA) configurations are described. As discussed in greater detail below, in the SA scenario, the 5G NR or the evolved LTE radio cells and the core network are operated alone. Conversely, in NSA scenarios, combination of e-UTRAN and NG-RAN entities are utilized.

In some aspects, exemplary Release 15 NG-RAN leverages technology and functions of extant LTE/LTE-A technologies (colloquially referred to as 4G or 4.5G), as bases for further functional development and capabilities. For instance, in an LTE-based network, upon startup, an eNB (base station) establishes S1-AP connections towards the MME (mobility management entity) whose commands the eNB is expected to execute.

An eNB can be responsible for multiple cells (in other words, multiple Tracking Area Codes corresponding to E-UTRAN Cell Global Identifiers). The procedure used by the eNB to establish the aforementioned S1-AP connection, together with the activation of cells that the eNB supports, is referred to as the S1 SETUP procedure; see inter alia, 3GPP TS 36.413 V14.4. entitled "3rd Generation Partnership Project; Technical Specification Group Radio Access Network; Evolved Universal Terrestrial Radio Access Network (E-UTRAN); S1 Application Protocol (S1AP) (Release 14)" dated September 2017, which is incorporated herein by reference in its entirety.

As a brief aside, and referring to FIG. 3a (an SA configuration), the CU 304 (also known as gNB-CU) is a logical node within the NR architecture 300 that communicates with the NG Core 303, and includes gNB functions such as transfer of user data, session management, mobility control, RAN sharing, and positioning; however, other functions are allocated exclusively to the DU(s) 306 (also known as gNB-DUs) per various "split" options described subsequently herein in greater detail. The CU 304 communicates user data and controls the operation of the DU(s) 306, via corresponding front-haul (Fs) user plane and control plane interfaces 308, 310.

Accordingly, to implement the Fs interfaces 308, 310, the (standardized) F1 interface is employed. It provides a mechanism for interconnecting a gNB-CU 304 and a gNB-DU 306 of a gNB 302 within an NG-RAN, or for interconnecting a gNB-CU and a gNB-DU of an en-gNB within an E-UTRAN. The F1 Application Protocol (F1AP) supports the functions of F1 interface by signaling procedures defined in 3GPP TS 38.473. F1AP consists of so-called "elementary procedures" (EPs). An EP is a unit of interaction between gNB-CU and gNB-DU. These EPs are defined separately and are intended to be used to build up complete messaging sequences in a flexible manner. Generally, unless otherwise stated by the restrictions, the EPs may be invoked independently of each other as standalone procedures, which can be active in parallel.

Within such an architecture 300, a gNB-DU 306 (or ngeNB-DU) is under the control of a single gNB-CU 304. When a gNB-DU is initiated (including power-up), it executes the F1 SETUP procedure (which is generally modeled after the above-referenced S1 SETUP procedures of LTE) to inform the controlling gNB-CU of, inter alia, any number of parameters such as e.g., the number of cells (together with the identity of each particular cell) in the F1 SETUP REQUEST message.

FIGS. 3b-3d illustrate some of the alternate prior art configurations of 5G NR gNB architectures, including those involving eLTE eNB (evolved LTE eNBs that are capable of communication with an NGC or EPC) and various configurations of user-plane and control-plane interfaces in the so-called "non-standalone" or NSA configurations (e.g., Options 3, 4 and 7). See, inter alia, 3GPP TR 38.804 V14.0.0 (2017 March)—"3rd Generation Partnership Project; Technical Specification Group Radio Access Network; Study on New Radio Access Technology; Radio Interface Protocol Aspects (Release 14)," incorporated herein by reference in its entirety, for additional details on these and other possible 4G/5G configurations.

In FIG. 3b, a eUTRAN eNB 316 is communicative with the 5G gNB 302 for user plane (UP) and control plane (CP) functions, and is communicative with the NGC 303 for UP functions (i.e., the gNB is a master node in conjunction with a 5GC).

In FIG. 3c, a eUTRAN eNB 316 is communicative with the 5G gNB 302 for user plane (UP) and control plane (CP) functions, and is communicative with the NGC 303 for UP and CP functions (i.e., the eNB is a master node in conjunction with a 5GC).

In FIG. 3d, a 5G gNB 302 is communicative with the eNB 316 for user plane (UP) and control plane (CP) functions, and is communicative with the Evolved Packet Core (EPC) 333 for UP functions (i.e., the eNB is a master node in conjunction with an EPC).

As of the date of this writing, 3GPP is delivering Release 15 to industry in three distinct steps: (i) 'early' drop: contains Non-standalone 5G specifications (so called Option-3 family), ASN.1 frozen in March 2018; (ii) 'main' drop: contains Standalone 5G (so called Option-2), ASN.1 frozen in September 2018; and (iii) 'late' drop: contains additional migration architectures (so called Option-4, Option-7, and 5G-5G dual connectivity), ASN.1 to be frozen in June 2019. See http://www.3gpp.org/news-events/3gpp-news/2005-ran_r16_schedule.

IoT Devices

Also useful to the user is data relating to other "intelligent" devices and services, such as e.g., those within the user's premises. For example, computerized devices within the user's premises other than those provided by, or associated with the services of the MSO or service provider, may exist, including for instance personal electronics, appliances, security systems, and home automation systems. One emerging class of such non-service provider devices are so called "IoT" or "Internet of Things" devices, aimed at providing enhanced data communication functionality between the IoT devices and third parties (e.g., a service provider), and between the IoT devices themselves.

Internet of Things (IoT) development has leveraged miniaturization, cloud solutions, faster processing speeds, reduced costs of components, and use of data analytics to benefit from real-time data collected from e.g., the user's premises. IoT is somewhat of an evolution of Machine-to-Machine (M2M); while M2M typically utilizes direct communication links, IoT expands to connectivity via IP networks and other infrastructure. M2M applications typically utilize single applications and most of the time are characterized by a "one device—one application" paradigm. In contrast, IoT is constructed to support "one device to many applications" and conversely "many devices to few (or one) application" operations.

Various IoT use cases and applications have been identified. In one type of application, very large numbers of connected objects residing, for example, in buildings, agricultural fields, shipping vehicles, are used and contact "the cloud" using low-cost devices with low energy consumption, sufficient geographic coverage, and relatively high scalability. Conversely, more "critical" IoT applications such as healthcare, traffic management, and industrial/utility controls, require high availability and reliability as well as very low latency.

Enhanced Machine-Type Communication (eMTC) and Narrowband IoT (NB-IoT), are exemplary technologies expected to offer applicability to a wide variety of IoT use cases such as those described above. The 3GPP-specified eMTC and NB-IoT, together with a variety of unlicensed low power technologies, provide an array of wireless connectivity options that enable so-called Low Power Wide Area Networks (LPWANs).

The key improvement areas addressed by the 3GPP standards (i.e., including Release 13) include device cost, battery life, coverage and support for massive numbers of IoT connections. Security is also an issue at all levels of the IoT "fabric." Accordingly, enhanced Machine-Type-Communication (eMTC) and Narrowband IoT (NB-IoT) technologies each support state-of-the-art 3GPP security, including authentication, signaling protection, and data encryption.

Notably, as compared to say the broadband data traffic referenced above, the data traffic from most IoT applications will be relatively small and easily absorbed into the bearer network(s).

In 3GPP Releases 14, 15 and beyond (including 5G referenced supra), standards aim at more fully integrating and enabling IoT applications with 5G's ultra-low latency, high reliability, high connectivity, and very high bandwidth capabilities, including real-time control and automation of dynamic processes in various fields such as vehicle-to-vehicle, vehicle-to-infrastructure, high-speed motion, and process control.

Unlicensed IoT devices can use any number of lower- and higher-layer protocol stacks. Many are based on the IEEE Std. 802.15.4 WPAN MAC/PHY (including Zigbee and Thread), while others utilize BLE (Bluetooth Low Energy, also referred to colloquially as Bluetooth Smart). These technologies utilize unlicensed portions of the radio frequency spectrum (e.g., ISM bands in the U.S.) for communication, and may attempt to avoid interference or conflict with other ISM-band technologies such as Wi-Fi (IEEE Std. 802.11).

Currently, the following non-exhaustive list of exemplary technologies are available or under development for unlicensed IoT applications:

Zigbee—ZigBee 3.0 is based on IEEE Std. 802.15.4, and operates at a nominal frequency of 2.4 GHz as well as 868 and 915 MHz (ISM), supports data rates on the order of 250 kbps, and has a range on the order of 10-100 meters. Zigbee radios use direct-sequence spread spectrum (DSSS) spectral access/coding, and binary phase-shift keying (BPSK) is used in the 868 and 915 MHz bands, and offset quadrature phase-shift keying (OQPSK) that transmits two bits per symbol is used for the 2.4 GHz band.

Z-Wave—Z-Wave technology is specified by the Z-Wave Alliance Standard ZAD12837 and ITU-T G.9959 (for PHY and MAC layers). It operates in the U.S. at a nominal frequency of 900 MHz (ISM), as shown in Table 4 below:

TABLE 4

| Region | Center frequency | | Data rate | Channel Width |
| --- | --- | --- | --- | --- |
| | G.9959 | MHz | G.9959 | kHz |
| United States of America | $f_{US1}$ | 916.00 | R3 | 400 |
| | $f_{US2}$ | 908.40 | R2 | 300 |
| | | | R1 | 300 |

R1—Type 1 of supported data rate—9.6 kbps
R2—Type 2 of supported data rate—40 kbps
R3—Type 3 of supported data rate—100 kbps Z-Wave has a range on the order of 30 meters, and supports full mesh networks without the need for a coordinator node (as in 802.15.4). It is scalable, enabling control of up to 232 devices. Z-Wave uses a simpler protocol than some others, which can ostensibly enable faster and simpler development. Z-Wave also supports AES128 encryption and IPv6.

6LowPAN—6LowPAN (IPv6 Low-power wireless Personal Area Network) is an IP-based network protocol technology (rather than an IoT application protocol technology such as Bluetooth or ZigBee), as set forth in RFC 6282. 6LowPAN defines encapsulation and header compression mechanisms, and is not tied to any particular PHY configuration. It can also be used along with multiple communications platforms, including Ethernet, Wi-Fi, 802.15.4 and sub-1 GHz ISM. The IPv6 (Internet Protocol version 6) stack enables embedded objects or devices to have their own unique IP address, and connect to the Internet. IPv6 provides a basic transport mechanism to e.g., enable complex control systems, and to communicate with devices via a low-power wireless network.

For instance, 6LowPAN can send IPv6 packets over an IEEE 802.15.4-based network which implements "open" IP standards such TCP, UDP, HTTP, COAP, MQTT, and websockets to enable end-to-end addressable nodes, allowing a router to connect the network to IP. Moreover, mesh router devices can route data destined for other devices, while hosts are able to sleep (and hence conserve power).

Thread—Thread is a royalty-free protocol based on various standards including IEEE Std. 802.15.4 (as the air-interface protocol) and 6LoWPAN. It is intended to offer an IP-based solution for IoT applications, and is designed to interoperate with existing IEEE Std. 802.15.4-compliant wireless silicon. Thread supports mesh networking using IEEE Std. 802.15.4 radio transceivers, and can handle numerous nodes, including use of authentication and encryption.

Bluetooth Smart/BLE—Bluetooth Smart or BLE is intended to provide considerably reduced power consumption and cost while maintaining a similar communication range to that of conventional Bluetooth radios. Devices that employ Bluetooth Smart features incorporate the Bluetooth Core Specification Version 4.0 (or higher—e.g., Version 4.2 announced in late 2014) with a combined basic-data-rate and low-energy core configuration for a RF transceiver, baseband and protocol stack. Version 4.2, via its Internet Protocol Support Profile, allows Bluetooth Smart sensors to access the Internet directly via 6LoWPAN connectivity (discussed supra). This IP connectivity enables use of existing IP infrastructure to manage Bluetooth Smart "edge" devices. In 2017, the Bluetooth SIG released Mesh Profile and Mesh Model specifications, which enable using Smart for many-to-many device communications. Moreover, many mobile operating systems including iOS, Android, Windows Phone, BlackBerry, and Linux, natively support Bluetooth Smart.

The Bluetooth 4.2 Core Specification specifies a frequency of 2.4 GHz (ISM band), supports data rates on the order of 1 Mbps, utilizes GFSK (Gaussian Frequency Shift Keying) modulation, and has a typical range on the order of 50 to 150 meters. BLE uses frequency hopping (FHSS) over 37 channels (0-36) for (bidirectional) communication, and over 3 channels for (unidirectional) advertising. The Bluetooth 4.0 link-layer MTU is 27 bytes, while 4.2 used 251 bytes. Core specification 5.0 (adopted Dec. 6, 2016) yet further extends and improves upon features of the v4.2 specification.

A BLE device can operate in four (4) different device roles, each which may cause the devices to behave differently. Two of the roles are connection-based; i.e., a peripheral device is an advertiser that is connectable and can operate as a slave as part of a two-way (bidirectional) data connection, and a central device that monitors for advertisers, and can initiate connections operating as a master for those connections. Conversely, the other two device roles are used for unidirectional communications; i.e., a broadcaster (a non-connectable advertiser which, for example, merely broadcasts data from a sensor of the IoT device, or an observer that monitors for advertisements, but cannot initiate connections (e.g., the receiver for the above-referenced broadcaster). Peripheral devices that implement a GATT Server (storage/exchange architecture) can be branded as a "Bluetooth Smart" device.

Longer Range IoT—Extant technologies adapted for intermediate range WAN (e.g., somewhere between cellular and WLAN) IoT functionality applications include Sigfox, Neul, and LoRaWAN. These are typically employed for much longer distances than the comparatively short-range PAN solutions described above.

For example, LoRaWAN™ is a Low Power Wide Area Network (LPWAN) technology intended for wireless battery operated devices. LoRaWAN ostensibly provides secure bi-directional communication, mobility and localization services. A LoRaWAN network is typically laid out in a star-of-stars topology, with gateways acting as transparent bridges to relay messages between end-devices and a centralized network server. The gateways are connected to the network server via standard IP connections, while the end-devices use wireless communication to one (or multiple) gateways. All end-point communication is generally bi-directional; however, the technology also supports multicast enabling software upgrade OTA and other distribution messages to reduce the on air communication time.

Communication between the aforementioned end-devices and gateways is distributed on different frequency channels and data rates, and used "chirped FM" spread spectrum modulation operating in the 915 MHz ISM band. The selection of the data rate is a trade-off between communication range and message duration. Due to the spread spectrum nature of LoRaWAN technology, communications with different data rates do not interfere with each other via creation of "virtual" channels. LoRaWAN data rates range from 0.3 kbps to 50 kbps. The LoRaWAN network server is configured to manage the data rate and RF output for each end-device individually by means of an adaptive data rate (ADR) scheme, so as to, inter alia, optimize battery life/power consumption. LoRaWAN security is based on that under IEEE 802.15.4 standards, including AES 128 bit encryption.

Device addresses (DevAddr) in LoRaWAN are structured as a 32-bit identifier and are unique within the network, and are also present in each data frame. DevAddr's are shared between end-devices, network servers, and applications servers.

Various end-device classes have different behavior depending on the choice of optimization; i.e., Battery Powered (Class A); Low Latency (Class B); and No Latency (Class C).

Generally speaking, two (2) classes or types of IoT installations within a premises can be envisioned to currently exist: (i) "transparent" installations, wherein the installed IoT end-devices are visible to network devices, whether within or external to the premises; and (ii) "proxy managed" installations, wherein the installed IoT end-devices are managed by a proxy device such as a hub or gateway, and may be invisible to network devices outside the proxy device. Some premises may also freely intermix these two types of installations, such as where some IoT devices are behind a proxy and utilize a proprietary protocol of a common manufacturer, while others are added "ad hoc" without regard to the proxy or proprietary protocol (and which do not inter-communicate therewith), as now described with respect to FIG. 4.

Referring to FIG. 4, in the first type of installation ("transparent"), individual IoT end-devices 402 within a premises 400 may be networked according to various types of topologies (e.g., master-slave, peer-to-peer (P2P), coordinator-simple node, star, cluster, mesh, tree, or other), and may maintain their own status on the network via e.g., assignment of an externally accessible IP address. This makes such devices 402 externally accessible and addressable for, inter alia, remote network entities 406 via any interposed networks such as the Internet 401 and the service provider distribution network 401. For instance, a web server 406 operated by a manufacturer of an IoT-enabled refrigerator may be able to, assuming suitable permissions, communicate directly with the IoT device over the Internet 411 and interposed ISP modem 405 (e.g., DOCSIS cable modem, DSP modem, etc.), a router 407, and local wireless access node 409 (e.g., an IEEE Std. 802.15.4 coordinator or Bluetooth LE master) via its assigned IP address (e.g., an IPv4 or IPv6 address), such as to obtain data logged by the IoT refrigerator (e.g., internal/external temperature profile over time, door openings as a function of time, loss-of-power events, etc.), and/or "push" firmware or other updates to the device such as to implement new or enhanced functions. The assigned IP address may be globally unique (i.e., such that it is unique across the Internet 411 external to the premises), or alternatively locally unique (e.g., unique within its local topology, but not necessarily globally unique). The latter can be translated (via e.g., NAT or network address translation functions) into the former such as by a router 410 or other premises "edge" device configured to perform NAT.

In the second type of installation ("proxy managed"), a hub 412 or other intermediary device is interposed between the IoT end-device(s) 404 and the service provider distribution network 401 external to the premises (including the modem 405 and router 407). The hub 412 may include, as shown, its own internal wireless access interface, whereby the "managed" IoT devices 404 communicate with the hub 412 wirelessly so as to communicate data. The protocols used between the hub 412 and the managed IoT devices 404 may be proprietary (e.g., at the higher layers of the protocol stack, or even including proprietary PHY and lower layer protocols), and may even employ security measures such as encryption of data, password protection, etc. so as to maintain the managed IoT devices 404 and the hub itself less susceptible to surreptitious communications, MITM attacks, etc.

The web server 406 may communicate with the IoT proxy (hub) 412, such as to "pull" data from, or "push" data to, the IoT end-devices 404. For instance, in one model, the hub periodically polls or receives data from the IoT devices 404, and then reports this aggregated data to the web server 106 via a push/pull mechanism. For instance, the hub 412 may have an outward-facing API (application programming interface) whereby the web server 406 or other process can implement the API function (e.g., a data "GET"). However, such API functionality (and hub access in general) is typically highly restricted, primarily for security and privacy reasons. Given that the hub 412 can "talk" to the managed IoT devices 404, surreptitious access to the hub (and hence IoT devices 404) could result in a host of undesirable consequences, including third parties reprogramming the IoT device 404, obtaining private use or other data from the devices 404 (e.g., how many times a user uses their refrigerator), accessing indigenous features of the device 404 (e.g., turning on the camera function of a user's smart TV so as to be able to see inside the user's premises), corrupting or accessing a user's private data (including changing passwords for devices, so as to lock out the user akin to ransomware), and so forth.

Notwithstanding, one of the most powerful aspects of the "Internet of Things" from an architectural perspective is in fact ubiquitous connectivity; the ability for example of the aforementioned refrigerator to interface with local or remote entities to enhance its performance, save the owner money on electric bills, diagnose/troubleshoot itself, and any other of numerous possible use cases, all militate in favor of high levels of connectivity. Such is also true of adapting products and/or services to particular user traits or habits; for instance, targeted service or advertising provision can be effectively based on user-specific habits or traits (e.g., a person who frequently uses their microwave oven may lean toward microwave-able food items, and may benefit from advertising relating thereto).

Hence, there is a tension between providing pervasive connectivity and information-sharing, and the obvious security and privacy concerns as described above.

As with personal computer technology when in its infancy, IoT technology is still rapidly evolving, and mechanisms for standardization, simplicity and ease of operation ("user experience"), and other desirable attributes are not yet perfected or widely adopted. For example, one manufacturer's IoT-enabled device (e.g., refrigerator) might utilize one communication protocol, have its own device-specific or proprietary software stack (including user interface functions and menus), and its own peculiarities regarding operation, as compared to another device (e.g., a "smart" microwave oven) of another manufacturer. Regardless of whether the "transparent" or "proxy managed" architectures referenced above are used for a particular IoT-enabled device, there is also setup and configuration required to enable data communication, including with other devices within the premises. Also, no unified interface or ability to control is provided, due in large part to the heterogeneity of the various devices and their communication protocols, functions, and data connectivity needs.

Better Solutions Needed

Even with the great advances in wireless data rate, robustness and coverage afforded by extant 4/4.5G (e.g. LTE/LTE-A) and WLAN (and other unlicensed) systems, and corresponding IoT solutions outlined above, significant disabilities still exist, including with regard to providing premises IoT services.

IoT devices of the type previously described are also contemplated to be widely served under 5G NR paradigms (both NSA and SA). As such, mechanisms by which service to these IoT devices (such at an MSO subscriber's premises) can be readily provided and integrated with other e.g., higher bandwidths services such as 5G NR UP (user plane) data, are needed. Such integration may also obviate or overcome many of the difficulties noted above with regard to IoT implementations under the current state of the art; i.e., security concerns, reliability of channel quality, ubiquity of services, ready self-configuration or configuration of IoT functions and devices by service provider entities without significant user involvement, and unified or easily accessible control of multiple heterogeneous IoT devices and services by a user within their premises.

Accordingly, improved apparatus and methods are needed to, inter alia, enable optimized delivery of ultra-high data rate services (both wired and wireless) as well as lower bandwidth IoT services, and which leverage extant network infrastructure (such as a single MSO cable "drop" to a given premises).

SUMMARY

The present disclosure addresses the foregoing needs by providing, inter alia, apparatus and methods for providing optimized delivery of IoT services and control of IoT devices within the served premises, which leverage extant network infrastructure.

In one aspect of the disclosure, an IoT gateway apparatus is disclosed. In one embodiment, the gateway apparatus is served by a 5G-capable enhanced CPE (CPEe) which provides connectivity to an MSO HFC infrastructure. The gateway includes a high-bandwidth data interface with the CPEe (and hence the MSO infrastructure and beyond), as well as a number of heterogeneous IoT wireless interfaces suitable for direct communication with IoT devices within the served premises (e.g., those using 802.15.4, BLE, LoRA, etc. communication protocols and serving a variety of different functions).

In another aspect, computerized apparatus configured to use of one or more air interfaces within a premises for provision of IoT (Internet of Things) data services is disclosed. In one embodiment, the computerized apparatus includes: an RF (Radio Frequency) interface device configured to at least receive RF signals from a radio frequency distribution network; processor apparatus in data communication with the RF interface device; a plurality of radio apparatus in data communication with the processor apparatus; and storage apparatus in data communication with the processor apparatus and comprising at least one computer program, the at least one computer program comprising a plurality of instructions.

In one variant, the plurality of instructions are configured to, when executed by the processor apparatus, cause the computerized apparatus to: process the received RF signals to extract data for respective ones of a plurality of IoT devices in data communication with the computerized apparatus via the plurality of radio apparatus; and utilize the respective radio apparatus to transmit the extracted data to the respective ones of the IoT devices via respective radio frequency (RF) bands, each of the RF bands associated with a respective short-range communications protocol.

In a further embodiment, the computerized apparatus includes: a data interface, the data interface configured to communicate data with an RF interface device of a network; processor apparatus in data communication with the data interface; a plurality of radio apparatus in data communication with the processor apparatus; and storage apparatus in data communication with the processor apparatus and comprising at least one computer program, the at least one computer program comprising a plurality of instructions. In one variant, the instructions are configured to, when executed by the processor apparatus, cause the computerized apparatus to: utilize the plurality of radio apparatus to scan respective ones of radio frequency (RF) bands, each of the RF bands associated with a respective short-range communications protocol, the scans each configured to detect energy associated with a first RF transmitter; based at least on the detection of energy within the respective RF band, cause synchronization with a signal emitted from the corresponding RF transmitter using the respective short-range communications protocol; and based at least on said synchronization with the signal, cause utilization of a designated RF channel of the network.

In a further aspect, a method of utilizing a hybrid fiber coaxial (HFC) radio frequency (RF) network for distribution of radio frequency signals encoding IoT (Internet of Things) data is disclosed. In one embodiment, the method includes: utilizing a first portion of an RF operating spectrum of the hybrid fiber coaxial (HFC) radio frequency network to provide communications compliant with a first wireless technology; and utilizing a second portion of the RF operating spectrum to provide the IoT data via communications compliant with a second wireless technology. The utilizing a second portion of the RF operating spectrum to provide the IoT data via communications compliant with the second wireless technology includes utilizing a computerized gateway apparatus having a plurality of heterogeneous air interfaces for distribution of respective portions of the IoT data to respective IoT devices within a premises served by the computerized gateway.

In another aspect, methods and apparatus for distributing an IoT channel in an RF distribution network are disclosed. In one embodiment, a narrow bandwidth channel is employed within this system architecture that is compatible with 3GPP IoT standards (i.e. eMTC, NB-IoT), and this channel is used for IoT transmissions to standard IoT end devices over a coaxial distribution network. The coax RF distribution network serves as, inter alia, a distributed antenna system for the IoT channel, and the CPE equipment transmits and receives the IoT RF signals on the desired RF frequency channel. In one such variant, the IoT end devices are the connection endpoints, with the CPEe acting in effect as a pass-through device only.

In a further aspect, methods and apparatus for controlling different IoT technology devices using a gateway apparatus are disclosed. In one embodiment, the gateway apparatus includes a 5G NR capable gateway having multiple wireless IoT interfaces, and the disclosed architecture has a unified application layer that operate irrespective of the different access technologies; this application software can be accessed by e.g., a user device with a comparable or counterpart application.

In another aspect, a computerized premises device implementing one or more of the foregoing aspects is disclosed and described. In one embodiment, the device comprises a CPE having 5G NR capability, and is backhauled via an extant coaxial cable drop. In one variant, the device also includes a plurality of IoT wireless interfaces, and provision for connection with an externally mounted antenna for use in communicating with one or more of the external access nodes. In one implementation, the CPE is a CPEe that includes selective filtering apparatus for filtering to isolate prescribed frequency bands transmitted over the coaxial infrastructure and received by the CPEe. In another implementation, frequency upconversion/downconversion apparatus is also used to upconvert/downconvert received RF band signals to a desired carrier frequency consistent with the aforementioned selective filtration.

In another aspect, a mobile computerized device capable of IoT end device control via an IoTG is disclosed and described. In one embodiment, the device comprises a personal or laptop computer. In another embodiment, the device comprises a mobile device (e.g., tablet or smartphone). In another embodiment, the device comprises a computerized "smart" television or rendering device.

In another aspect, an integrated circuit (IC) device implementing one or more of the foregoing aspects is disclosed and described. In one embodiment, the IC device is embodied as a SoC (system on Chip) device. In another embodiment, an ASIC (application specific IC) is used as the basis of the device. In yet another embodiment, a chip set (i.e., multiple ICs used in coordinated fashion) is disclosed. In yet another embodiment, the device comprises a multi-logic block FPGA device.

In another aspect, a computer readable storage apparatus implementing one or more of the foregoing aspects is disclosed and described. In one embodiment, the computer readable apparatus comprises a program memory, or an EEPROM. In another embodiment, the apparatus includes a solid state drive (SSD) or other mass storage device. In another embodiment, the apparatus comprises a USB or other "flash drive" or other such portable removable storage device. In yet another embodiment, the apparatus comprises a "cloud" (network) based storage device which is remote from yet accessible via a computerized user or client electronic device. In yet another embodiment, the apparatus comprises a "fog" (network) based storage device which is distributed across multiple nodes of varying proximity and accessible via a computerized user or client electronic device.

In yet another aspect, a software architecture is disclosed. In one embodiment, the architecture includes a unified application layer process configured to run on an IoT capable CPE (e.g., CPEe or IoTG), and which is accessible via e.g., MSO or external application servers, and mobile devices of the user.

In a further aspect, a method of utilizing a dedicated existing RF channel for other purposes is disclosed. In one embodiment, the channel comprises a 3GPP NSA LTE anchor channel, and the method includes allocating a portion of this channel's bandwidth to a secondary or embedded channel, such as for CPEe control and/or IoT data functions. In one variant, the allocation is dynamic, such that the channel can be used different functions/purposes as a function of time, such as a function of TDD slot timing, LTE channel load, and/or other parameters.

In yet a further aspect, a method of utilizing a dedicated existing RF channel for other purposes is disclosed. In one embodiment, the channel comprises a 3GPP NSA LTE anchor channel, and the method includes allocating a portion of this channel's bandwidth to a secondary or embedded channel on a time-divided or TDD allocation basis, such as for supporting IoT data functions for a variety of different IoT devices in a premises. In one variant, the allocation is dynamic, such that the channel can be used different functions/purposes as a function of time, such as a function of TDD slot timing, LTE channel load, and/or other parameters.

These and other aspects shall become apparent when considered in light of the disclosure provided herein.

BRIEF DESCRIPTION OF THE DRAWINGS

FIG. 10b is a functional block diagram illustrating an exemplary implementation of the standalone IoTG apparatus of FIG. 10a.

FIGS. 14a and 14b illustrate exemplary NSA (non-standalone) architectures over which embedded LTE channels can be utilized for provision of IoT services, according to the present disclosure.

FIG. 17 depicts a frequency domain representation of an exemplary IoT channel within the coax RF distribution network.

FIG. 18 depicts another frequency domain representation wherein the IoT channel occupies an otherwise unused portion of the RF distribution network, and is then frequency translated (upconverted/downconverted) to the desired carrier frequency.

Figure 1:
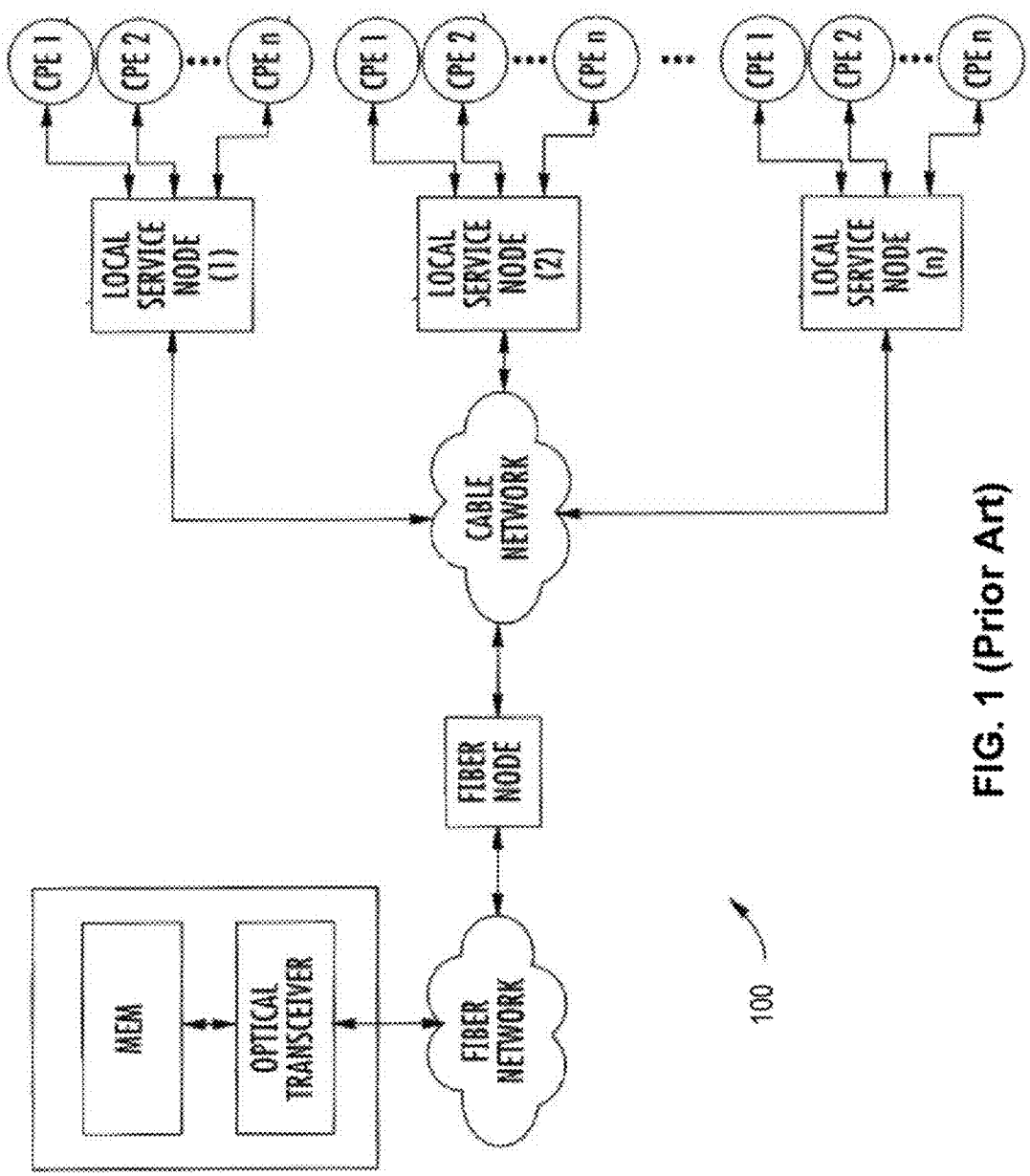
FIGS. 1 and 2 are a functional block diagrams illustrating a typical prior art managed (e.g., cable) content delivery network architecture.

All figures © Copyright 2017-2019 Charter Communications Operating, LLC. All rights reserved.

DETAILED DESCRIPTION

Reference is now made to the drawings wherein like numerals refer to like parts throughout.

As used herein, the term "application" (or "app") refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could include a downloadable Java Xlet™ that runs within the JavaTV™ environment.

As used herein, the term "central unit" or "CU" refers without limitation to a centralized logical node within a wireless network infrastructure. For example, a CU might be embodied as a 5G/NR gNB Central Unit (gNB-CU), which is a logical node hosting RRC, SDAP and PDCP protocols of the gNB or RRC and PDCP protocols of the en-gNB that controls the operation of one or more gNB-DUs, and which terminates the F1 interface connected with one or more DUs (e.g., gNB-DUs) defined below.

As used herein, the terms "client device" or "user device" or "UE" include, but are not limited to, set-top boxes (e.g., DSTBs), gateways, modems, personal computers (PCs), and minicomputers, whether desktop, laptop, or otherwise, and mobile devices such as handheld computers, PDAs, personal media devices (PMDs), tablets, "phablets", smartphones, and vehicle infotainment systems or portions thereof.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

As used herein, the term "distributed unit" or "DU" refers without limitation to a distributed logical node within a wireless network infrastructure. For example, a DU might be embodied as a 5G/NR gNB Distributed Unit (gNB-DU), which is a logical node hosting RLC, MAC and PHY layers of the gNB or en-gNB, and its operation is partly controlled by gNB-CU (referenced above). One gNB-DU supports one or multiple cells, yet a given cell is supported by only one gNB-DU. The gNB-DU terminates the F1 interface connected with the gNB-CU.

As used herein, the term "DOCSIS" refers to any of the existing or planned variants of the Data Over Cable Services Interface Specification, including for example DOCSIS versions 1.0, 1.1, 2.0, 3.0 and 3.1.

As used herein, the term "headend" or "backend" refers generally to a networked system controlled by an operator (e.g., an MSO) that distributes programming to MSO clientele using client devices, or provides other services such as high-speed data delivery and backhaul.

As used herein, the terms "Internet" and "internet" are used interchangeably to refer to inter-networks including, without limitation, the Internet. Other common examples include but are not limited to: a network of external servers, "cloud" entities (such as memory or storage not local to a device, storage generally accessible at any time via a network connection, and the like), service nodes, access points, controller devices, client devices, etc.

As used herein, the term "IoT device" refers without limitation to electronic devices having one or more primary functions and being configured to provide and/or receive data via one or more communication protocols. Examples of IoT devices include security or monitoring systems, appliances, consumer electronics, vehicles, infrastructure (e.g., traffic signaling systems), and medical devices, as well as receivers, hubs, proxy devices, or gateways used in association therewith.

As used herein, the term "IoT network" refers without limitation to any logical, physical, or topological connection or aggregation of two or more IoT devices (or one IoT device and one or more non-IoT devices). Examples of IoT networks include networks of one or more IoT devices arranged in a peer-to-peer (P2P), star, ring, tree, mesh, master-slave, and coordinator-device topology.

As used herein, the term "LTE" refers to, without limitation and as applicable, any of the variants or Releases of the Long-Term Evolution wireless communication standard, including LTE-U (Long Term Evolution in unlicensed spectrum), LTE-LAA (Long Term Evolution, Licensed Assisted Access), LTE-A (LTE Advanced), 4G LTE, WiMAX, VoLTE (Voice over LTE), and other wireless data standards.

As used herein the terms "5G" and "New Radio (NR)" refer without limitation to apparatus, methods or systems compliant with 3GPP Release 15, and any modifications, subsequent Releases, or amendments or supplements thereto which are directed to New Radio technology, whether licensed or unlicensed.

As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), 3D memory, and PSRAM.

As used herein, the terms "microprocessor" and "processor" or "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "MNO" or "mobile network operator" refer to a cellular, satellite phone, WMAN (e.g., 802.16), or other network service provider having infrastructure required to deliver services including without limitation voice and data over those mediums. The term "MNO" as used herein is further intended to include MVNOs, MNVAs, and MVNEs.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications technologies or networking protocols (e.g., SONET, DOCSIS, IEEE Std. 802.3, ATM, X.25, Frame Relay, 3GPP, 3GPP2, LTE/LTE-A/LTE-U/LTE-LAA, 5GNR, WAP, SIP, UDP, FTP, RTP/RTCP, H.323, etc.).

As used herein the terms "5G" and "New Radio (NR)" refer without limitation to apparatus, methods or systems compliant with 3GPP Release 15, and any modifications, subsequent Releases, or amendments or supplements thereto which are directed to New Radio technology, whether licensed or unlicensed.

As used herein, the term "QAM" refers to modulation schemes used for sending signals over e.g., cable or other networks. Such modulation scheme might use any constellation level (e.g. QPSK, 16-QAM, 64-QAM, 256-QAM, etc.) depending on details of a network. A QAM may also refer to a physical channel modulated according to the schemes.

As used herein, the term "server" refers to any computerized component, system or entity regardless of form which is adapted to provide data, files, applications, content, or other services to one or more other devices or entities on a computer network.

As used herein, the term "storage" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "Wi-Fi" refers to, without limitation and as applicable, any of the variants of IEEE Std. 802.11 or related standards including 802.11 a/b/g/n/s/v/ac/ax, 802.11-2012/2013 or 802.11-2016, as well as Wi-Fi Direct (including inter alia, the "Wi-Fi Peer-to-Peer (P2P) Specification", incorporated herein by reference in its entirety).

Overview

In one exemplary aspect, the present disclosure provides improved architectures, methods and apparatus for providing IoT data services which, inter alia, leverage existing managed network (e.g., cable network) infrastructure, while also providing support and in some cases utilizing the 3GPP requisite "NSA" functionality. The disclosed architectures and apparatus enable, among other things, delivery of IoT data services in a unified manner via a common "portal" or IoT gateway (IoTG) which may be both remotely accessed by a user, and remotely controlled/configured by the host network operator (e.g., MSO).

Also disclosed are the ability to control nodes within the network (including the enhanced CPEe endpoints described herein) via embedded control channels, some of which "repurpose" requisite 3GPP NSA infrastructure such as LTE anchor channels. In one variant, the premises devices include RF-enabled receivers (enhanced consumer premises equipment, or CPEe) configured to receive (and transmit) OFDM waveforms via a coaxial cable drop to the premises, and interface with the aforementioned IoTG to enable provision of both 5G high-speed data services and lower bandwidth IoT services to the premises, all via a single coaxial cable drop in the exemplary embodiment.

In one approach, the NSA LTE channels required for transmission of IoT user data (and control/management data) to one or more premises devices are leveraged, with the premises devices include RF-enabled IoT end user devices configured to receive (and transmit) wireless signals to and from the IoTG at the premises, such as via one or more IoT wireless interfaces such as BLE, LoRA or IEEE Std. 802.15.4 interfaces. In this fashion, heterogeneous interfaces (e.g., 3GPP and non-3GPP) commonly found in IoT devices can be aggregated via a common MSO interface to the HFC infrastructure (and beyond).

In one variant, the premises devices include RF-enabled receivers configured to receive (and transmit) OFDM waveforms via the coaxial cable drop to the premises, and this acts in effect as a "distributed antenna system" for the IoT devices at the premises. IoT traffic may be positioned e.g., at an unused portion of the RF spectrum carried by the coaxial distribution network, and depending on the available spectrum at the premises used by the IoT user devices, either upconverted/downconverted to a desired carrier (and radiated at the premises) and distributed by the IoT gateway, or simply "passed through" at the transmission frequency by the receiving CPEe.

Detailed Description of Exemplary Embodiments

Exemplary embodiments of the apparatus and methods of the present disclosure are now described in detail. While these exemplary embodiments are described in the context of the previously mentioned wireless access nodes (e.g., gNBs and eNBs) associated with or supported at least in part by a managed network of a service provider (e.g., MSO), other types of radio access technologies ("RATs"), other types of networks and architectures that are configured to deliver digital data (e.g., text, images, games, software applications, video and/or audio) may be used consistent with the present disclosure. Such other networks or architectures may be broadband, narrowband, or otherwise, the following therefore being merely exemplary in nature.

It will also be appreciated that while described generally in the context of a network providing service to a customer or consumer or end user or subscriber (i.e., within a prescribed service area, venue, or other type of premises), the present disclosure may be readily adapted to other types of environments including, e.g., commercial/retail, or enterprise domain (e.g., businesses), or even governmental uses. Yet other applications are possible.

Other features and advantages of the present disclosure will immediately be recognized by persons of ordinary skill in the art with reference to the attached drawings and detailed description of exemplary embodiments as given below.

Service Provider Network Architecture—

Figure 5:
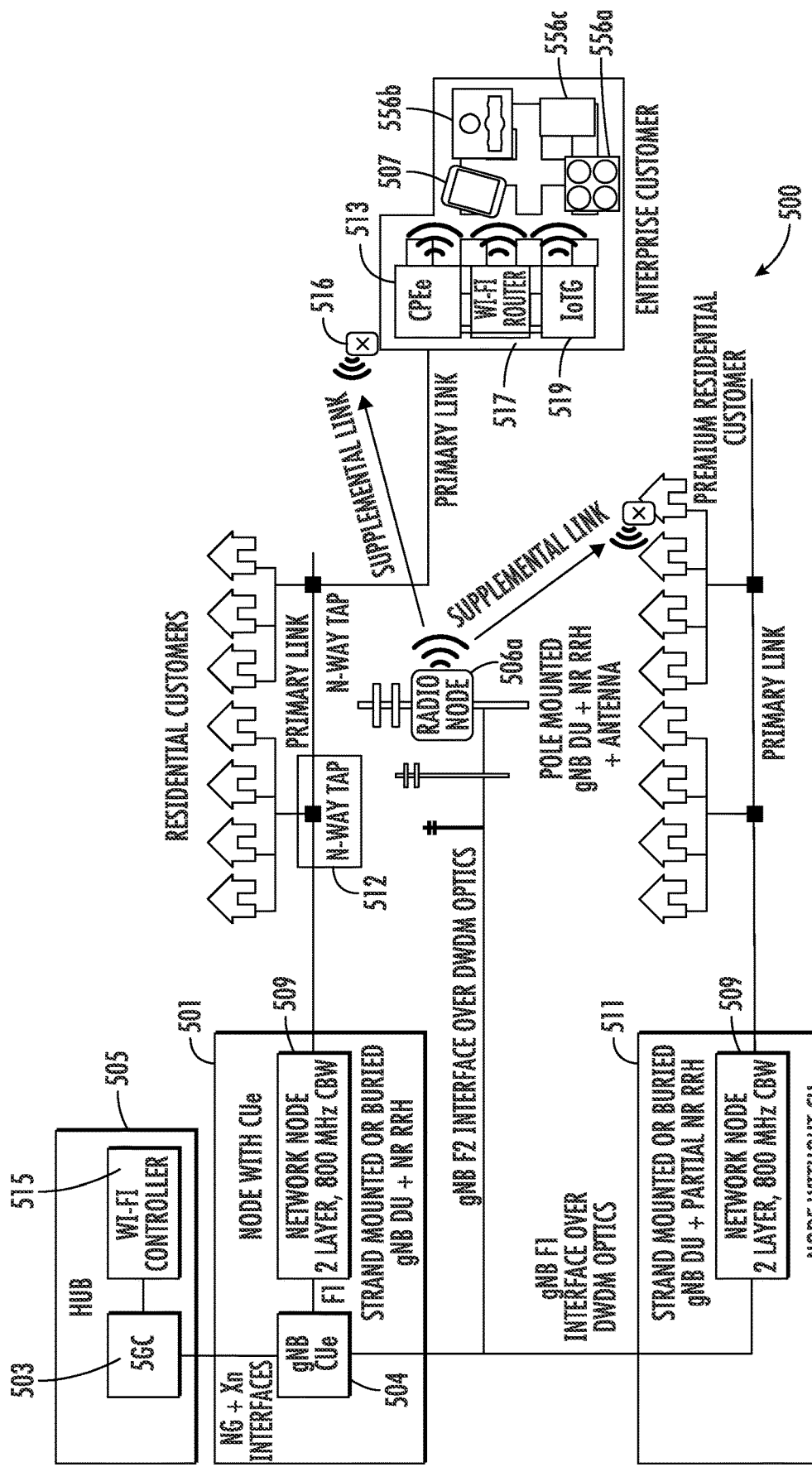
FIG. 5 is a functional block diagram of an exemplary MSO network architecture comprising various features described herein.

Referring now to FIG. 5, one embodiment of an enhanced service provider network architecture 500 is shown and described in detail.

As illustrated, the architecture 500 includes one or more hubs 505 within the MSO network (e.g., whether near edge portions of the network, or further towards the core), including a 5G NR core (5GC) 503. The hub 505 includes a WLAN controller process 515, and services one or more "enhanced" nodes 501, which each include a gNB CUe 504 and a network radio node 509, described in greater detail below. The nodes 501 utilize HFC infrastructure, including N-way taps 512 to deliver RF waveforms to the various served premises (including the enhanced CPE or CPEe) 513 and ultimately the user device(s) 507 (e.g., 3GPP-enabled UEs).

Also serviced by the node 501 are one or more non-CUe enabled nodes 511 including 4G/4.5G/5G enabled network radio nodes 509, which service additional premises as shown.

In the illustrated embodiment, the nodes 501, 511 are backhauled by optical fiber, although this is merely illustrative, as other types of backhauls including e.g., high-bandwidth wireless may be used consistent with the present disclosure.

Similarly, one or more pole-mounted radio nodes 506*a* (and potentially other mobile client devices enabled for DU-type functionalities; e.g., authorized to receive data from another node or client device, and broadcast/receive signals according to the user domain frequency band) are backhauled to the MSO network via optical fiber (or other medium); these nodes 506 provide, inter alia, supplemental capacity/coverage for both indoor and outdoor (and mobility) scenarios as described in greater detail in co-owned and co-pending U.S. patent application Ser. No. 16/261,234 entitled "APPARATUS AND METHODS FOR ENABLING MOBILITY OF A USER DEVICE IN AN ENHANCED WIRELESS NETWORK," previously incorporated herein.

In one exemplary embodiment, radio nodes 506*a* are located on an "edge" of a network (i.e., functioning as a network node proximate to the premises and away from the core), and are enabled for 4G and/or 5G communications as described in greater detail below. A given DUe that provides 5G coverage to the premises thereby supplements the ultra-low latency and high-bandwidth services by the CUe 504. Moreover, as described further below, the CUe may be logically and functionally grouped with one or more DUe's 506 to together make up a gNB. Prescribed unlicensed and/or licensed frequency bands are utilized by the nodes 506*a*. For example, in one implementation, the disclosed solution supports one or more prescribed subsets of NR and NR-U band combinations as defined by 3GPP, depending on the particular application(s) anticipated by the installation and the locale in which it is installed (including for example whether other operators or carriers such as MNOs are utilizing licensed spectrum within the prescribed area, and which frequency bands such operators are using). It will also be appreciated that so-called "quasi-licensed" spectrum (such as for instance that within the 3.55-3.70 GHz CBRS bands in the U.S.) may be utilized consistent with the methods and apparatus described herein.

In one variant, as noted above, mobile devices may function as intermediary nodes or transient "jumping points." Such devices may be those owned by subscribers of the hub or core providing the managed network services who have opted into (or not opted out) of use of their eligible devices as nodes. In other variants, devices owned by subscribers of a different core (e.g., managed by a different entity) may be included in the network of nodes. As an aside, such networking schemes are often generally referred to as "fog networking," a decentralized computing infrastructure in which data, computations, storage, and applications are distributed in an efficient manner between the data source and the destination (e.g., a "cloud" server, premises equipment, end user device) as opposed to a more highly centralized architecture.

A Wi-Fi router device 517 is also present in the served premises to provide WLAN coverage, in conjunction with the controller 515 at the hub 505. The centralized Wi-Fi controller 515 is also utilized in the exemplary architecture 500 for tight-interworking and better mobility between the 3GPP and Wi-Fi access technologies where the Wi-Fi router is either integrated with the consumer premises equipment (e.g., enhanced CPE or CPEe) or connected to it. In various embodiments, one or more intermediary nodes (e.g., radio node 506*a*) located between the CUe 504 and the served premises are utilized to provide additional coverage and bandwidth to the premises. Then, mobility between the 3GPP and Wi-Fi channels for any user can be triggered for the best data throughput, such as based on (i) estimation of the RF quality of the Wi-Fi channel toward the user, and/or (ii) the degree of congestion of the Wi-Fi router, and not just the Wi-Fi received signal strength indicators (RSSI) measured at the mobile device, the latter which may not be representative of the service quality that can be obtained by the user. Additional detail on the foregoing Wi-Fi related aspects is also described in greater detail in co-owned and co-pending U.S. patent application Ser. No. 16/261,234 entitled "APPARATUS AND METHODS FOR ENABLING MOBILITY OF A USER DEVICE IN AN ENHANCED WIRELESS NETWORK," previously incorporated herein.

The architecture 500 also includes an IoTG (IoT gateway) functionality, as described in greater detail subsequently herein. The IoTG 519 is in data communication with the CPEe 513 (and as discussed below, may also be integrated therein to varying degrees depending on the particular application), as well as a plurality of IoT-enabled end devices 556*a-c* via for example the various air interfaces of the IoTG 519.

The MSO network architecture 500 of FIG. 5 is particularly useful for the delivery of packetized content (e.g., encoded digital content carried within a packet or frame structure or protocol) consistent with the various aspects of the present disclosure. In addition to on-demand and broadcast content (e.g., live video programming), the system of FIG. 5 may deliver Internet data and OTT (over-the-top) services to the end users (including those of the DUe's 506*a*) via the Internet protocol (IP) and TCP (i.e., over the 5G radio bearer), although other protocols and transport mechanisms of the type well known in the digital communication art may be substituted.

The architecture 500 of FIG. 5 further provides a consistent and seamless user experience with IPTV over both wireline and wireless interfaces. Additionally, in the IP paradigm, dynamic switching between unicast delivery and multicast/broadcast is used based on e.g., local demand. For instance, where a single user (device) is requesting content, an IP unicast can be utilized. For multiple devices (i.e., with multiple different IP addresses, such as e.g., different premises), multicast can be utilized. This approach provides for efficient and responsive switching of delivery and obviates other more equipment/CAPEX-intensive approaches.

Moreover, the architecture can be used for both broadband data delivery as well as "content" (e.g., movie channels) simultaneously, and obviates much of the prior separate infrastructure for "in band" and DOCSIS (and OOB) transport. Specifically, with DOCSIS (even FDX DOCSIS), bandwidth is often allocated for video QAMs, and a "split" is hard-coded for downstream and upstream data traffic. This hard split is typically implemented across all network elements—even amplifiers. In contrast, under the exemplary configuration of the architecture disclosed herein, effectively all traffic traversing the architecture is IP-based, and hence in many cases there is no need to allocate QAMs and frequency splits for different program or data streams. This "all-IP" approach enables flexible use of the available bandwidth on the transmission medium for all applications dynamically, based on for instance the demand of each such application at any given period or point in time.

In certain embodiments, the service provider network 500 also advantageously permits the aggregation and/or analysis of subscriber- or account-specific data (including inter alia, correlation of particular CUe or DUe or E-UTRAN eNB/femtocell devices associated with such subscriber or accounts) as part of the provision of services to users under the exemplary delivery models described herein. As but one example, device-specific IDs (e.g., gNB ID, Global gNB Identifier, NCGI, MAC address or the like) can be cross-correlated to MSO subscriber data maintained at e.g., the network head end(s) 507 so as to permit or at least facilitate, among other things, (i) user/device authentication to the MSO network; (ii) correlation of aspects of the area, premises or venue where service is provided to particular subscriber capabilities, demographics, or equipment locations, such as for delivery of location-specific or targeted content or advertising or 5G "slicing" configuration or delivery; and (iii) determination of subscription level, and hence subscriber privileges and access to certain services as applicable.

Moreover, device profiles for particular devices (e.g., 3GPP 5G NR and WLAN-enabled UE, or the CPEe 513 and any associated antenna 516, etc.) can be maintained by the MSO, such that the MSO (or its automated proxy processes) can model the device for wireless or other capabilities. For instance, one (non-supplemented) CPEe 513 may be modeled as having bandwidth capability of X Gbps, while another premises' supplemented CPEe may be modeled as having bandwidth capability of X+Y Gbps, and hence the latter may be eligible for services or 3GPP NR "slices" that are not available to the former.

Figure 5A:
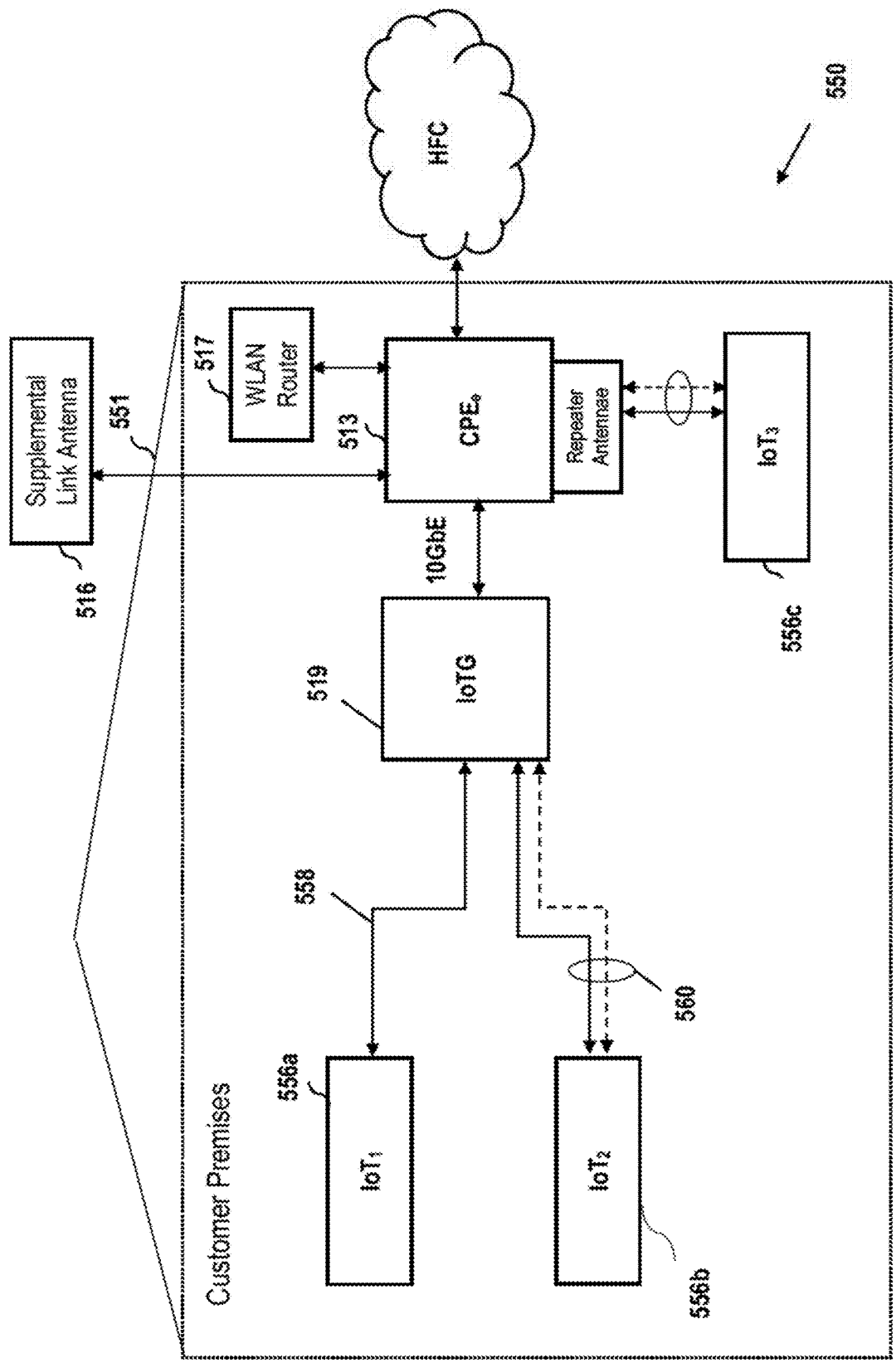
FIG. 5a is a functional block diagram of a first exemplary premises network architecture comprising the IoTG (IoT Gateway) described herein, useful with the MSO architecture 500 of FIG. 5.

Referring now to FIG. 5a, one embodiment of a premises side architecture 550 is shown and described. As illustrated, the architecture 550 is disposed at a premises 551, such as at a customer home or enterprise. The architecture includes a CPEe 513 serviced via both (i) a coaxial cable drop from the host HFC network, (ii) a supplemental RF link 516 of the type previously described with respect to FIG. 5, and IoTG 519. Also included is a WLAN router/interface 517.

Also served by the IoTG 519 are three IoT devices 556 (556a, 556b, and 556c). The first IoT device 556a is shown as having user plane data connectivity only (e.g., via a wired interface such as Cat-5, USB, etc., or wireless); i.e., the IoTG or CPEe 513 acts as the logical 3GPP endpoint "proxy" for the IoT device 556a, and recovers and transacts the user plane data to/from the IoT device 556a. This allows, inter alia, the IoT device 556a to be highly simplified, in that it does not need to have an MSO/3GPP "stack" or related functionality so that the IoT device itself can act as a 3GPP endpoint.

In contrast, the second IoT device 556b is shown as having user plane data connectivity and control plane connectivity (e.g., via a wired interface such as Cat-5, USB, or wireless); i.e., the IoTG 519 or CPEe 513 acts as merely a logical pass-through for the IoT device 556b (contrast: frequency pass-through as described elsewhere herein), and transacts the user plane and control plane data to/from the IoT device 556b without implementing these functions itself. This allows, inter alia, the IoT device 556b to be controlled remotely, and implement greater functionality than could be achieved using the first IoT device 556a. The second IoT device 556b also includes a 3GPP (or non-3GPP) IoT stack such that it can act as the logical endpoint for the IoT data channels being terminated at the premises 551; the CPEe upconverts/downconverts the received waveforms from the HFC network to the required IoT device 556b carrier (e.g., consistent with an RF wireline or air interface maintained by the second IoT device 556b), and distributes them via the IoTG 519. The IoT device 556b demodulates and recovers the user and control plane data indigenously.

The third IoT device 556c is shown as having user plane data connectivity and control plane connectivity (e.g., via a wired interface such as Cat-5, USB, or wireless); i.e., the CPEe 513 acts as merely a logical pass-through for the IoT device 556c, as well as a frequency pass-through as described elsewhere herein, and transacts the user plane and control plane data to/from the IoT device 556c without implementing these functions itself for the IoT device. This allows, inter alia, the IoT device 556c to be controlled remotely, and implement greater functionality than could be achieved using the first IoT device 556a. The third IoT device 556c again includes a 3GPP (or non-3GPP) IoT stack such that it can act as the logical endpoint for the IoT data channels being terminated at the premises 551; however, rather than the CPEe upconverting/downconverting the received waveforms from the HFC network to the required IoT device 556c carrier (e.g., consistent with an RF wireline or air interface maintained by the third IoT device 556c), and CPEe 513 merely acts as an RF pass-through of the IoT channel(s) which are transmitted by the transmitting node 509 at carrier to the IoT device 556c, via the repeater antennae and port of the CPEe (see discussion of FIGS. 9 and 9a below). The third IoT device 556c demodulates and recovers the user and control plane data indigenously.

The architecture 550 of FIG. 5a advantageously allows, inter alia, separate placement of the WLAN router, IoTG, and CPEe (with repeaters) within the premises so as to optimize their operation (e.g., so as to put each in the best position relative to served user devices). It will also be appreciated that wireless links of sufficient bandwidth between the CPEe 513 and the IoTG 519 and/or WLAN router 517 may also be utilized for backhaul (e.g., so as to obviate wires or cables between the devices). For instance, the 5G premises user band and associated air interface of the CPEe may be used as the backhaul for these other distributed devices.

Figure 5B:
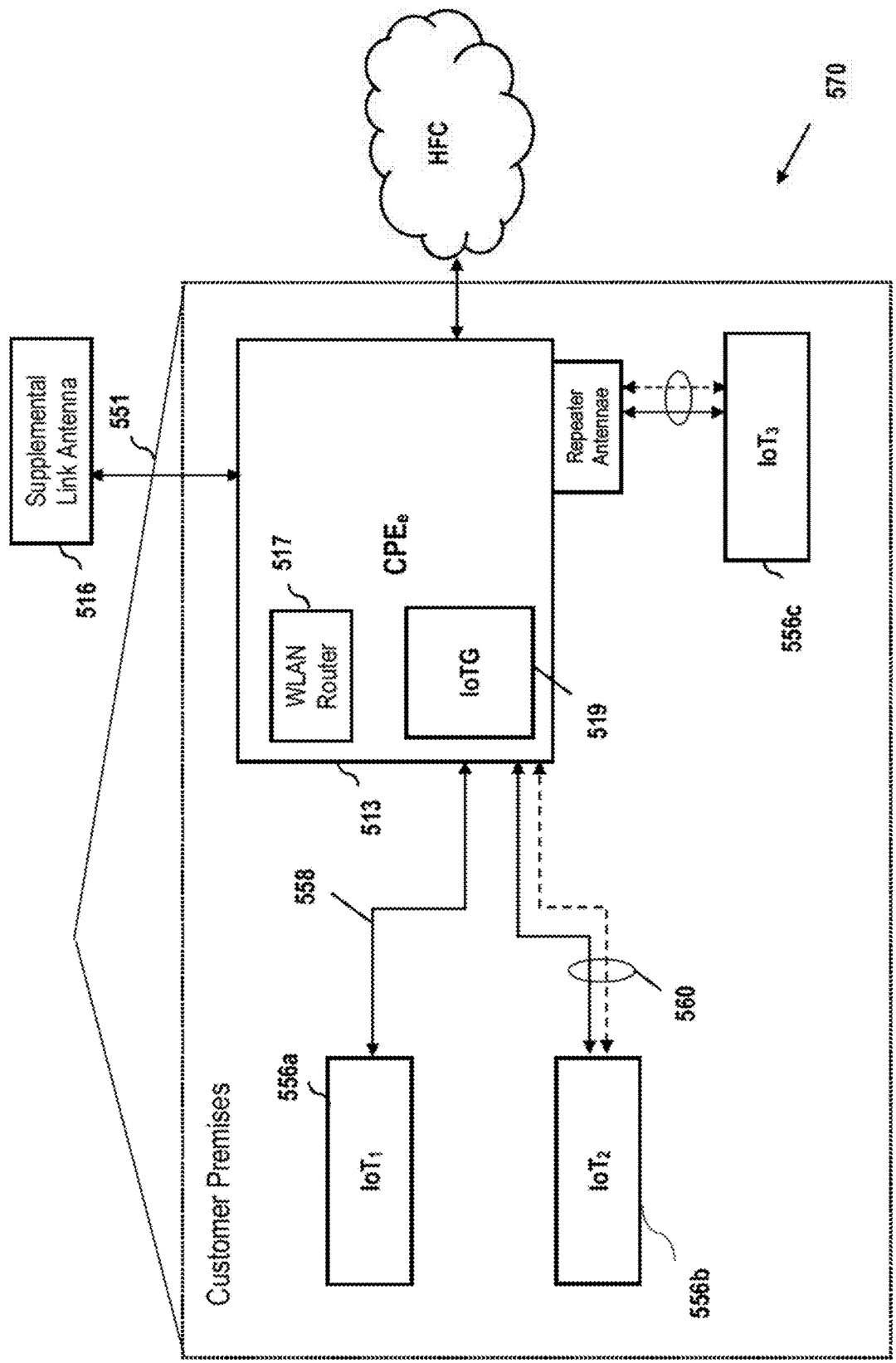
FIG. 5b is a functional block diagram of a second exemplary premises network architecture comprising the IoTG (IoT Gateway) described herein combined in a common form factor with the enhanced CPE (CPEe) and WLAN router, useful with the MSO architecture 500 of FIG. 5.

FIG. 5b is a functional block diagram of a second exemplary premises network architecture 570 comprising the IoTG 519 described herein combined in a common form factor with the CPEe 513 and WLAN router 517, useful with the MSO architecture 500 of FIG. 5. This approach has the advantage of allowing a "one box" solution for a given premises providing each of: (i) high-speed 5G data services; (ii) 5G mobility, (iii) WLAN connectivity, and (iv) PAN (e.g., IoT) data connectivity and management.

See the discussions of FIGS. 17-21 below for various schemes for RF spectrum allocation useful with the architecture of FIGS. 5-5b.

As a brief aside, the 5G technology defines a number of network functions (NFs), which include the following:

1. Access and Mobility Management function (AMF)—Provides for termination of NAS signaling, NAS integrity protection and ciphering, registration and connection and mobility management, access authentication and authorization, and security context management. The AMF has functions analogous to part of the MME functionality of the prior Evolved Packet Core (EPC).

2. Application Function (AF)—Manages application influence on traffic routing, accessing NEF, interaction with policy framework for policy control. The NR AF is comparable to the AF in EPC.

3. Authentication Server Function (AUSF)—Provides authentication server functionality. The AUSF is similar to portions of the HSS from EPC.

4. Network Exposure function (NEF)—Manages exposure of capabilities and events, secure provision of information from external applications to 3GPP network, translation of internal/external information. The NEF is a wholly new entity as compared to EPC.

5. Network Slice Selection Function (NSSF)—Provides for selection of the Network Slice instances to serve the UE, determining the allowed NSSAI, determining the AMF set to be used to serve the UE. The NSSF is a wholly new entity as compared to EPC.

6. NF Repository function (NRF)—Supports the service discovery function, maintains NF profile and available NF instances The NRF is a wholly new entity as compared to EPC.

7. Policy Control Function (PCF)—Provides a unified policy framework, providing policy rules to CP functions, and access subscription information for policy decisions in UDR. The PCF has part of the PCRF functionality from EPC.

8. Session Management function (SMF)—Provides for session management (session establishment, modification, release), IP address allocation & management for UEs, DHCP functions, termination of NAS signaling related to session management, DL data notification, traffic steering configuration for UPF for proper traffic routing. The SMF includes portions of the MME and PGW functionality from EPC.

9. Unified Data Management (UDM)—Supports generation of Authentication and Key Agreement (AKA) credentials, user identification handling, access authorization, subscription management. This comprises a portion of HSS functionality from EPC.

10. User plane function (UPF)—The UPF provides packet routing & forwarding, packet inspection, QoS handling, and also acts as an external PDU session point of interconnect to Data Network (DN). The UPF may also act as an anchor point for intra-RAT and inter-RAT mobility. The UPF includes some of the prior SGW and PGW functionality from EPC.

Within the 5G NR architecture, the control plane (CP) and user plane (UP) functionality is divided within the core network or NGC (Next Generation Core). For instance, the 5G UPF discussed above supports UP data processing, while other nodes support CP functions. This divided approach advantageously allows for, inter alia, independent scaling of CP and UP functions. Additionally, network slices can be tailored to support different services, such as for instance those described herein with respect to session handover between e.g., WLAN and 3GPP NR, and supplemental links to the CPEe.

In addition to the NFs described above, a number of different identifiers are used in the NG-RAN architecture, including those of UE's and for other network entities, and may be assigned to various entities described herein. Specifically:

the AMF Identifier (AMF ID) is used to identify an AMF (Access and Mobility Management Function);

the NR Cell Global Identifier (NCGI), is used to identify NR cells globally, and is constructed from the PLMN identity to which the cell belongs, and the NR Cell Identity (NCI) of the cell;

the gNB Identifier (gNB ID) is used to identify gNBs within a PLMN, and is contained within the NCI of its cells;

the Global gNB ID, which is used to identify gNBs globally, and is constructed from the PLMN identity to which the gNB belongs, and the gNB ID;

the Tracking Area identity (TAI), which is used to identify tracking areas, and is constructed from the PLMN identity to which the tracking area belongs, and the TAC (Tracking Area Code) of the Tracking Area; and the Single Network Slice Selection Assistance information (S-NSSAI), which is used to identify a network slice.

Hence, depending on what data is useful to the MSO or its customers, various portions of the foregoing can be associated and stored to particular gNB "clients" or their components being backhauled by the MSO network.

Distributed gNB Architectures

In the context of FIG. 5, the DUe's described herein may assume any number of forms and functions relative to the enhanced CPE (CPEe) 513 and the radio node 506a (e.g., pole mounted external device). Recognizing that generally speaking, "DU" and "CU" refer to 3GPP standardized features and functions, these features and functions can, so long as supported in the architecture 500 of FIG. 5, be implemented in any myriad number of ways and/or locations. Moreover, enhancements and/or extensions to these components (herein referred to as CUe and DUe) and their functions provided by the present disclosure may likewise be distributed at various nodes and locations throughout the architecture 500, the illustrated locations and dispositions being merely exemplary.

Notably, the "enhanced" NR-based gNB architecture utilizes existing infrastructure (e.g., at least a portion of the extant HFC cabling controlled by an MSO such as the Assignee hereof) while expanding the frequency spectrum used for signal propagation within the infrastructure (e.g., 1.6 GHz in total bandwidth). Moreover, access points or nodes installed at venues or premises, especially "edge"-based nodes (at least some of which may be controlled, licensed, installed, or leased by the MSO), may be leveraged to deliver 5G-based services to a subscriber of the 5G NR Core (e.g., 503). Fog-based networking made possible through this leveraged infrastructure allows the subscriber to access receive and maintain 5G service whether indoor or outdoor, and in fact, even while the subscriber is changing locations, e.g., moving indoor to outdoor, outdoor to indoor, between servicing nodes indoors (e.g., within a large house, office or housing complex, or venue), and between servicing nodes outdoors. Other nodes may be leveraged, including other 5G-enabled mobile devices that have opted into (or not opted out of) participating in the fog network. In effect, the ubiquity of mobile devices creates a peer-to-peer network for distribution and delivery of ultra-low-latency (e.g., 1 ms ping) and ultra-high-speed (e.g., 10 Gbps or higher) connectivity. In many cases, utilizing one or more participating peer devices results in faster service (e.g., greatly reduced ping) by obviating the need to reach a cell tower, a server, or a gateway that is resident in the backend portion of a cloud-type network.

Notably, the principles described further below enable a subscriber to maintain the 5G service (or any other 3GPP- or IEEE 802.11-based connectivity) without the signals drop-ping or disconnecting between sessions. In other words, "seamless" transfer of connectivity between nodes (akin to handovers) is made possible despite a difference in at least a portion of wireless data communications standards that may be utilized by the nodes. For instance, a CPEe and a DUe disposed near the "edge" of the network (i.e., near consumer premises) may each be capable of communicating data with, e.g., a mobile user device, via either or both 3GPP- and IEEE 802.11-based protocols. A subscriber, however, would not require a reconnection process with a different base station or modem (as opposed to, e.g., establishing connection to cellular data services when outside the range of a Wi-Fi AP, or connecting back to the Wi-Fi AP when entering the premises), invoking a "seamless" feel and further increasing the user experience.

By virtue of the way the frequency spectra used in existing infrastructure is accessed, such enhanced gNB architecture provides salient advantages to a subscriber thereof, such as improved connectivity speeds (e.g., data rates, response times, latency) and seamless mobility of user devices, thus significantly improving user experience relative to currently available services. Further, the operator of such an architecture may advantageously save costs of connecting new cables and pipes across long distances by obviating the need to overhaul the infrastructure itself.

Figure 6A:
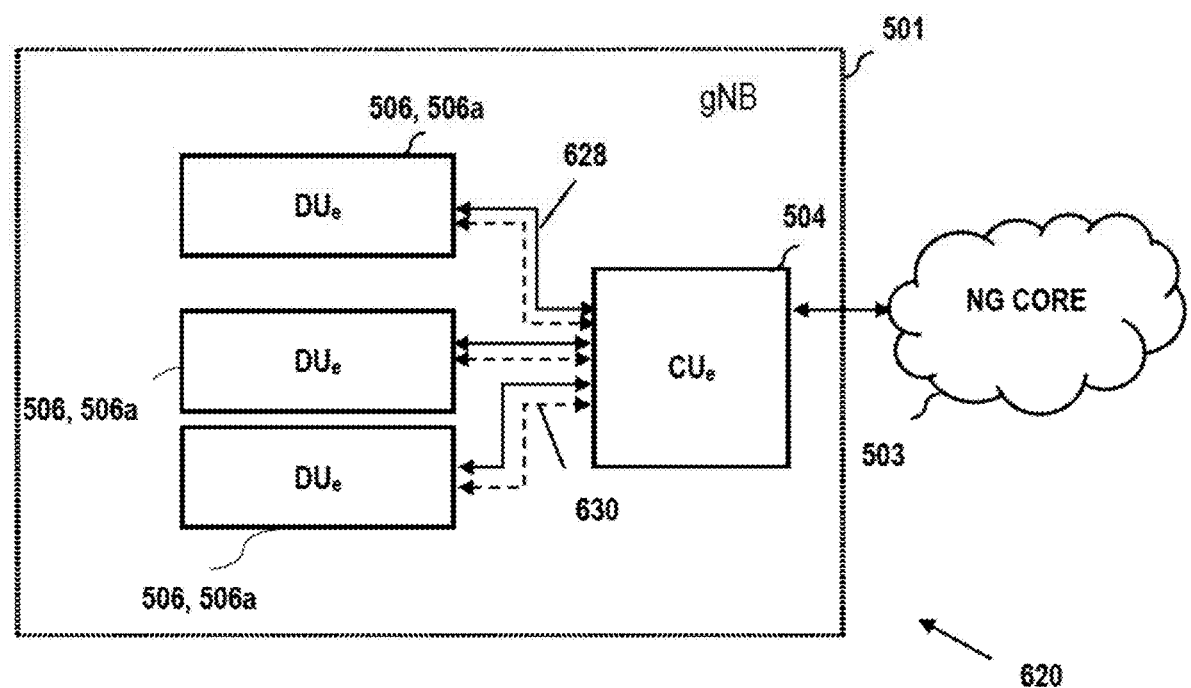
FIG. 6a is a functional block diagram of one exemplary embodiment of a gNB architecture including CUe and multiple DUes in standalone (SA) configuration, according to the present disclosure.

Accordingly, referring now to FIGS. 6a-6f, various embodiments of the distributed (CUe/DUe) gNB architecture according to the present disclosure are described. As shown in FIG. 6a, a first architecture 620 includes a gNB 501 having an enhanced CU (CUe) 504 and a plurality of enhanced DUs (DUe) 506, 506a. As described in greater detail subsequently herein, these enhanced entities are enabled to permit inter-process signaling and high data rate, low latency services, whether autonomously or under control of another logical entity (such as the NG Core 503 with which the gNB communicates, or components thereof), as well as unified mobility and IoT services.

The individual DUe's 506, 506a in FIG. 6a communicate data and messaging with the CUe 504 via interposed physical communication interfaces 628 and logical interfaces 630. As previously described, such interfaces may include a user plane and control plane, and be embodied in prescribed protocols such as F1AP. Operation of each DUe and CUe are described in greater detail subsequently herein; however, it will be noted that in this embodiment, one CUe 504 is associated with one or more DUe's 506, 506a, yet a given DUe is only associated with a single CUe. Likewise, the single CUe 504 is communicative with a single NG Core 503, such as that operated by an MSO. Each NG Core may have multiple gNBs 501 associated therewith (e.g., of the type shown in FIG. 5).

Figure 6B:
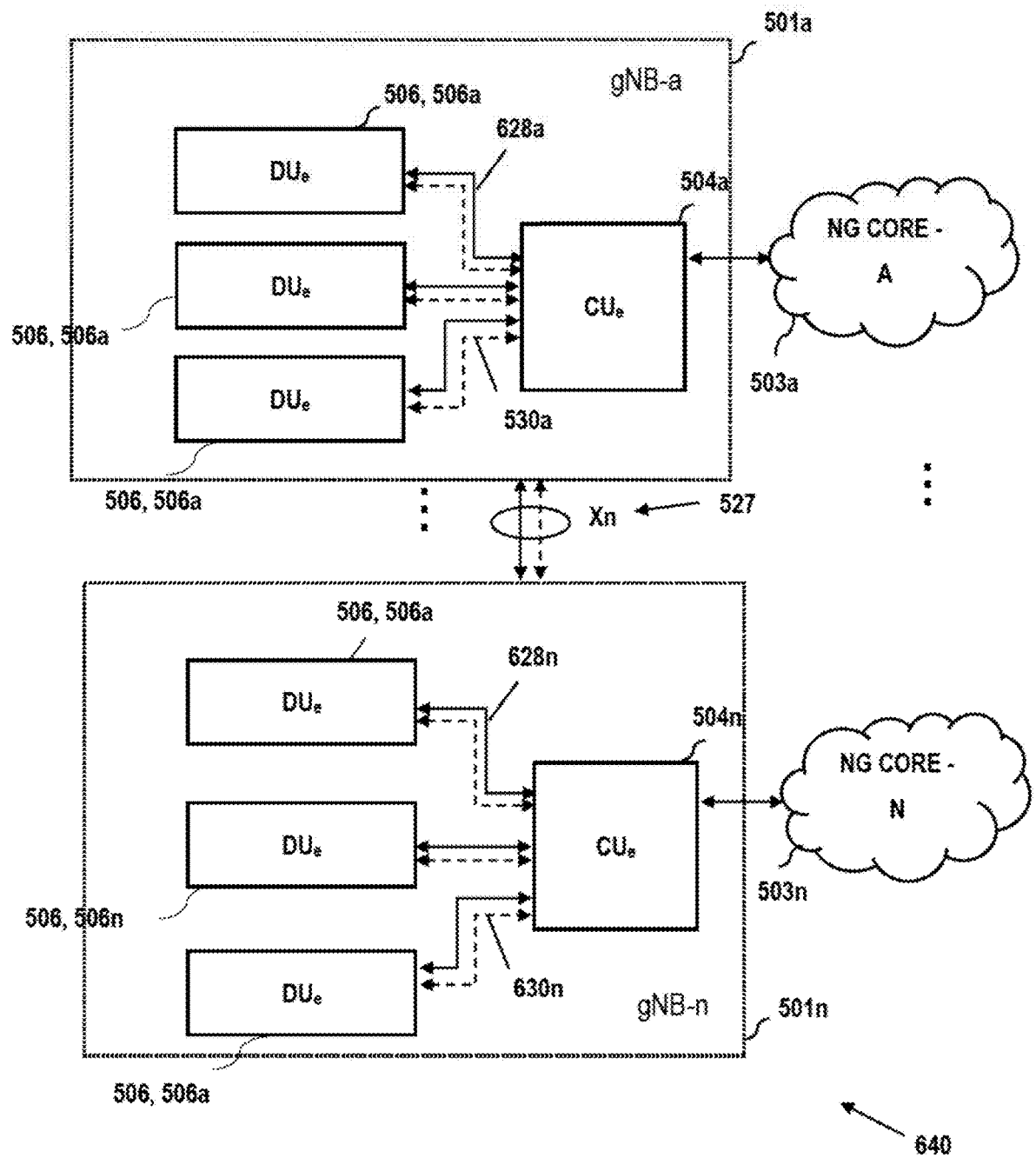
FIG. 6b is a functional block diagram of another exemplary embodiment of a gNB architecture including multiple CUes and multiple corresponding DUes (SA), according to the present disclosure.

In the architecture 640 of FIG. 6b, two or more gNBs 501a-n are communicative with one another via e.g., an Xn interface 627, and accordingly can conduct at least CUe to CUe data transfer and communication. Separate NG Cores 503a-n are used for control and user plane (and other) functions of the network.

Figure 6C:
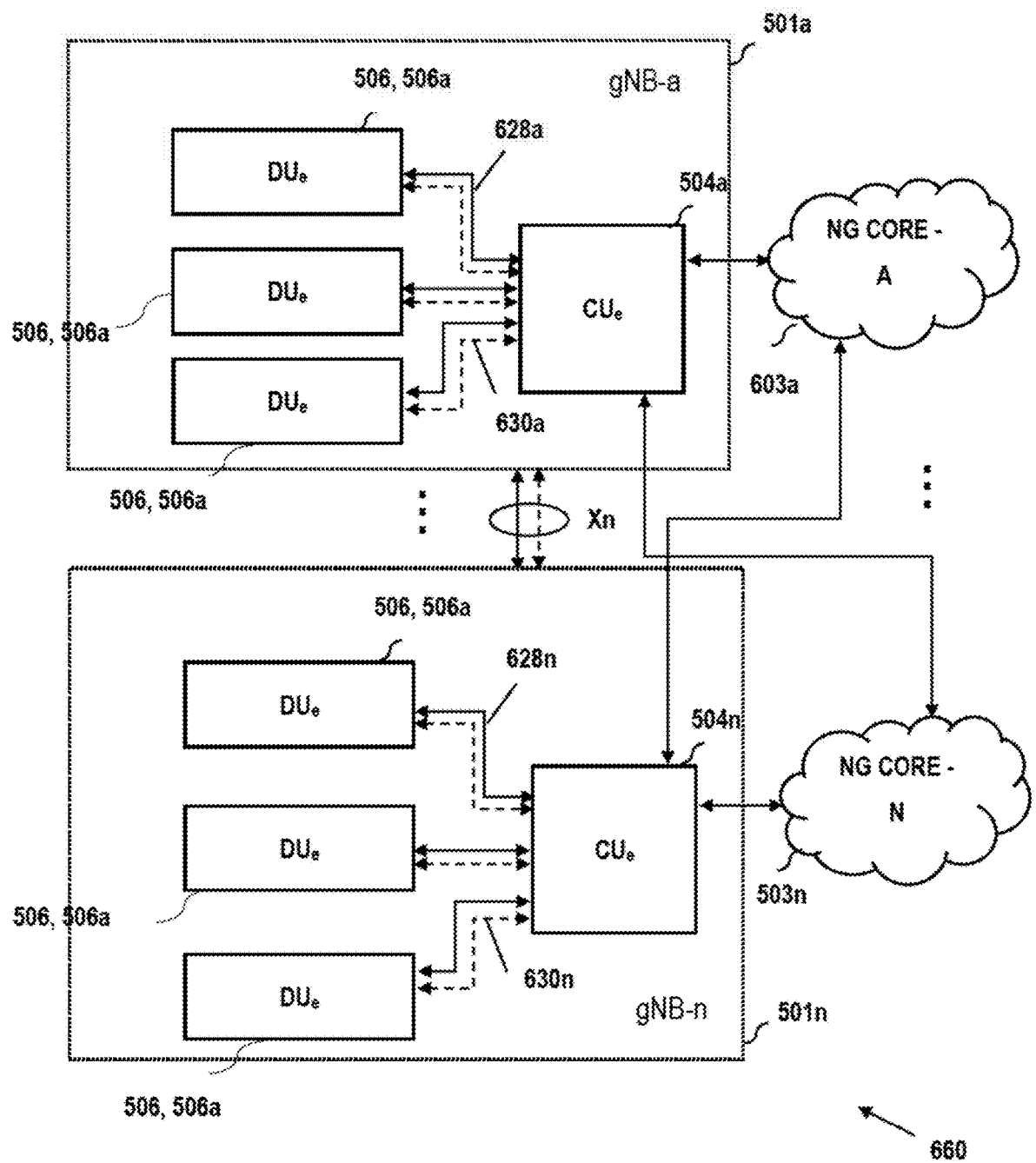
FIG. 6c is a functional block diagram of yet another exemplary embodiment of a gNB architecture including multiple CUes logically cross-connected to multiple different cores (SA), according to the present disclosure.

In the architecture 660 of FIG. 6c, two or more gNBs 501a-n are communicative with one another via e.g., the Xn interface 627, and accordingly can conduct at least CUe to CUe data transfer and communication. Moreover, the separate NG Cores 503a-n are logically "cross-connected" to the gNBs 501 of one or more other NG Cores, such that one core can utilize/control the infrastructure of another, and vice versa. This may be in "daisy chain" fashion (i.e., one gNB is communicative one other NG Core other than its own, and that NG Core is communicate with yet one additional gNB 501 other than its own, and so forth), or the gNBs and NG Cores may form a "mesh" topology where multiple Cores 503 are in communication with multiple gNBs or multiple different entities (e.g., service providers). Yet other topologies will be recognized by those of ordinary skill given the present disclosure. This cross-connection approach advantageously allows for, inter alia, sharing of infrastructure between two MSOs, or between MNO and MSO, which is especially useful in e.g., dense deployment environments which may not be able to support multiple sets of RAN infrastructure, such as for different service providers.

Figure 6D:
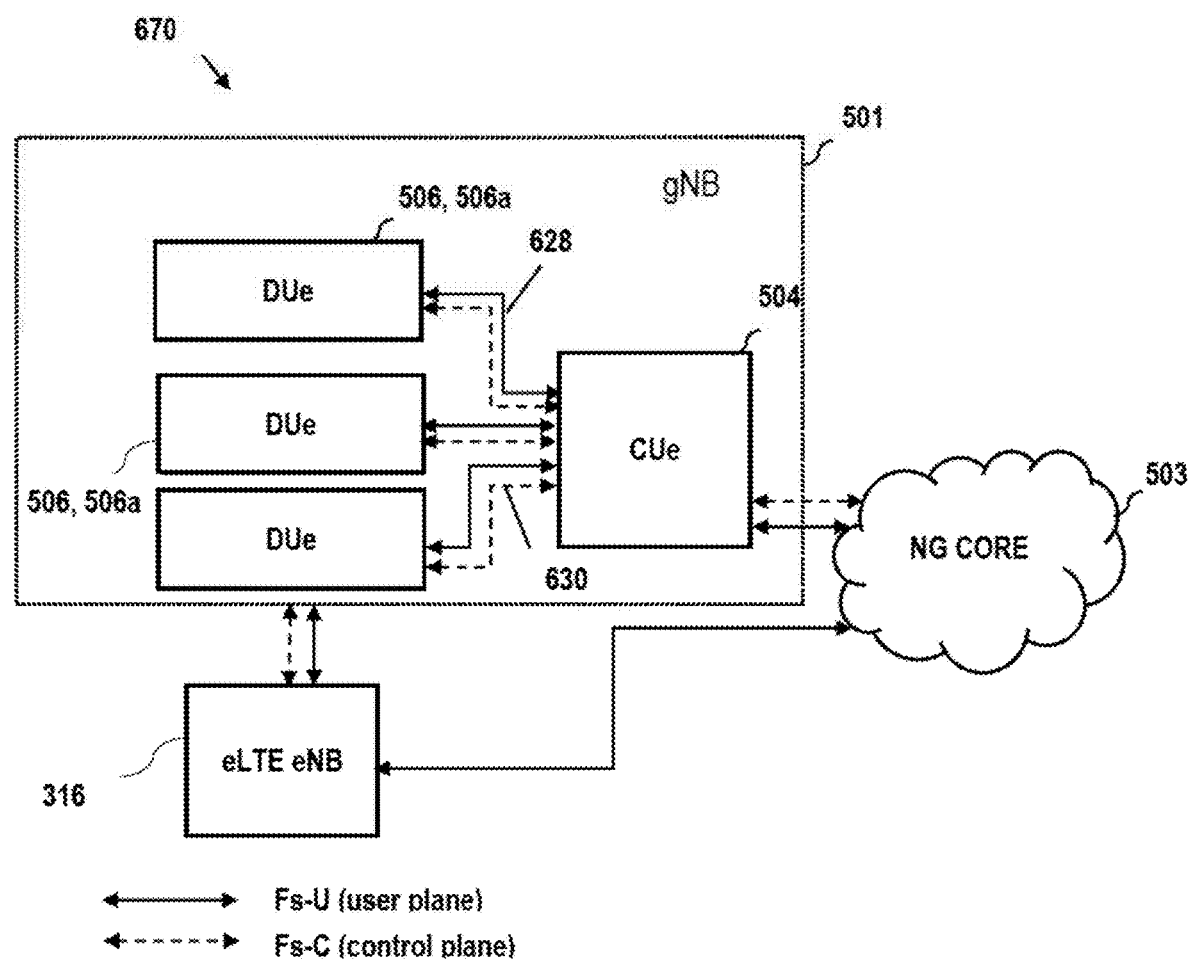
FIG. 6d is a functional block diagram of an NSA gNB and eLTE eNB architecture including a 5G NR Core (NGC) according to the present disclosure.
Figure 6E:
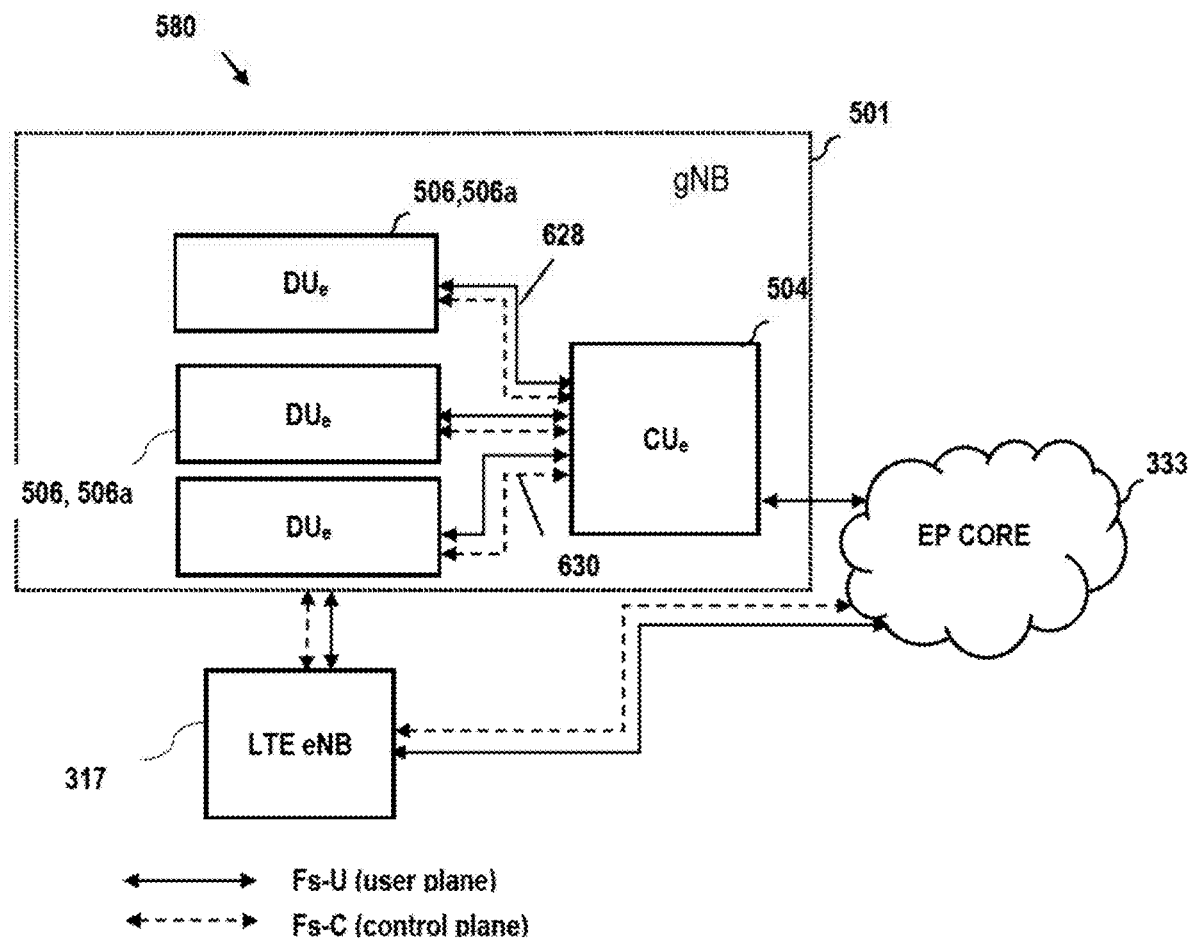
FIG. 6e is a functional block diagram of a gNB and LTE eNB architecture including an Evolved Packet Core (EPC) according to the present disclosure.
Figure 6F:
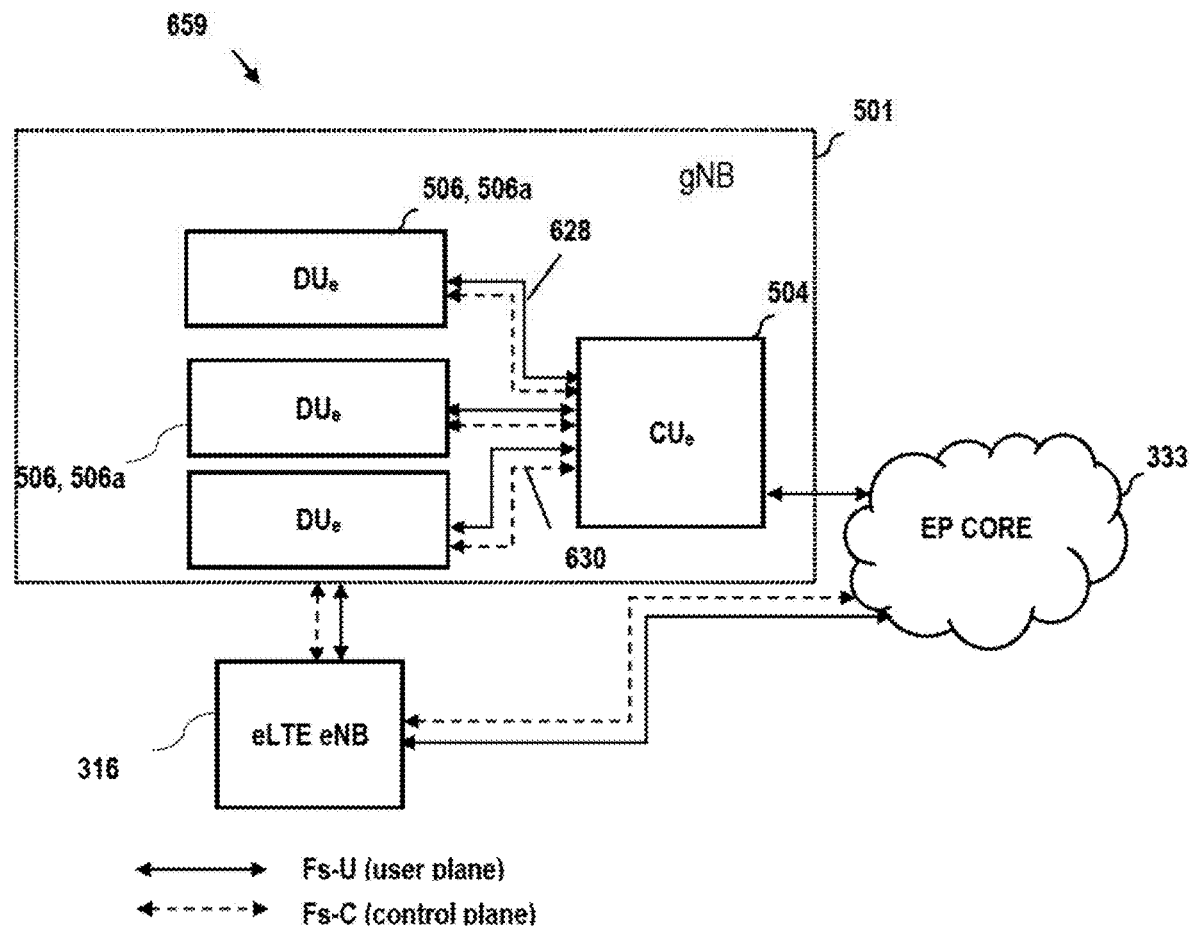
FIG. 6f is a functional block diagram of an NSA gNB and eLTE eNB architecture including an Evolved Packet Core (EPC) according to the present disclosure.

FIGS. 6e-6f relate to so-called NSA architectures contemplated during, inter alia, migration or transition between 4G/4.5G and 5G technology. Note that per 3GPP Release 15, some new definitions of entities have been introduced, including: (i) LTE eNB—An eNB device that can connect to the EPC and the extant pre-Release 15 LTE core network; (ii) eLTE eNB—An evolution of the LTE eNB—the eLTE eNB can connect to the EPC and the 5GC; (iii) NG—A data interface between the NGC and the gNB; (iv) NG2—A control plane (CP) interface between core network and the RAN (corresponding to S1-C in LTE); and (v) NG3—A user plane (UP) interface between the core network and the RAN (corresponding to S1-U in LTE).

In a "standalone" or SA scenario (e.g., FIGS. 6a-6c above), the 5G NR or the evolved LTE radio cells and the core network are operated alone, and are used for both control plane and user plane. The SA configuration is more simplified than NSA from an operational and management standpoint. Moreover, pure SA networks can operate independently using normal inter-generation handover between 4G and 5G for service continuity. Three variations of SA are defined in 3GPP: (i) Option 1 using EPC and LTE eNB access (i.e. as per current 4G LTE networks); (ii) Option 2 using 5GC and NR gNB access; and (iii) Option 5 using 5GC and LTE ng-eNB access.

Figure 3A:
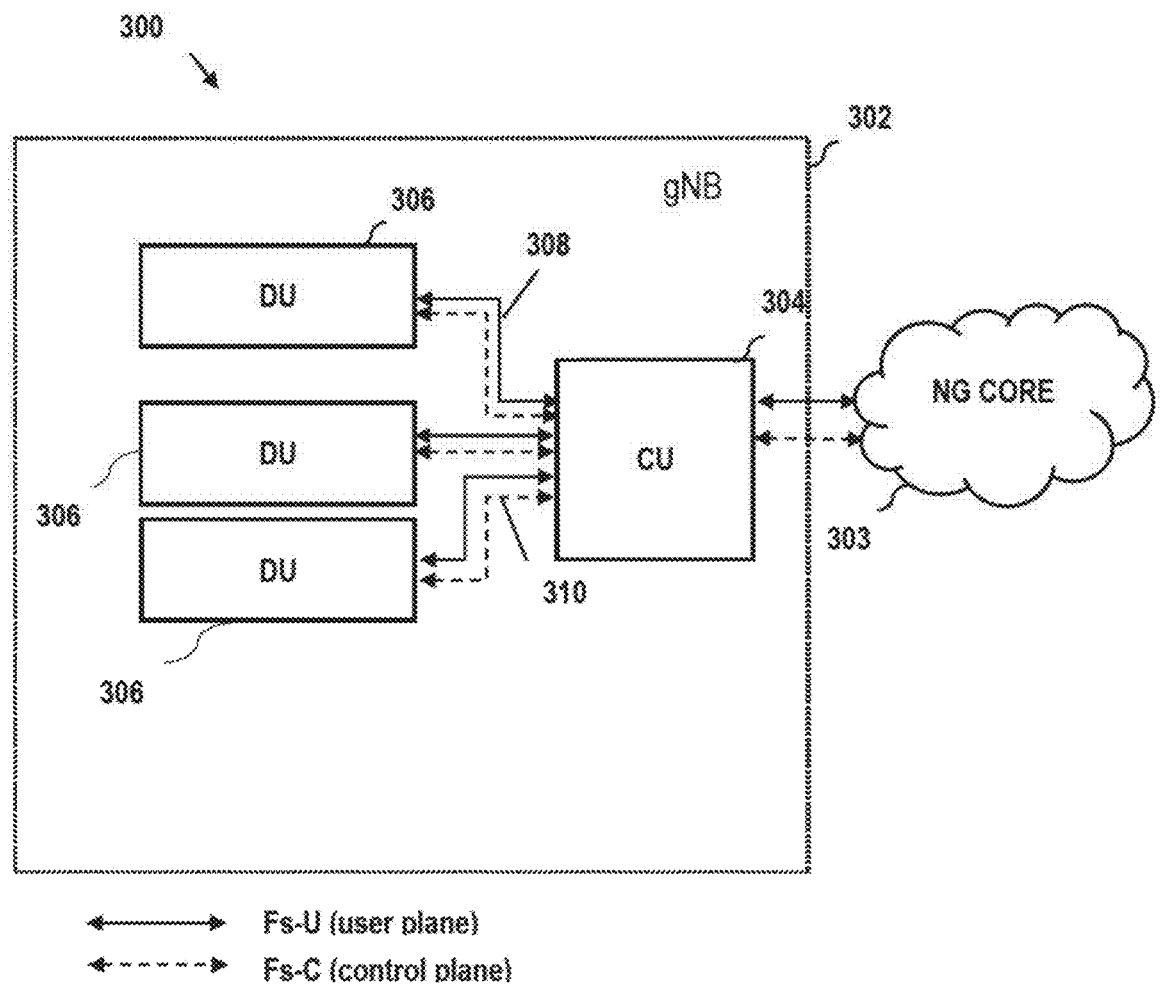
FIG. 3a is a functional block diagram of a prior art gNB architecture including CU and multiple DUs.
Figure 3B:
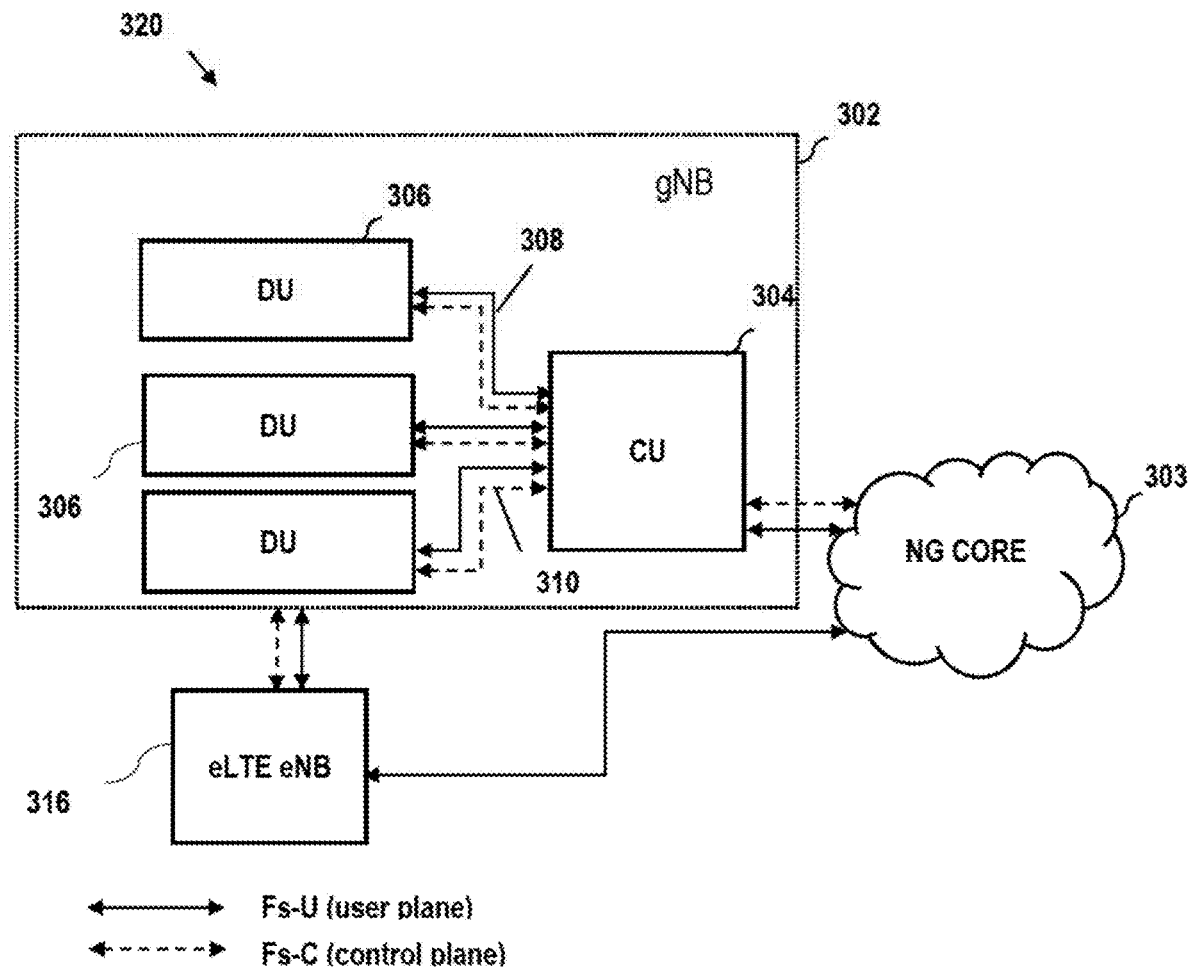
FIG. 3b is a functional block diagram of a prior art NSA gNB and eLTE eNB architecture including a 5G NR Core (NGC).
Figure 3C:
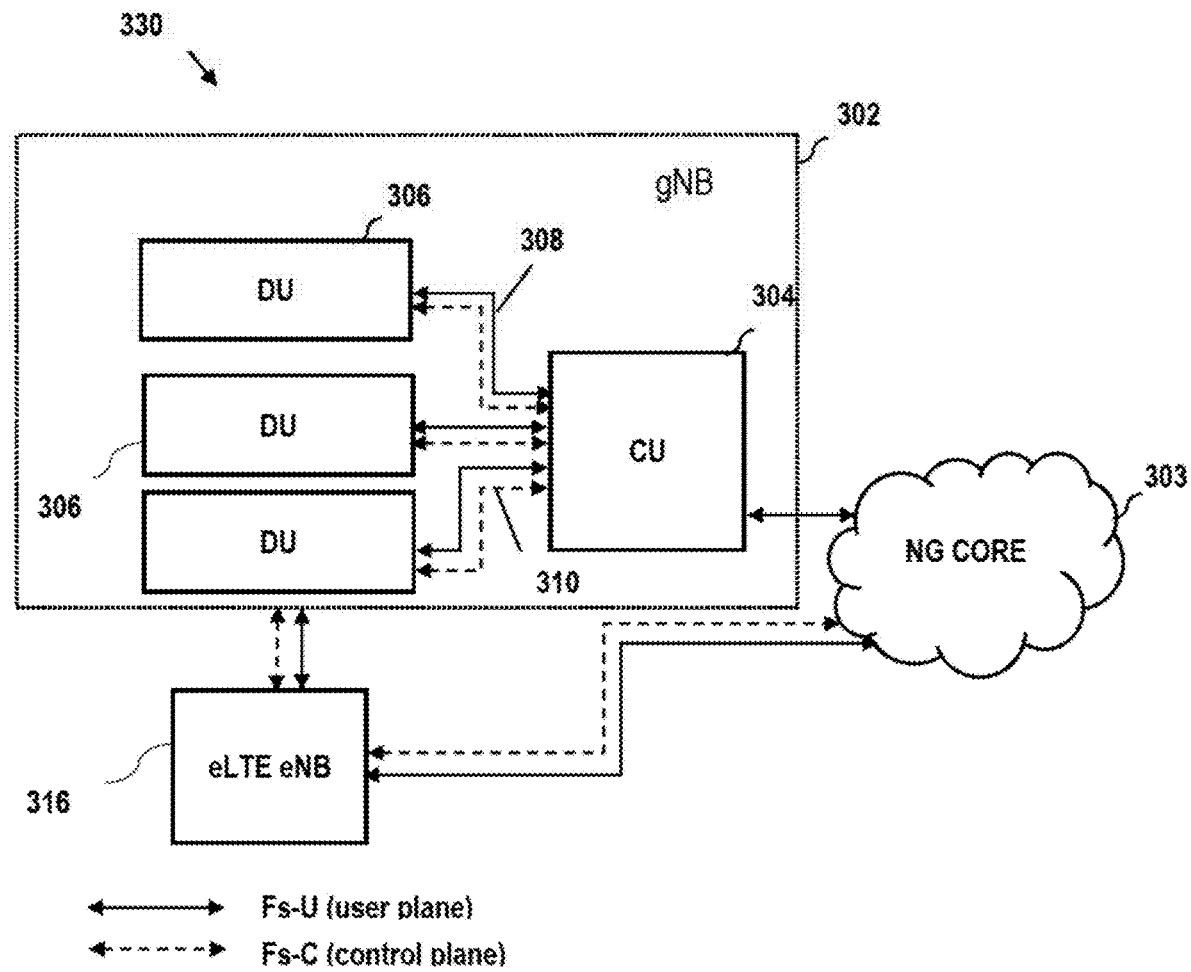
FIG. 3c is a functional block diagram of another prior art NSA gNB and eLTE eNB architecture including a 5G NR Core (NGC).
Figure 3D:
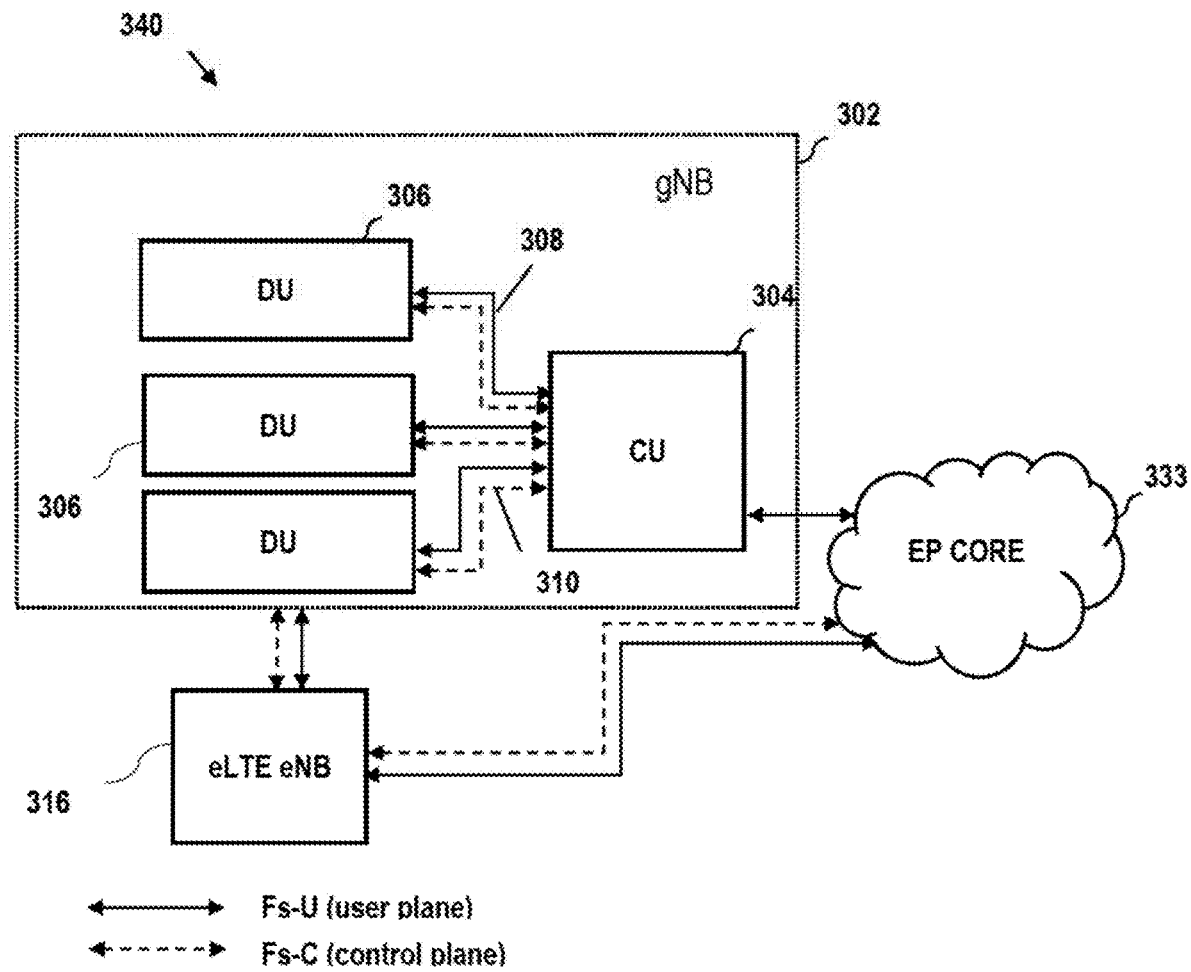
FIG. 3d is a functional block diagram of another prior art NSA gNB and eLTE eNB architecture including an Evolved Packet Core (EPC).

As previously described with respect to FIGS. 3b-3d, in non-standalone (NSA) scenarios, the NR radio cells are effectively integrated or combined with LTE radio cells using dual connectivity to provide radio access. In the case of NSA, the radio network core network may be either EPC or 5GC, depending on the particular choice of the operator.

FIG. 6d illustrates a gNB and eLTE eNB architecture including a 5G NR Core (NGC) according to the present disclosure. In this architecture 670, the NG Core 503 communicates with the gNB 501 with CUe and DUe's, as well as supporting an eLTE eNB 316 for the user plane. Control plane functions for the eLTE eNB are supported by the gNB 501.

FIG. 6e illustrates an NSA gNB and LTE eNB architecture including an Evolved Packet Core (EPC) according to the present disclosure. In this architecture 680, an EPC (EP Core) 303, 333 communicates with the gNB 501 with CUe and DUe's for user plane function, as well as supporting an LTE eNB 317 (i.e., an non-5G communicative NodeB) for the user plane and control plane.

FIG. 6f illustrates an NSA gNB and eLTE eNB architecture including an Evolved Packet Core (EPC) according to the present disclosure. In this architecture 690, an EPC (EP Core) 303, 333 communicates with the gNB 501 with CUe and DUe's for user plane function, as well as supporting an eLTE eNB 316 (i.e., a 5G communicative NodeB) for the user plane and control plane.

It will also be appreciated that while described primarily with respect to a unitary gNB-CUe entity or device 501 as shown in FIGS. 5 and 6a-6f, the present disclosure is in no way limited to such architectures. For example, the techniques described herein may be implemented as part of a distributed or dis-aggregated or distributed CUe entity (e.g., one wherein the user plane and control plane functions of the CUe are dis-aggregated or distributed across two or more entities such as a CUe-C (control) and CUe-U (user)), and/or other functional divisions are employed, including in NSA-based architectures.

It is also noted that heterogeneous architectures of eNBs or femtocells (i.e., E-UTRAN LTE/LTE-A Node B's or base stations, including eLTE eNBs 316) and gNBs may be utilized consistent with the architectures of FIGS. 5 and 6a-6f For instance, a given DUe may (in addition to supporting node operations as discussed in greater detail with respect to FIGS. 8-8a below), act (i) solely as a DUe (i.e., 5G NR PHY node) and operate outside of an E-UTRAN macrocell, or (ii) be physically co-located with an eNB or femtocell and provide NR coverage within a portion of the eNB macrocell coverage area, or (iii) be physically non-colocated with the eNB or femtocell, but still provide NR coverage within the macrocell coverage area.

In accordance with the 5G NR model, the DUe(s) 506, 506a comprise logical nodes that each may include varying subsets of the gNB functions, depending on the functional split option. DUe operation is controlled by the CUe 504 (and ultimately for some functions by the NG Core 303). Split options between the DUe and CUe in the present disclosure may include for example:

Option 1 (RRC/PCDP split)
Option 2 (PDCP/RLC split)
Option 3 (Intra RLC split)
Option 4 (RLC-MAC split)
Option 5 (Intra MAC split)
Option 6 (MAC-PHY split)
Option 7 (Intra PHY split)
Option 8 (PHY-RF split)

Under Option 1 (RRC/PCDP split), the RRC (radio resource control) is in the CUe while PDCP (packet data convergence protocol), RLC (radio link control), MAC, physical layer (PHY) and RF are kept in the DUe, thereby maintaining the entire user plane in the distributed unit.

Under Option 2 (PDCP/RLC split), there are two possible variants: (i) RRC, PDCP maintained in the CUe, while RLC, MAC, physical layer and RF are in the DU(s); and (ii) RRC, PDCP in the CUe (with split user plane and control plane stacks), and RLC, MAC, physical layer and RF in the DUe's.

Under Option 3 (Intra RLC Split), two splits are possible: (i) split based on ARQ; and (ii) split based on TX RLC and RX RLC.

Under Option 4 (RLC-MAC split), RRC, PDCP, and RLC are maintained in the CUe 504, while MAC, physical layer, and RF are maintained in the DUe's.

Under Option 5 (Intra-MAC split), RF, physical layer and lower part of the MAC layer (Low-MAC) are in the DUe's 506, 506a, while the higher part of the MAC layer (High-MAC), RLC and PDCP are in the CUe 504.

Under Option 6 (MAC-PHY split), the MAC and upper layers are in the CUe, while the PHY layer and RF are in the DUe's. The interface between the CUe and DUe's carries data, configuration, and scheduling-related information (e.g. Modulation and Coding Scheme or MCS, layer mapping, beamforming and antenna configuration, radio and resource block allocation, etc.) as well as measurements.

Under Option 7 (Intra-PHY split), different sub-options for UL (uplink) and DL downlink) may occur independently. For example, in the UL, FFT (Fast Fourier Transform) and CP removal may reside in the DUe's, while remaining functions reside in the CUe 504. In the DL, iFFT and CP addition may reside in the DUe, while the remainder of the PHY resides in the CUe.

Finally, under Option 8 (PHY-RF split), the RF and the PHY layer may be separated to, inter alia, permit the centralization of processes at all protocol layer levels, resulting in a high degree of coordination of the RAN. This allows optimized support of functions such as CoMP, MIMO, load balancing, and mobility.

Generally speaking, the foregoing split options are intended to enable flexible hardware implementations which allow scalable cost-effective solutions, as well as coordination for e.g., performance features, load management, and real-time performance optimization. Moreover configurable functional splits enable dynamic adaptation to various use cases and operational scenarios. Factors considered in determining how/when to implement such options can include: (i) QoS requirements for offered services (e.g. low latency to support 5G RAN requirements, high throughput); (ii) support of requirements for user density and load demand per given geographical area (which may affect RAN coordination); (iii) availability of transport and backhaul networks with different performance levels; (iv) application type (e.g. real-time or non-real time); (v) feature requirements at the Radio Network level (e.g. Carrier Aggregation).

It is also noted that the "DU" functionality referenced in the various split options above can itself be split across the DUe and its downstream components, such as the RF stages of the node 509 (see FIGS. 8 and 8a) and/or the CPEe 513. As such, the present disclosure contemplates embodiments where some of the functionality typically found within the DUe may be distributed to the node/CPEe.

It will further be recognized that user-plane data/traffic may also be routed and delivered apart from the CUe. In one implementation (described above), the CUe hosts both the RRC (control-plane) and PDCP (user-plane); however, as but one alternate embodiment, a so-called "dis-aggregated" CUe may be utilized, wherein a CUe-CP entity (i.e., CUe—control plane) hosts only the RRC related functions, and a CUe-UP (CUe—user plane) which is configured to host only PDCP/SDAP (user-plane) functions. The CUe-CP and CUe-UP entities can, in one variant, interface data and inter-process communications via an E1 data interface, although other approaches for communication may be used.

It will also be appreciated that the CUe-CP and CUe-UP may be controlled and/or operated by different entities, such as where one service provider or network operator maintains cognizance/control over the CUe-UP, and another over the CUe-CP, and the operations of the two coordinated according to one or more prescribed operational or service policies or rules.

Referring again to FIG. 5, the exemplary embodiment of the DUe 509 is a strand-mounted or buried DUe (along with the downstream radio chain(s), the latter which may include one or more partial or complete RRH's (remote radio heads) which include at least portions of the PHY functionality of the node (e.g., analog front end, DAC/ADCs, etc.). As can be appreciated, the location and configuration of each DUe/node may be altered to suit operational requirements such as population density, available electrical power service (e.g., in rural areas), presence of other closely located or co-located radio equipment, geographic features, etc.

As discussed with respect to FIGS. 8-8a below, the nodes 506, 506a in the embodiment of FIG. 5 include multiple OFDM-based transmitter-receiver chains of 800 MHz nominal bandwidth, although this configuration is merely exemplary. In operation, the node generates waveforms that are transmitted in the allocated band (e.g., up to approximately 1.6 GHz), but it will be appreciated that if desired, the OFDM signals may in effect be operated in parallel with signals carried in the below-800 MHz band, such as for normal cable system operations.

Referring again to FIG. 5, in one implementation, each node (and hence DUe) is in communication with its serving CUe via an F1 interface, and may be either co-located or not co-located with the CUe. For example, a node/DUe may be positioned within the MSO HFC infrastructure proximate a distribution node within the extant HFC topology, such as before the N-way tap point 512, such that a plurality of premises (e.g., the shown residential customers) can be served by the node/DUe via the aforementioned OFDM waveforms and extant HFC plant. In certain embodiments, each node/DUe 506, 506a is located closer to the edge of the network, so as to service one or more venues or residences (e.g., a building, room, or plaza for commercial, corporate, academic purposes, and/or any other space suitable for wireless access). For instance, in the context of FIG. 5, a node might even comprise a CPEe or external access node (each discussed elsewhere herein). Each radio node 506 is configured to provide wireless network coverage within its coverage or connectivity range for its RAT (e.g., 4G and/or 5G NR). For example, a venue may have a wireless NR modem (radio node) installed within the entrance thereof for prospective customers to connect to, including those in the parking lot via inter alia, their NR or LTE-enabled vehicles or personal devices of operators thereof.

Notably, different classes of DUe/node 506, 506a may be utilized. For instance, a putative "Class A" LTE eNB may transmit up X dbm, while a "Class-B" LTE eNBs can transmit up to Y dbm (Y>X), so the average area can vary widely. In practical terms, a Class-A device may have a working range on the order of hundreds of feet, while a Class B device may operate out to thousands of feet or more, the propagation and working range dictated by a number of factors, including the presence of RF or other interferers, physical topology of the venue/area, energy detection or sensitivity of the receiver, etc. Similarly, different types of NR-enabled nodes/DUe 506, 506a can be used depending on these factors, whether alone or with other wireless PHYs such as WLAN, etc.

Moreover, using the architecture of FIG. 5, data may be delivered redundantly or separately via the radio access node 506a as well as the CPEe 513 via one or more DUe units 506a, depending on the location of the client device 507, thereby enabling the client device to have constant access to the requested data when in range of the serving node/device. For instance, in one scenario, the supplemental link is used to maintain a separate data session simultaneously even without mobility; i.e., one session via PHY1 for Service A, and another simultaneous session via PHY2 for Service B (as opposed to handover of Service A from PHY1 to PHY2). In one implementation, extant 3GPP LTE-A multi-band carrier aggregation (CA) protocols are leveraged, wherein the supplemental link acts as a Secondary Cell or "SCell" to the Primary Cell or "PCell" presently serving the user from inside the home/building, or vice versa (e.g., the supplemental link can act as the PCell, and the SCell added thereafter via e.g., the premises node). See inter alia, 3GPP TR 36.808, *"Evolved Universal Terrestrial Radio Access (E-UTRA); Carrier Aggregation; Base Station (BS) radio transmission and reception,"* incorporated herein by reference in its entirety.

Signal Attenuation and Bandwidth

Figure 7A:
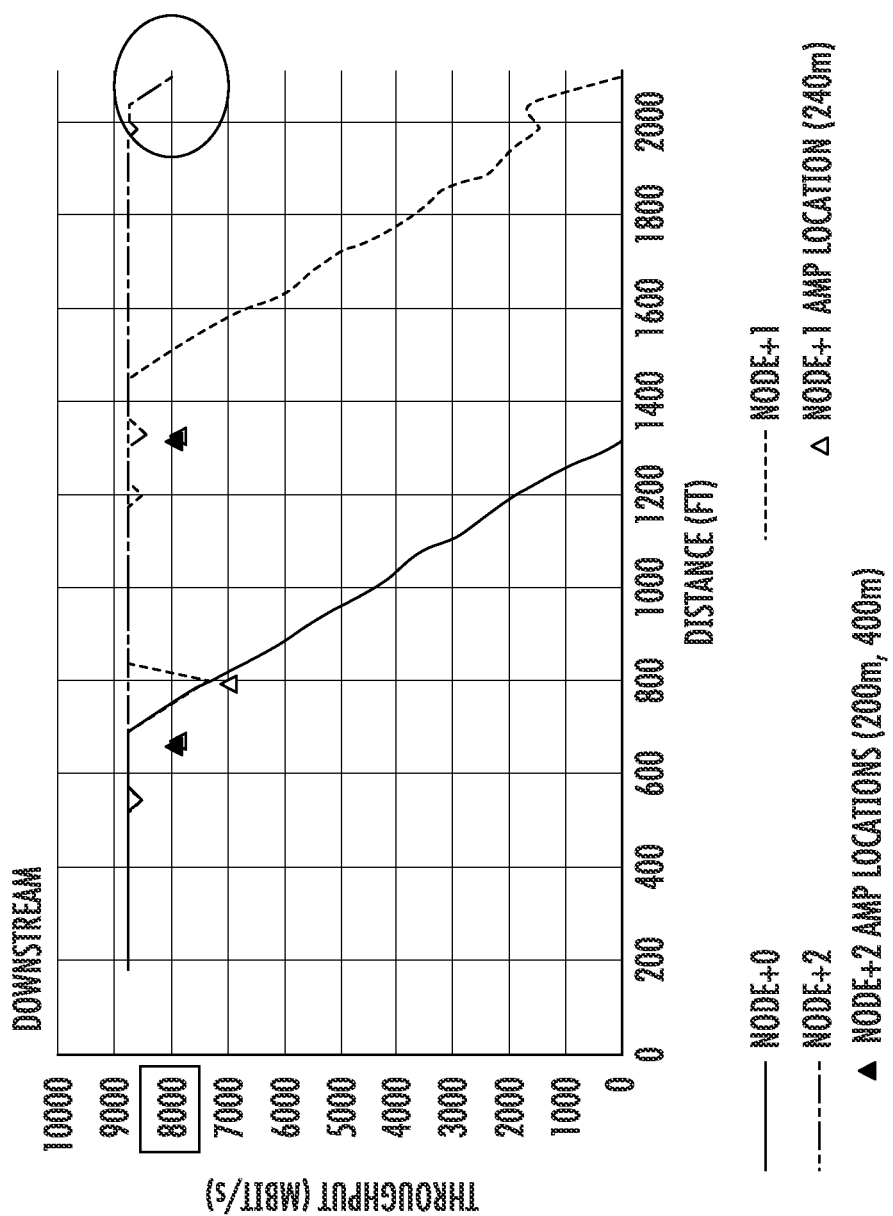
FIGS. 7a and 7b illustrate exemplary downstream (DS) and upstream (US) data throughputs or rates as a function of distance within the HFC cable plant of FIG. 5.
Figure 7B:
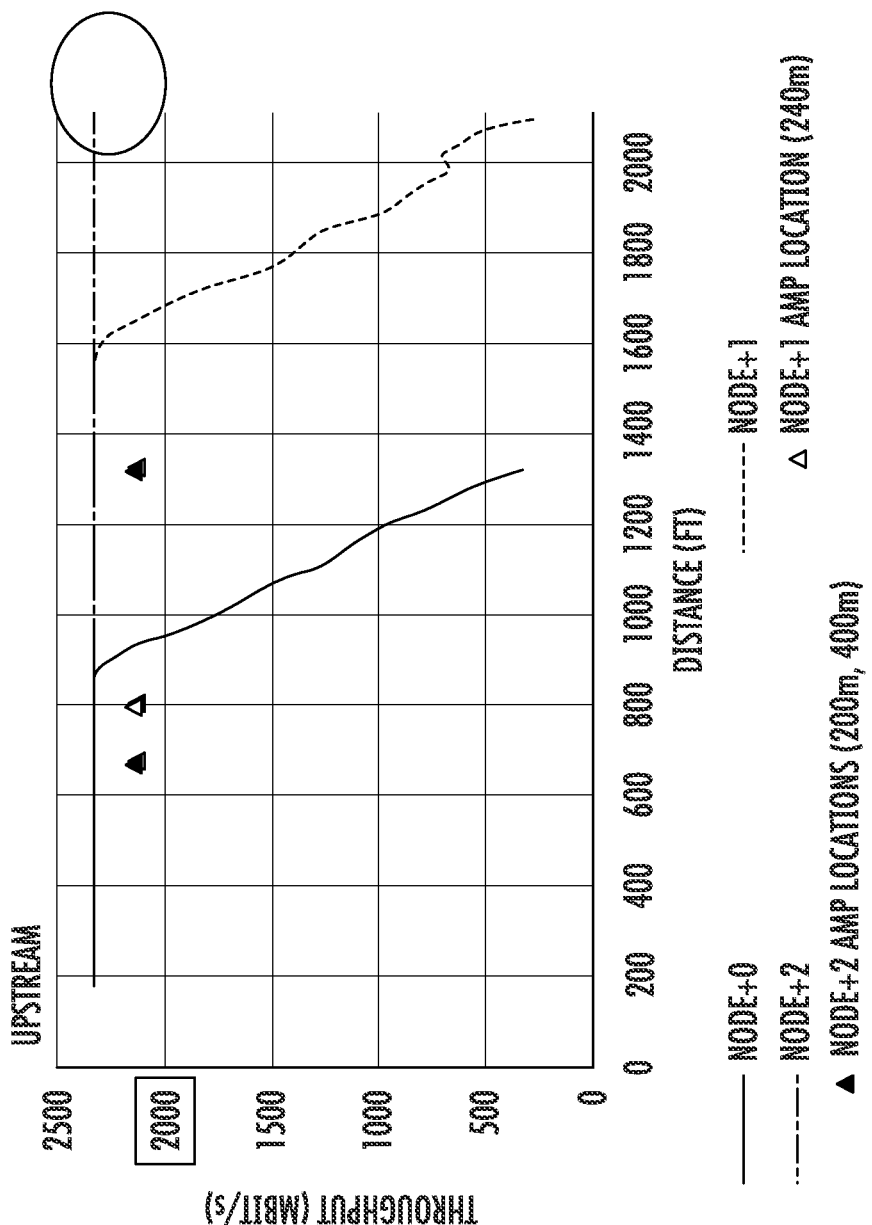

FIGS. 7a and 7b illustrate exemplary downstream (DS) and upstream (US) data throughputs or rates as a function of distance within the HFC cable plant of FIG. 5. As illustrated, a total (DS and US combined) bandwidth on the order of 10 Gbps is achievable (based on computerized simulation conducted by the Assignee hereof), at Node+2 at 2100 ft (640 m), and at Node+1 at 1475 ft (450 m). One exemplary split of the aforementioned 10 Gbps is asymmetric; e.g., 8 Gbps DL/2 Gbps UL, although this may be dynamically varied using e.g., TDD variation as described elsewhere herein.

Figure 2:
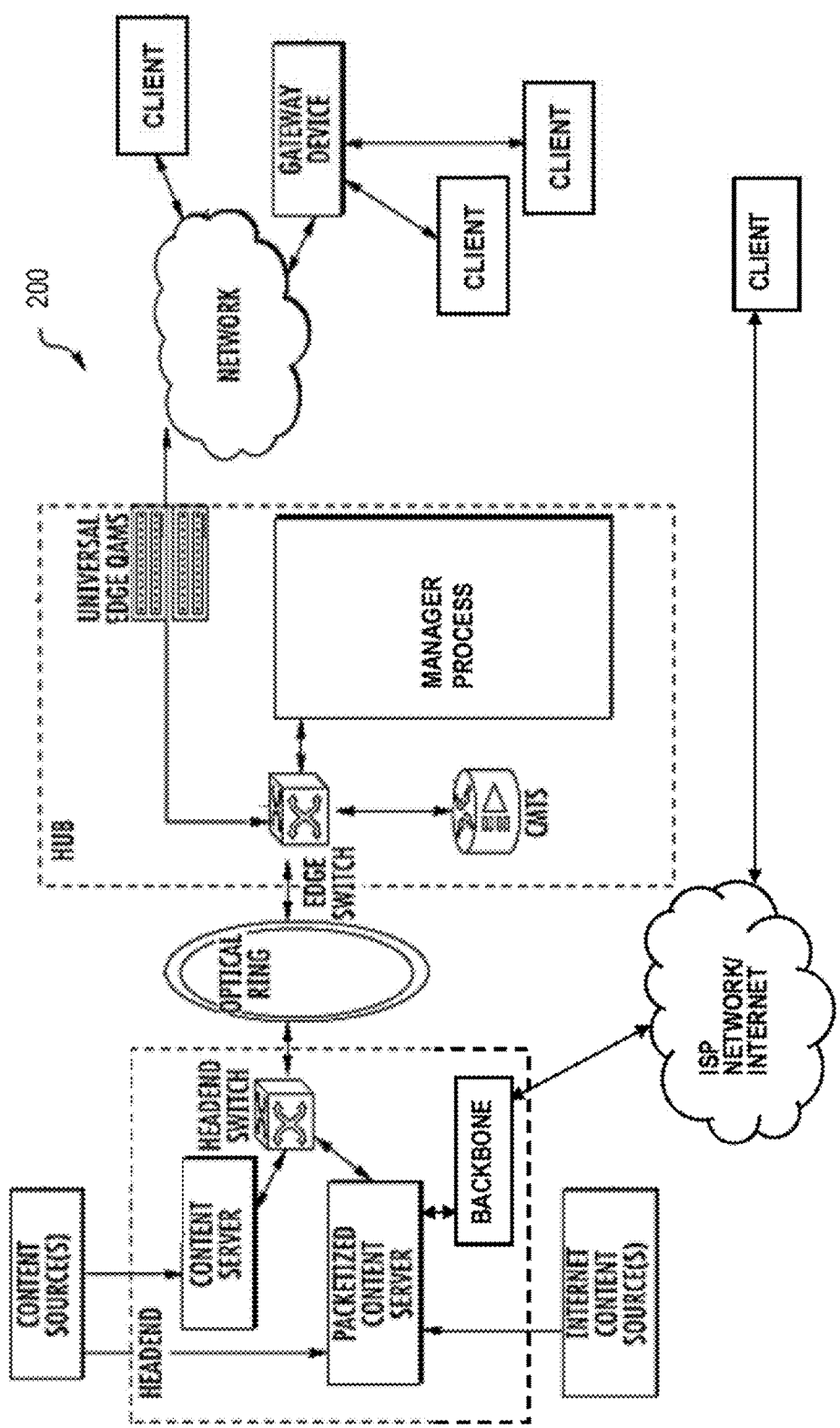

Notably, the portions of the extant HFC architecture described above (see e.g., FIGS. 1 and 2) utilized by the architecture 500 of FIG. 5 are not inherently limited by their medium and architecture (i.e., optical fiber transport ring, with coaxial cable toward the edges); coaxial cable can operate at frequencies significantly higher than the sub-1 GHz typically used in cable systems, but at a price of significantly increased attenuation. As is known, the formula for theoretical calculation of attenuation (A) in a typical coaxial cable includes the attenuation due to conductors plus attenuation due to the dielectric medium:

$$A = 4.35 \ (R_t/Z_0) + 2\sqrt{E} \ \ 78 \ \text{pF}$$
$$= \text{dB per 100 ft.}$$

where:
$R_t$=Total line resistance ohms per 1000 ft.
$R_t$=0.1 (1/d+1√F D) (for single copper line)
p=Power factor of dielectric
F=Frequency in megahertz (MHz)

As such, attenuation increases with increasing frequency, and hence there are practical restraints on the upper frequency limit of the operating band. However, these restraints are not prohibitive in ranges up to for example 2 GHz, where with suitable cable and amplifier manufacturing and design, such coaxial cables can suitably carry RF signals without undue attenuation. Notably, a doubling of the roughly 800 MHz-wide typical cable RF band (i.e., to 1.6 GHz width) is very possible without suffering undue attenuation at the higher frequencies.

It will also be appreciated that the attenuation described above is a function of, inter alia, coaxial conductor length, and hence higher levels of "per-MHz" attenuation may be acceptable for shorter runs of cable. Stated differently, nodes serviced by shorter runs of cable may be able to better utilize the higher-end portions of the RF spectrum (e.g., on the high end of the aforementioned exemplary 1.6 GHz band) as compared to those more distant, the latter requiring greater or disproportionate amplification. As such, the present disclosure contemplates use of selective mapping of frequency spectrum usage as a function of total cable medium run length or similar.

Another factor of transmission medium performance is the velocity factor (VF), also known as wave propagation speed or velocity of propagation (VoP), defined as the ratio of the speed at which a wavefront (of an electromagnetic or radio frequency signal, a light pulse in an optical fiber or a change of the electrical voltage on a copper wire) propagates over the transmission medium, to the speed of light (c, approximately 3E08 m/s) in a vacuum. For optical signals, the velocity factor is the reciprocal of the refractive index. The speed of radio frequency signals in a vacuum is the speed of light, and so the velocity factor of a radio wave in a vacuum is 1, or 100%. In electrical cables, the velocity factor mainly depends on the material used for insulating the current-carrying conductor(s). Velocity factor is an important characteristic of communication media such as coaxial, CAT-5/6 cables, and optical fiber. Data cable and fiber typically has a VF between roughly 0.40 and 0.8 (40% to 80% of the speed of light in a vacuum).

Achievable round-trip latencies in LTE (UL/DL) are on the order of 2 ms (for "fast" UL access, which eliminates need for scheduling requests and individual scheduling grants, thereby minimizing latency, and shorter TTI, per Release 15), while those for 5G NR are one the order of 1 ms or less, depending on transmission time interval frequency (e.g., 60 kHz).

Notably, a significant portion of 4G/4.5G transport latency relates to network core and transport (i.e., non-edge) portions of the supporting infrastructure.

Hence, assuming a nominal 0.7 VF and a one (1) ms roundtrip latency requirement, putative service distances on the order of 100 km are possible, assuming no other processing or transport latency:

$$0.5E{-}03 \text{ s (assume symmetric US/DS)} \times (0.7 \times 3E08 \text{ m/s}) \times 1 \text{ km}/1000 \text{ m} = 1.05E02 \text{ km}$$

As discussed in greater detail below with respect to FIGS. 8a and 8b, the exemplary embodiments of the architecture 500 may utilize IF (Intermediate Frequencies) to reduce attenuation that exists at the higher frequencies on the bearer medium (i.e., coaxial cable).

Network Node and DUe Apparatus—

Figure 8:
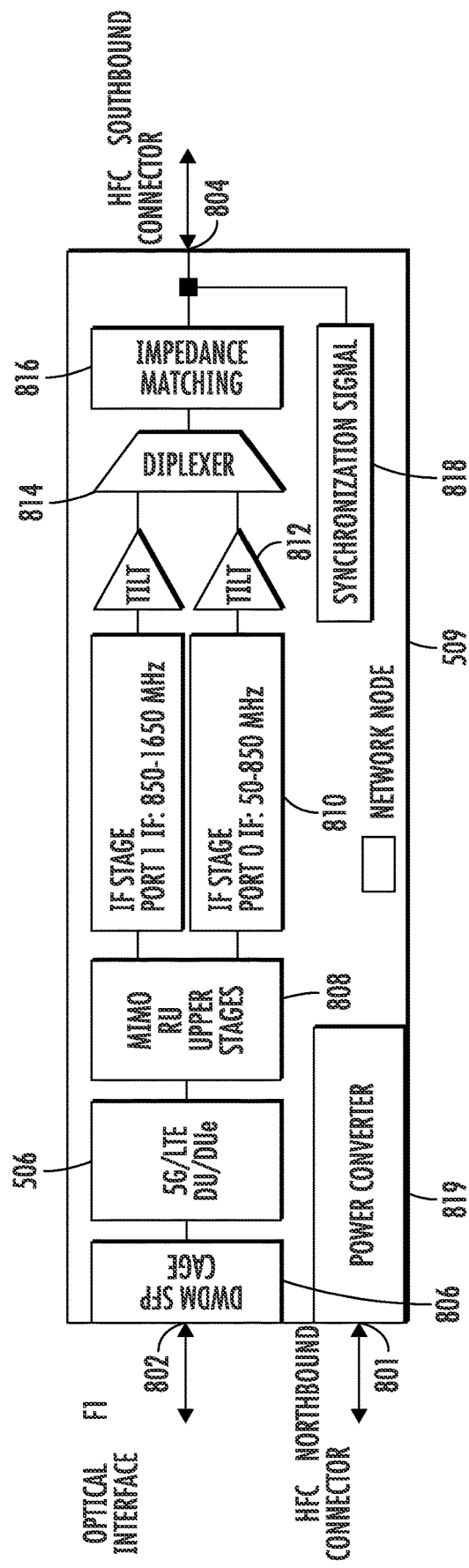
FIG. 8 is a functional block diagram illustrating an exemplary general configuration of a network node apparatus according to the present disclosure.
Figure 8A:
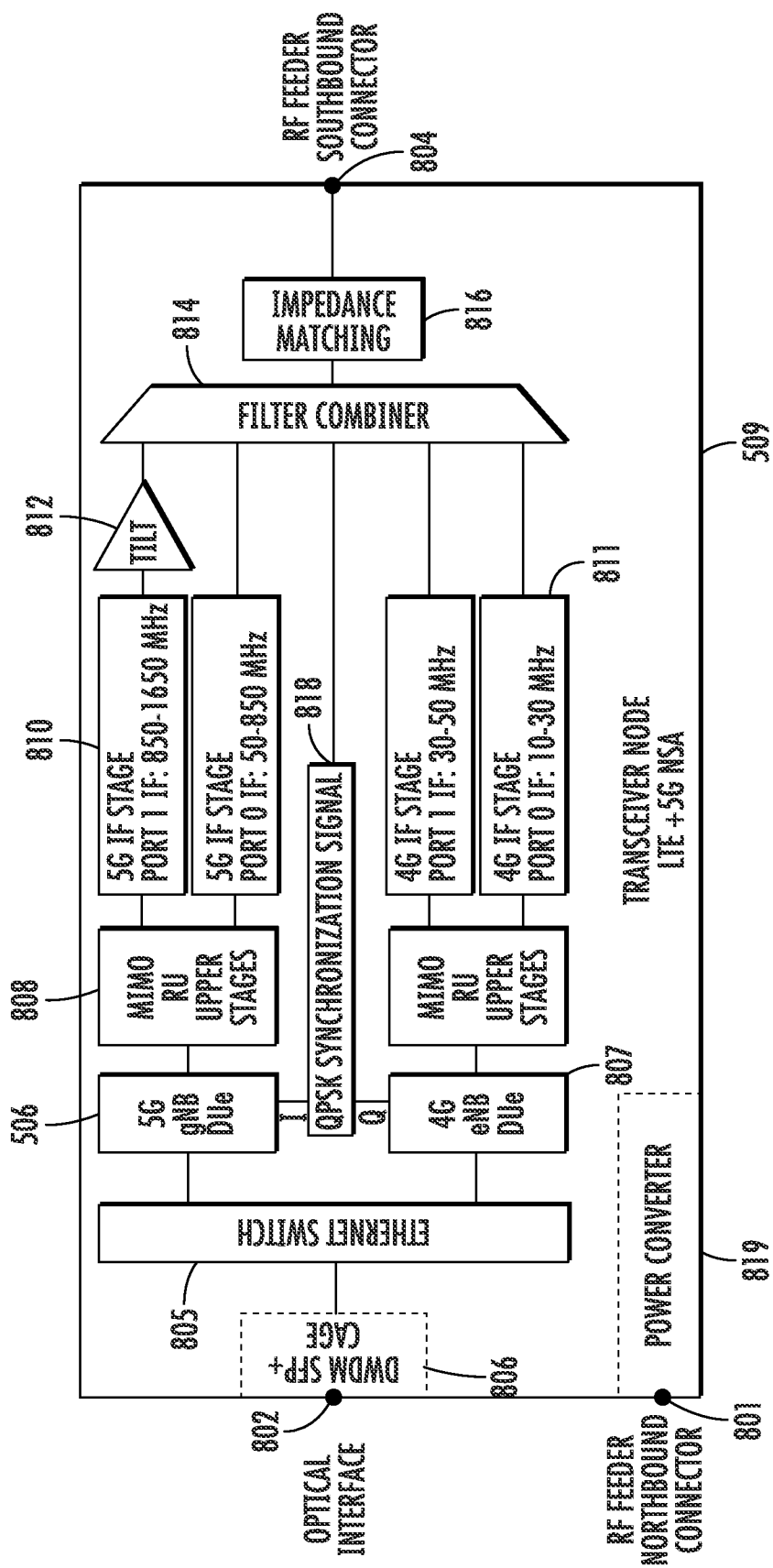
FIG. 8a is a functional block diagram illustrating an exemplary implementation of the network node apparatus according to the present disclosure, configured for 3GPP 4G and 5G capability.

FIGS. 8 and 8a illustrate exemplary configurations of a network radio frequency node apparatus 509 according to the present disclosure. As referenced above, these nodes 509 can take any number of form factors, including (i) co-located with other MSO equipment, such as in a physically secured space of the MSO, (ii) "strand" or pole mounted, (iii) surface mounted, and (iv) buried, so as to inter alia, facilitate most efficient integration with the extant HFC (and optical) infrastructure, as well as other 4G/5G components such as the CUe 504.

As shown, in FIG. 8, the exemplary node 509 in one embodiment generally includes an optical interface 802 to the HFC network DWDM system (see FIG. 2), as well as a "Southbound" RF interface 804 to the HFC distribution network (i.e., coax). The optical interface 802 communicates with an SFP connector cage 806 for receiving the DWDM signals via the interposed optical fiber. A 5G NR DUe 506 is also included to provide 5G DU functionality as previously described, based on the selected option split. The MIMO/radio unit (RU) stages 808 operate at baseband, prior to upconversion of the transmitted waveforms by the IF (intermediate frequency) stages 810 as shown. As discussed below, multiple parallel stages are used in the exemplary embodiment to capitalize on the multiple parallel data streams afforded by the MIMO technology within the 3GPP technology. A tilt stage 812 is also utilized prior to the diplexer stage 814 and impedance matching stage 816. Specifically, in one implementation, this "tilt" stage is used to compensate for non-linearity across different frequencies carried by the medium (e.g., coaxial cable). For instance, higher frequencies may have a higher loss per unit distance when travelling on the medium as compared to lower frequencies travelling the same distance on the same medium. When a high bandwidth signal (e.g. 50-1650 MHz) is transmitted on a coax line, its loss across the entire frequency bandwidth will not be linear, and may include shape artifacts such as a slope (or "tilt"), and/or bends or "knees" in the attenuation curve (e.g., akin to a low-pass filter). Such non-linear losses may be compensated for to achieve optimal performance on the medium, by the use of one or more tilt compensation apparatus 812 on the RF stage of the node device.

A synchronization signal generator 818 is also used in some embodiments as discussed in greater detail below with respect to FIG. 8a.

In the exemplary implementation of FIG. 8a, both 4G and 5G gNB DUe 807, 506 are also included to support the RF chains for 4G and 5G communication respectively. As described in greater detail below, the 5G portion of the spectrum is divided into two bands (upper and lower), while the 4G portion is divided into upper and lower bands within a different frequency range. In the exemplary implementation, OFDM modulation is applied to generate a plurality of carriers in the time domain. See, e.g., co-owned and co-pending U.S. Pat. No. 9,185,341 issued Nov. 10, 2015 and entitled "Digital domain content processing and distribution apparatus and methods," and U.S. Pat. No. 9,300,445 issued Mar. 29, 2016 also entitled "Digital domain content processing and distribution apparatus and methods," each incorporated herein by reference in their entirety, for inter alia, exemplary reprogrammable OFDM-based spectrum generation apparatus useful with various embodiments of the node 509 described herein.

In the exemplary embodiment, the 5G and LTE OFDM carriers produced by the node 509 utilize 1650 MHz of the available HFC bearer bandwidth, and this bandwidth is partitioned into two or more sub-bands depending on e.g., operational conditions, ratio of "N+0" subscribers served versus "N+i" subscribers served, and other parameters. In one variant, each node utilizes RF power from its upstream nodes to derive electrical power, and further propagate the RF signal (whether at the same of different frequency) to downstream nodes and devices including the wideband amplifiers.

While the present embodiments are described primarily in the context of an OFDM-based PHY (e.g., one using IFFT and FFT processes with multiple carriers in the time domain) along with TDD (time division duplex) temporal multiplexing, it will be appreciated that other PHY/multiple access schemes may be utilized consistent with the various aspects of the present disclosure, including for example and without limitation FDD (frequency division duplexing), direct sequence or other spread spectrum, and FDMA (e.g., SC-FDMA or NB FDMA).

As previously noted, to achieve high throughput using a single receiver chipset in the consumer premises equipment (CPEe) 513 and 3GPP 5G NR waveforms over a single coaxial feeder, such as the coaxial cable that MSOs bring to their subscriber's premises or the single coaxial cable that is installed for lower-cost single input single output (SISO) distributed antenna systems (DAS), the total carrier bandwidth that can be aggregated by the prior art chipset is limited to a value, e.g. 800 MHz, which is insufficient for reaching high throughputs such as 10 Gbit/s using one data stream alone given the spectral efficiencies supported by the 3GPP 5G NR standard.

Since the 3GPP 5G NR standard supports the transmission of multiple independent parallel data streams as part of a multiple input multiple output (MIMO) channel for the same RF bandwidth to leverage the spatial diversity that wireless channels afford when multiple antenna elements are used, the very first generation of 3GPP 5G chipsets will support such parallel MIMO data streams. However, attempts to transmit these parallel streams over a single cable would generally be counterproductive, as all the streams would occupy the same RF bandwidth and would interfere with each other for lack of spatial diversity between them.

Accordingly, the various embodiments of the apparatus disclosed herein (FIGS. 8 and 8a) leverage the parallel MIMO data streams supported by 3GPP 5G NR, which are shifted in frequency in the transceiver node 509 before being injected into the single coaxial feeder so that frequency diversity (instead of spatial diversity; spatial diversity may be utilized at the CPEe and/or supplemental pole-mounted radio access node 506a if desired) is leveraged to achieve the maximum total carrier bandwidth that 3GPP 5G NR chipsets will support with parallel data streams.

Figure 8B:
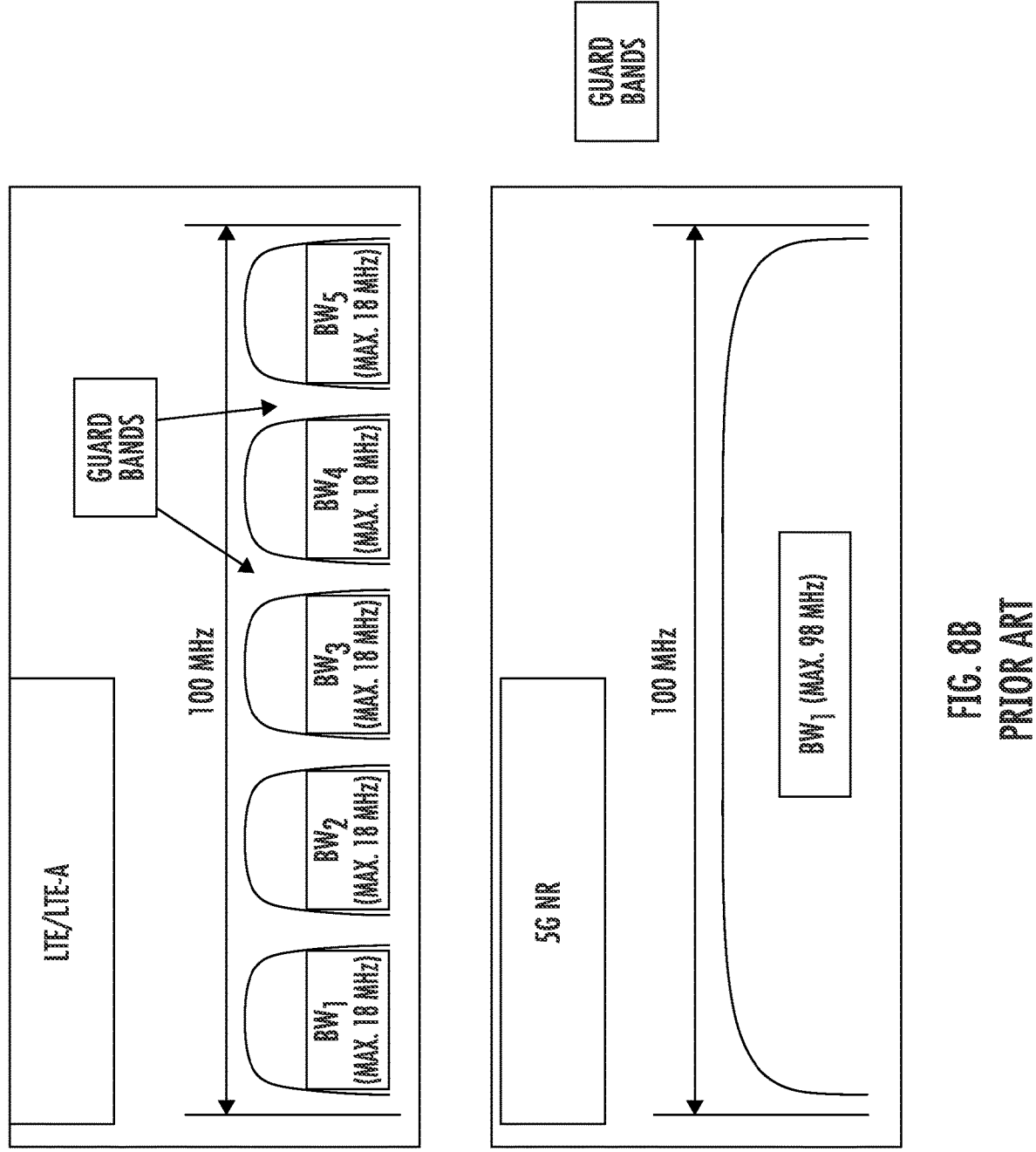
FIG. 8b is a graphical representation of frequency spectrum allocations according to prior art LTE/LTE-A and 5G NR standards.

FIG. 8b shows a comparison of prior art LTE/LTE-A frequency bands and associated guard bands over a typical 100 MHz portion of the allocated frequency spectrum (top), as well as a comparable 5G NR frequency band allocation (bottom). As shown, 5G NR uses a wideband approach, with its maximum bandwidth being on the order of 98 MHz. Such use of the wideband 5G carrier is more efficient than multicarrier LTE/LTE-A. It provides a number of benefits, including faster load balancing, less common channel overhead, and reduced guard bands between carriers (LTE uses for example 10% allocated to its guard bands).

In the exemplary embodiment, the 5G and LTE OFDM carriers produced by the node 509 utilize 1650 MHz of the available HFC bearer bandwidth, and this bandwidth is partitioned into two or more sub-bands depending on e.g., operational conditions, ratio of "N+0" subscribers served versus "N+i" subscribers served, and other parameters. See discussion of FIG. 8c below. In one variant, each node utilizes RF power from its upstream nodes to derive electrical power, and further propagate the RF signal (whether at the same of different frequency) to downstream nodes and devices including the wideband amplifiers.

While the present embodiments are described primarily in the context of an OFDM-based PHY (e.g., one using IFFT and FFT processes with multiple carriers in the time domain) along with TDD (time division duplex) temporal multiplexing, it will be appreciated that other PHY/multiple access schemes may be utilized consistent with the various aspects of the present disclosure, including for example and without limitation FDD (frequency division duplexing), direct sequence or other spread spectrum, and FDMA (e.g., SC-FDMA or NB FDMA).

As previously noted, to achieve high throughput using a single receiver chipset in the consumer premises equipment (CPEe) 513 and 3GPP 5G NR waveforms over a single coaxial feeder, such as the coaxial cable that MSOs bring to their subscriber's premises or the single coaxial cable that is installed for lower-cost single input single output (SISO) distributed antenna systems (DAS), the total carrier bandwidth that can be aggregated by the prior art chipset is limited to a value, e.g. 800 MHz, which is insufficient for reaching high throughputs such as 10 Gbit/s using one data stream alone given the spectral efficiencies supported by the 3GPP 5G NR standard.

Since the 3GPP 5G NR standard supports the transmission of multiple independent parallel data streams as part of a multiple input multiple output (MIMO) channel for the same RF bandwidth to leverage the spatial diversity that wireless channels afford when multiple antenna elements are used, the very first generation of 3GPP 5G chipsets will support such parallel MIMO data streams. However, attempts to transmit these parallel streams over a single cable would generally be counterproductive, as all the streams would occupy the same RF bandwidth and would interfere with each other for lack of spatial diversity between them.

Accordingly, the various embodiments of the apparatus disclosed herein (FIGS. 8 and 8a) leverage the parallel MIMO data streams supported by 3GPP 5G NR, which are shifted in frequency in the transceiver node 509 before being injected into the single coaxial feeder so that frequency diversity (instead of spatial diversity; spatial diversity may be utilized at the CPEe and/or supplemental pole-mounted radio access node 506a if desired) is leveraged to achieve the maximum total carrier bandwidth that 3GPP 5G NR chipsets will support with parallel data streams. Conceptually, a transparent "pipe" that delivers MIMO streams which converge at the CPEe is created. Based on channel quality feedback from the CPEe back to the node (e.g., DUe 506 or node 509), the contents of the MIMO streams are mapped to different frequency resources, e.g. with a frequency selective scheduler, and the appropriate modulation and coding scheme (MCS) is selected by the transmission node for the contents. The aforementioned "pipe" disclosed herein acts in effect as a black box which internally reroutes different antenna ports to different frequency bands on the cable bearer medium.

FIG. 8b shows a comparison of prior art LTE/LTE-A frequency bands and associated guard bands over a typical 100 MHz portion of the allocated frequency spectrum (top), as well as a comparable 5G NR frequency band allocation (bottom). As shown, 5G NR uses a wideband approach, with its maximum bandwidth being on the order of 98 MHz. Such use of the wideband 5G carrier is more efficient than multicarrier LTE/LTE-A. It provides a number of benefits, including faster load balancing, less common channel overhead, and reduced guard bands between carriers (LTE uses for example 10% allocated to its guard bands).

Accordingly, in one variant of the present disclosure (FIG. 8c), the node 509 is configured to offset the aforementioned individual parallel MIMO data streams in the frequency spectrum using a plurality of 5G NR widebands 832 (here, TDD carriers) distributed between lower and upper frequency limits 852, 854, each wideband having a center frequency and associated guardband (not shown) to the next adjacent wideband carrier(s) 832. In one implementation, the 5G NR values of maximum bandwidth and guardband are used; however, it will be appreciated that the various aspects of the present disclosure are in no way so limited, such values being merely exemplary. In the illustrated embodiments of FIG. 8c, N bands or TTD carriers 832 are spread across of the available spectrum, the latter which may in one example be 1.6 GHz as discussed previously herein, although other values are contemplated (including to frequencies well above 1.6 GHz, depending on the underlying cable medium losses and necessary transmission distances involved). As shown, depending on the available bandwidth and the bandwidth consumed by each TDD carrier 832, more or less of such carriers can be used (three shown on the left portion of the diagram, out to "n" total carriers. Notably, while a number of nominal 98 MHz NR carriers may be used, the embodiments of FIG. 8c also contemplate (i) much wider carriers (depending on the number of layers 837, 838 used, as shown in the bottom portion of FIG. 8c), and (ii) use of carrier aggregation or CA mechanisms to utilize two or more widebands together effectively as a common carrier.

As further shown in the top portion 830 of FIG. 8c, a lower band 834 is configured for FDD use; specifically, in this implementation, a downlink synchronization channel 833 (discussed elsewhere herein) is created at the lower portion of the band 834, and one or more LTE FDD bands 842 are created (such as for UL and DL channels as described below with respect to the bottom portion of FIG. 8c). The total bandwidth of the FDD band 834 is small in comparison to the remainder of the spectrum (i.e., between the lower and upper limits 852, 854), the latter used to carry, inter alia, the 5G NR traffic.

In the exemplary implementation 840 (FIG. 8c, bottom portion) of the generalized model 830 (FIG. 8c, top portion), the individual 5G TDD carriers 832 each include multiple "layers" 837, 838, which in the exemplary configuration correspond to MIMO ports and which can be utilized for various functions. As shown, a common UL/DL layer 837 is associated with each or the larger carriers 832 (to maintain an uplink and downlink channel), as are a number (L) of additional UL or DL layers 838 (e.g., which can be selectively allocated to UL or DL, the latter being the predominant choice due to service asymmetry on the network where DL consumes much more bandwidth than UL). In one variant, each layer is 98 MHz wide to correspond to a single NR wideband, although this value is merely exemplary.

Within the LTE FDD band 842, two LTE carriers for UL and DL 835, 836 are used, and a separate DL synchronization channel 833 is used at the lower end of the spectrum. As will be appreciated, various other configurations of the lower portion of the cable spectrum frequency plan may be used consistent with the present disclosure. In one variant, the lower spectrum portion 842 (FIG. 8c) is allocated to a 3GPP 4G LTE MIMO carrier with two parallel streams 835, 836 of about 20 MHz bandwidth for a total of about 40 MHz (including guardbands). This is performed since 3GPP Release 15 only supports 5G NR in Non-Standalone (NSA) mode, whereby it must operate in tandem with a 4G/4.5 LTE carrier.

As an aside, 5G NR supports adaptive TDD duty cycles, whereby the proportion of time allocated for downstream and upstream transmissions can be adapted to the net demand for traffic from the total set of transmitting network elements, viz. the node and all the CPEe 513 sharing the coaxial bus with the node. 4G LTE does not support such adaptive duty cycles. To prevent receiver blocking in the likely scenario that the 5G and 4G duty cycles differ, high-rejection filter combiners 814 (FIG. 8a) are used in all active network elements, viz. transceiver nodes, inline amplifiers and CPEe 513 for the 4G and 5G carriers to not interfere with each other or cause receiver blocking. In the exemplary diplexer of FIG. 8a, both 4G and 5G are addressed via a high-rejection filter to allow for different duty cycles.

As noted above, another minor portion 833 of the lower spectrum on the coaxial cable (e.g., <5 MHz) employs one-way communication in the downstream for the transmission of two digital synchronization channels, one for 5G and one for 4G, which are I-Q multiplexed onto one QPSK analog synchronization channel within the aforementioned "minor portion" 833 from the signal generator 818 of the transceiver node 409 to the multiple inline amplifiers and CPEe 513 that may be sharing the coaxial bus. These synchronization channels aid coherent reception of the PRBs, specifically, the synchronization signal is used to achieve frequency synchronization of oscillators in all active components downstream from the node such as line-extender amplifiers and CPEe's. The oscillators for the 4G and 5G technologies may be independent. If the carrier uses FDD, such as on the 4G LTE channels, frequency synchronization is sufficient. If the carrier uses TDD as in the 5G NR portions of FIG. 8c, then phase synchronization is needed as well for downstream components to identify the transmission mode—downlink or uplink and the duty cycle between the two and the synchronization signal conveys this information. Since lower frequencies attenuate less on the cable, the synchronization channel is in one implementation transmitted over a lower portion of the spectrum on the cable (FIG. 8c) so that it reaches every downstream network element and CPEe. In one variant, an analog signal is modulated with two bits, where one bit switches according to the duty cycle for the 4G signal, and the other bit switches according to the duty cycle of the 5G signal, although other approaches may be utilized.

It will also be recognized that: (i) the width of each 5G TDD wideband carrier 832 may be statically or dynamically modified based on e.g., operational requirements such as demand (e.g., network or bandwidth requirements of any dedicated bearer created for enhanced-QoE voice services), and (ii) the number of wideband carriers 832 used (and in fact the number of layers utilized within each wideband carrier 832) can be similarly statically or dynamically modified. It will also be appreciated that two or more different values of bandwidth may be used in association with different ones of the plurality of widebands, as well as being aggregated as previously described.

The values of $f_{lower}$ 852 and $f_{upper}$ 854 may also be varied depending on operational parameters and/or other considerations, such as RF signal attenuation as a function of frequency as discussed in detail previously herein. For example, since higher frequencies attenuate much more over the coaxial transmission media than lower frequencies, in one variant the Intermediate Frequencies (IF) are transmitted over the media, and block-conversion to RF carrier frequency is employed subsequently in the consumer premises equipment (CPEe) 513 for 3GPP band-compliant interoperability with the 3GPP 5G NR chipset in the CPEe. In this fashion, attenuation that would otherwise be experienced by conversion earlier in the topology is advantageously avoided. Similarly, very short runs of cable (e.g., a "last mile" between a fiber delivery node and a given premises, or from a distribution node to various subscriber CPEe within a multi-dwelling unit (MDU) such as an apartment or condominium building, hospital, or enterprise or school campus can be mapped out into much higher frequencies since their overall propagation distance over the cable is comparatively small.

In another variant, active or dynamic Tx/Rx port formation specified in the 5G NR standards is utilized, yet the formed beams therein are substituted with frequency bandwidth assignments as discussed above (i.e., total bandwidth, $f_{lower}$ 852 and $f_{upper}$ 854 values, and TDD carrier bandwidth values).

Figure 8C:
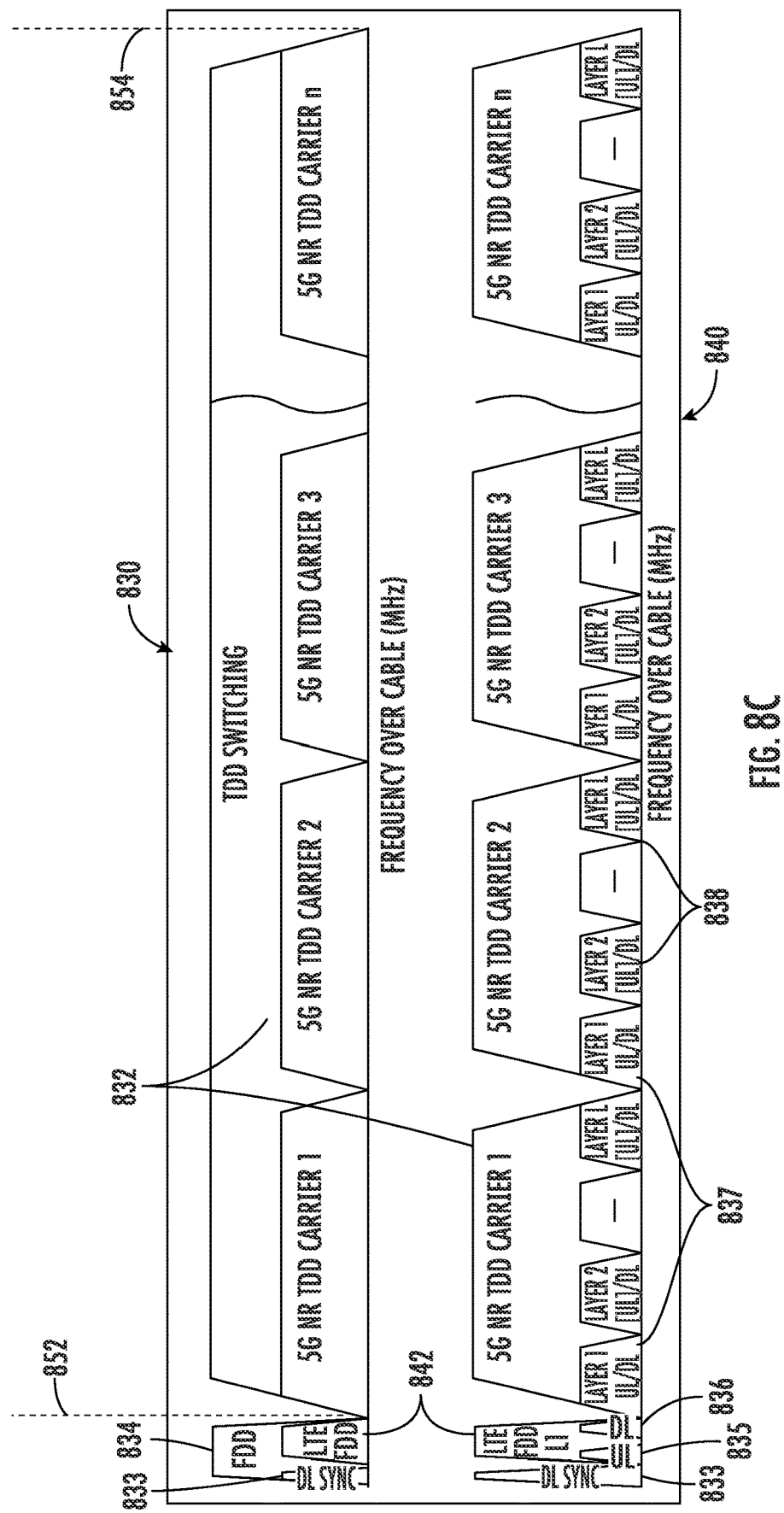
FIG. 8c is a graphical representation of a frequency spectrum allocation according to one embodiment of the present disclosure.

The foregoing aspects of FIG. 8c also highlight the fact that, while some exemplary configurations described herein utilize two (2) MIMO ports or streams as baseline of sorts for frequency diversity on the cable medium (i.e., in order to reduce the frequency-based filtering complexity in the CPEe 513), a much greater level of complexity in frequency planning can be utilized consistent with the present disclosure, including use of more MIMO layers and different bandwidths per TDD carrier 832. Specifically, exemplary embodiments herein map the different antenna ports to different frequency bands on the cable, with different frequency bands experiencing different levels of propagation loss, phase delay, environmental interference and self-interference. Hence, independent channels with frequency diversity for signals to reach the CPEe are created. When upconverted to RF frequency at the CPEe, the CPEe in one implementation processes these signals as if they were received over the air, and will (as shown in block 910 of FIG. 9), upconvert each frequency band on the cable, from 50 to 850 MHz for Port 0 and 850 to 1650 MHz for Port 1 in the exemplary embodiment, to the same RF frequency, thereby realigning them by virtue of a different frequency multiplier being applied to each port. Moreover, in the exemplary embodiment. The CPEe provides channel quality information (CQI), rank Indicator (RI) and precoding matrix indicator (PMI) feedback back to the distribution node 509 consistent with extant 3GPP protocols. If the higher frequencies on the cable medium are not excessively attenuated (see FIGS. 7a and 7b), an RI of 2 (for 2-layer MIMO) will be reported back to the node 509. The node then uses this information to code independent layers of data to the CPEe. However, depending on permissible complexity in the CPEe and the physical characteristics of the cable relative to topological location of the CPEe, four (4), or even (8) layers may be utilized in place of the more simple 2-layer approach above.

In operation, the IF carriers injected by the transceiver node into the coaxial feeder 804 can be received by multiple CPEe 513 that share the feeder as a common bus using directional couplers and power dividers or taps. Point-to-Multipoint (PtMP) downstream transmissions from the node 409 to the CPEe 413 can be achieved by, for instance, scheduling payload for different CPEe on different 3GPP 5G NR physical resource blocks (PRB) which are separated in frequency.

In the exemplary embodiments of FIG. 8c, the vast majority of bandwidth in the coaxial cable bearer is used in Time Division Duplex (TDD) fashion to switch between downstream (DS) and upstream (US) 5G NR communications, depending on the configuration of the particular layers 837, 838 used in each TDD carrier 832. Upstream communications from the multiple CPEe 513 to the transceiver node can also/alternatively occur simultaneously over separate PRBs (with frequency separation) if desired. The connectivity between the transceiver node 509 and the northbound or upstream network element is achieved with a fiber optic link 802 to the MSO DWDM plant. To minimize the number of fiber channels required to feed the transceiver node 509, and to restrict it to a pair of fiber strands, in one embodiment the 3GPP 5G NR F1 interface (described supra) is realized over the fiber pair to leverage the low overhead of the F1 interface. The 3GPP 5G NR Distribution Unit (DUe) functionality is incorporated into the transceiver node 509 as previously described, since the F1 interface is defined between the Central Unit (CU/CUe) and DU/DUe where, in the illustrated embodiment, the CUe and DUe together constitute a 3GPP 5G NR base station or gNB (see FIGS. 5a-5f).

An Ethernet switch 805 is also provided at the optical interface in the embodiment of FIG. 8a to divide the backhaul into the 4G and 5G data paths (e.g., the received upstream 4G and 5G signals are respectively routed differently based on the switch 805).

The exemplary node 509 also includes a power converter 819 to adapt for internal use of quasi-square wave low voltage power supply technology over HFC used by DOCSIS network elements as of the date of this disclosure. The node 509 in one variant is further configured to pass the quasi-square wave low voltage power received on the input port 801 through to the HFC output port 804 to other active network elements such as e.g., amplifiers, which may be installed downstream of the node on the HFC infrastructure.

It is noted that as compared to some extant solutions, the illustrated embodiment of FIGS. 5 and 8, 8a, 8c uses HFC versus twisted pair to feed the CPEe 513; HFC advantageously provides lower loss and wider bandwidths than twisted pair, which is exploited to provide 5G throughputs to farther distances, and to leverage the large existing base of installed coaxial cable. Moreover, the foregoing architecture in one implementation is configured to serve multiple CPEe 513 using directional couplers and power dividers or taps to attach to a common coaxial bus which connects to a single interface at the transceiver node. The aforementioned Ethernet services (necessary to service an external Wi-Fi access-point and an integrated Wi-Fi router) are further added in other implementations to provide expanded capability, in contrast to the existing solutions.

CPEe Apparatus—

Figure 9:
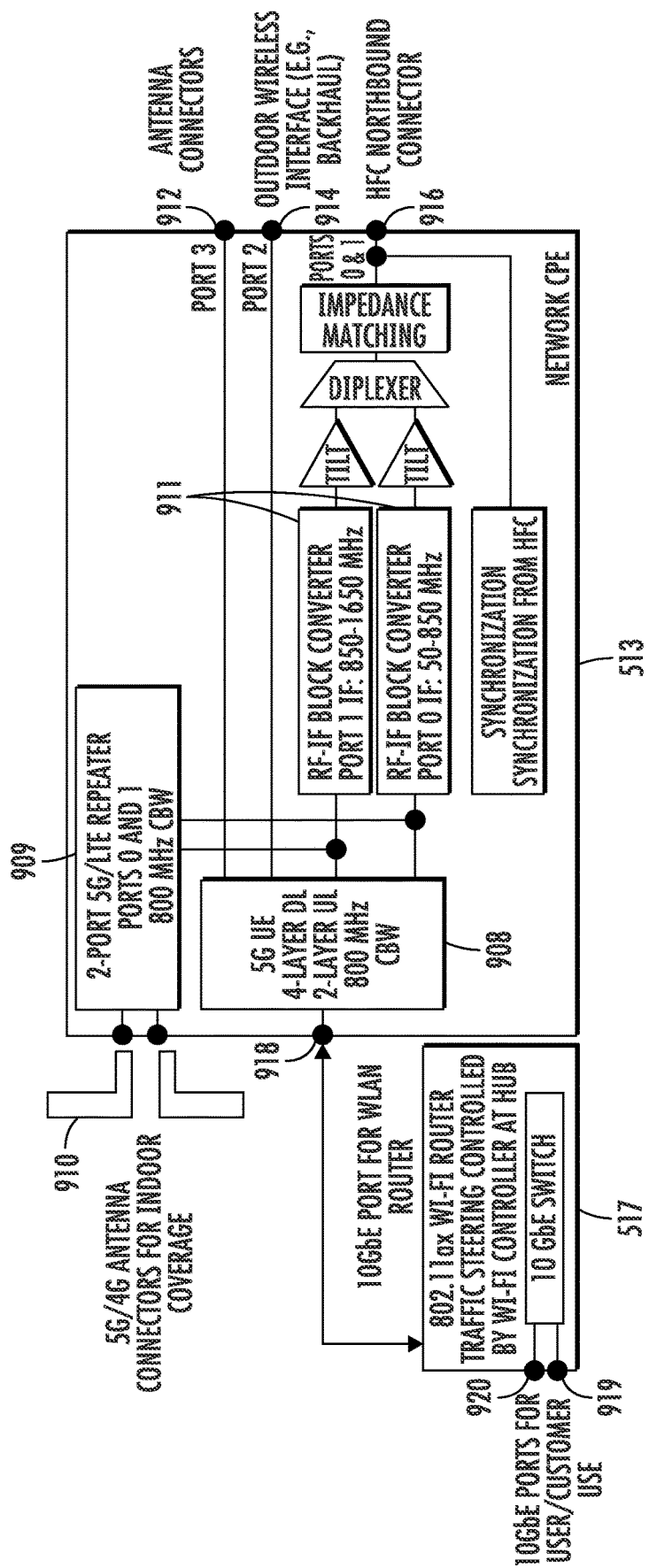
FIG. 9 is a functional block diagram illustrating an exemplary general configuration of a CPEe apparatus according to the present disclosure.

FIG. 9 illustrates an exemplary configuration of a CPEe apparatus 513 according to the present disclosure. As shown, the CPEe 513 generally an RF input interface 916 to the HFC distribution network (i.e., coax drop at the premises). A transmitter/receiver architecture generally symmetrical to the transmitter/receiver of the node 509 discussed previously is used; i.e., impedance matching circuitry, diplexer, synchronization circuit, tilt, etc. are used as part of the CPEe RF front end. Block converters 911 are used to convert to and from the coaxial cable domain bands (here, 50-850 and 850-1650 MHz) to the premises domain, discussed in greater detail below.

The exemplary CPEe 513 also includes a 5G UE process 908 to implement 3GPP functionality of the UE within the CPEe, and 3GPP (e.g., 5G/LTE) repeater module 909 which includes one or more antennae elements 910 for indoor/premises coverage within the user RF band(s). As such, the CPEe 513 shown can in effect function as a base station for user devices within the premises operating within the user band(s).

A 10 GbE WLAN port 918 is also included, which interfaces between the UE module 908 and the (optional) WLAN router 517 with internal 10 GbE switch 919) to support data interchange with premises WLAN infrastructure such as a Wi-Fi AP.

Also shown in the configuration of FIG. 9 are several external ports 912, 914 for external antenna 516 connection (e.g., roof-top antenna element(s) used for provision of the supplemental data link as previously described with respect to FIG. 5), wireless high-bandwidth backhaul, or other functions.

Figure 9A:
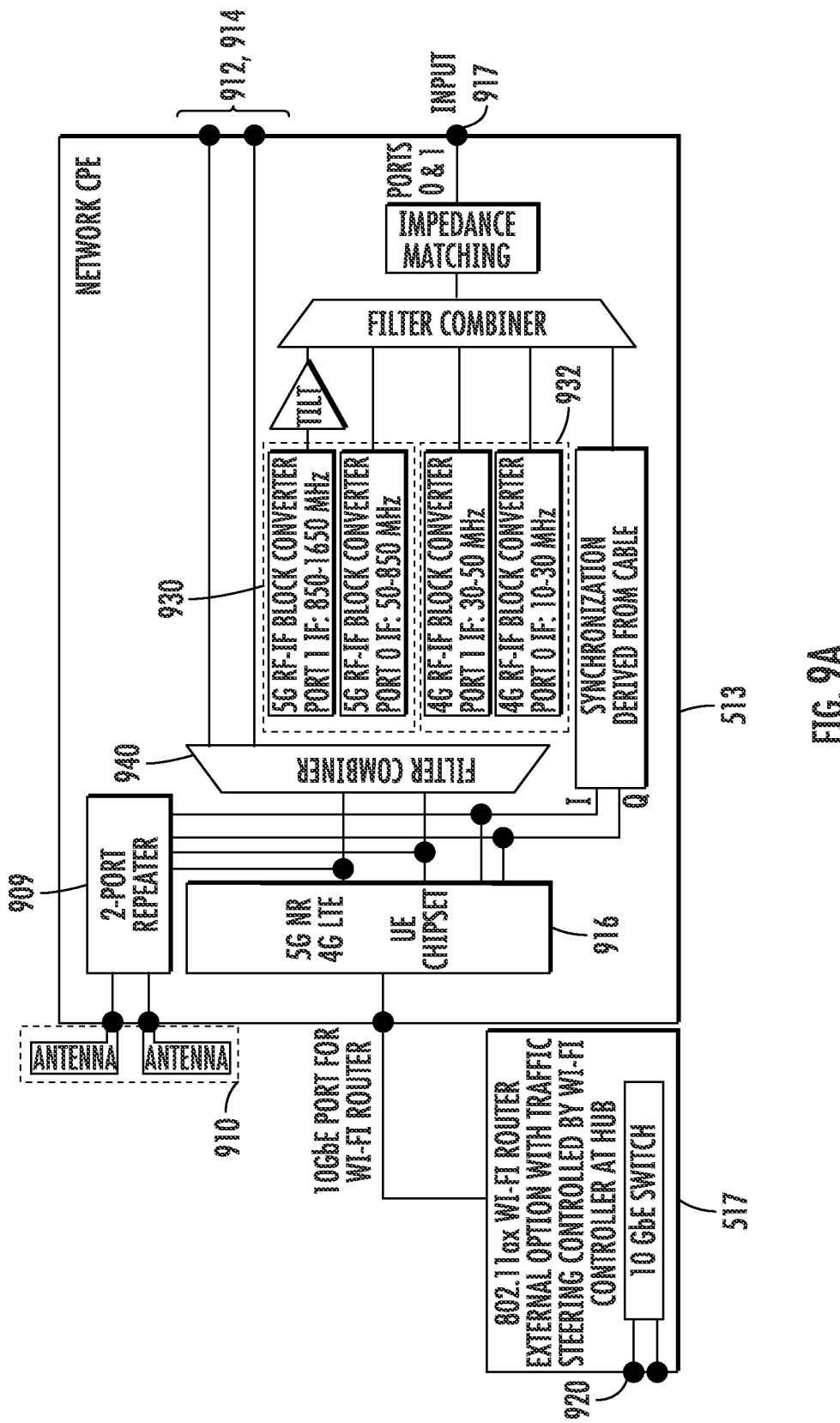
FIG. 9a is a functional block diagram illustrating an exemplary implementation of a CPEe apparatus according to the present disclosure, configured for 3GPP 4G and 5G capability.

In the exemplary implementation of FIG. 9a, both 4G and 5G gNB block converters 932, 930 are included to support the RF chains for 4G and 5G communication respectively (i.e., for conversion of the IF-band signals received to the relevant RF frequencies of the 4G/5G interfaces and modems within the CPEe, such as in the 2 GHz band. The block converters also enable upstream communication with the distribution node 509 via the relevant IF bands via the coaxial input 917 as previously described.

Notably, the CPEe 513 applies block-conversion between the IF and RF carrier frequency for the 4G and 5G carrier separately since they may be on different frequency bands. The CPEe includes in one implementation a 5G NR and 4G LTE-capable user equipment (UE) chipset 916. The two technologies are supported in this embodiment, since the first release of 3GPP 5G NR requires 4G and 5G to operate in tandem as part of the non-standalone (NSA) configuration.

It is noted that in the exemplary configuration of FIG. 9a (showing the lower frequencies in 4G combined with 5G), a filter combiner is used (in contrast to the more generalized approach of FIG. 9).

It is also noted that the specific implementation of FIG. 9a utilizes "tilt" compensation as previously described on only one of the RF-IF block converters 930. This is due to the fact that the need for such compensation arises, in certain cases such as coaxial cable operated in the frequency band noted) disproportionately at the higher frequencies (i.e., up to 1650 MHz in this embodiment). It will be appreciated however that depending on the particular application, different compensation configurations may be used consistent with the present disclosure. For example, in one variant, the upper-band block converters 930 may be allocated against more granular frequency bands, and hence tilt/compensation applied only in narrow regions of the utilized frequency band (e.g., on one or two of four 5G RF-IF block converters). Similarly, different types of tilt/compensation may be applied to each block converter (or a subset thereof) in heterogeneous fashion. Various different combinations of the foregoing will also be appreciated by those of ordinary skill given the present disclosure.

Block conversion to the RF frequency makes the signals 3GPP band-compliant and interoperable with the UE chipset in the CPEe 513. The RF carriers are also then amenable for amplification through the included repeater 909 for 4G and 5G which can radiate the RF carriers, typically indoors, through detachable external antennas 910 connected to the CPEe. Mobile devices such as smartphones, tablets with cellular modems and IoT devices can then serve off of the radiated signal for 4G and 5G service (see discussion of FIGS. 13a and 13b below).

The UE chipset 916 and the repeater 909 receive separate digital I/Q synchronization signals, one for 4G and one for 5G, for switching between the downstream and upstream modes of the respective TDD carriers, since they are likely to have different downstream-to-upstream ratios or duty cycle. These two digital synchronization signals are received from an I-Q modulated analog QPSK signal received from lower-end spectrum on the coaxial cable that feeds the CPEe 513 via the port 917.

Figure 9B:
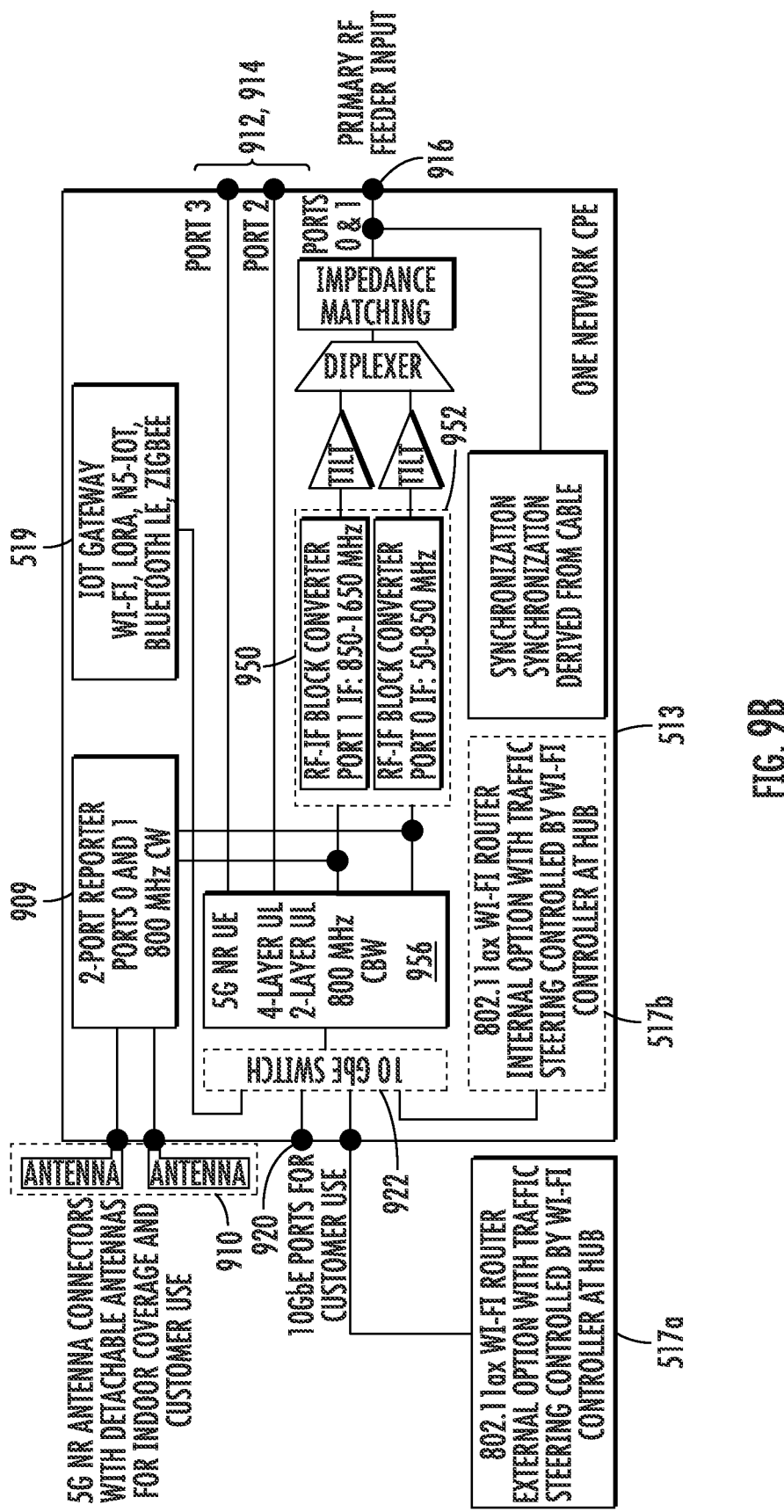
FIG. 9b is a functional block diagram illustrating another exemplary implementation of a CPEe apparatus according to the present disclosure, including IoT gateway functionality.

In the exemplary implementation of FIG. 9b, both IF-RF block converters 952, 950 are included to support the RF chains for 5G communication (i.e., for conversion of the IF-band signals received to the relevant RF frequencies of the 5G interfaces and modems within the CPEe, such as in the 2 GHz band, and vice versa). The block converters also enable upstream communication with the distribution node 509 via the relevant IF bands via the coaxial input 917 as previously described.

The CPEe of FIG. 9b includes in one implementation a 5G NR and 4G LTE-capable user equipment (UE) chipset 956. The two technologies may supported for, inter alia, support of the first release of 3GPP 5G NR requires 4G and 5G to operate in tandem as part of the non-standalone (NSA) configuration, although a standalone (SA) variant utilizing purely 5G NR waveforms is also contemplated.

The specific implementation of FIG. 9b again utilizes "tilt" compensation as previously described both of the RF-IF block converters 950, 952. This is due to the fact that the need for such compensation arises, in certain cases such as coaxial cable operated in the frequency band noted) disproportionately at the higher frequencies (i.e., up to 1650 MHz in this embodiment), and hence even the lower Port 0 block converter operating up to 850 MHz for this embodiment may require some degree of tilt compensation. As with the embodiment of FIG. 9a, depending on the particular application, different compensation configurations may be used consistent with the present disclosure.

Block conversion to the RF frequency makes the signals 3GPP band-compliant and interoperable with the UE chipset 956 in the CPEe 513. The RF carriers are also then amenable for amplification through the included repeater 909 for 5G which can radiate the RF carriers, typically indoors, through detachable external antennas 910 connected to the CPEe. Mobile devices such as smartphones, tablets with cellular modems and IoT devices can then serve off of the radiated signal for 5G (and 4G, where so equipped) service (see discussion of FIGS. 13a and 13b below).

The UE chipset 956 and the repeater 909 receives digital I/Q synchronization signals (not shown) for switching between the downstream and upstream modes of the respective TDD carriers. These digital synchronization signals are received from an I-Q modulated analog QPSK signal received from lower-end spectrum on the coaxial cable that feeds the CPEe 513 via the port 917.

As noted, in the exemplary implementation, OFDM modulation is applied to generate a plurality of carriers in the time domain at the distribution node 509; accordingly, demodulation (via inter alia, FFT) is used in the CPEe to demodulate the IF signals. See, e.g., co-owned and co-pending U.S. Pat. No. 9,185,341 issued Nov. 10, 2015 and entitled "Digital domain content processing and distribution apparatus and methods," and U.S. Pat. No. 9,300,445 issued Mar. 29, 2016 also entitled "Digital domain content processing and distribution apparatus and methods," each incorporated herein by reference in their entirety, for inter alia, exemplary reprogrammable OFDM-based receiver/demodulation apparatus useful with various embodiments of the CPEe 513 described herein.

Similar to the embodiment of FIG. 9, a 10 Gbe Ethernet port and associated GbE switch 922 is also provided to support operation of the WLAN router 517 in the devices of FIGS. 9a and 9b, including for LAN use within the served premises.

Further, to boost the broadband capacity beyond the capacity available through the primary coaxial cable link and to add a redundant connection for higher reliability (which could be important for small businesses, enterprises, educational institutions, etc.), two additional RF interfaces on the CPEe of FIGS. 9a and 9b are included for connecting the CPEe to a 2-port external antenna 516 which is installed outdoors, e.g., on the roof of the small business, multi-dwelling unit (MDU) or multi-story enterprise. This external antenna can be used to receive supplemental signals from outdoor radios installed in the vicinity of the consumer premises. It will be appreciated that the outdoor radios may have a primary purpose of providing coverage for outdoor mobility, but signals from them can also/alternatively be used in a fixed-wireless manner to supplement the capacity from the primary coaxial link and to add redundancy, as described elsewhere herein.

IoTG Apparatus—

Figure 10A:
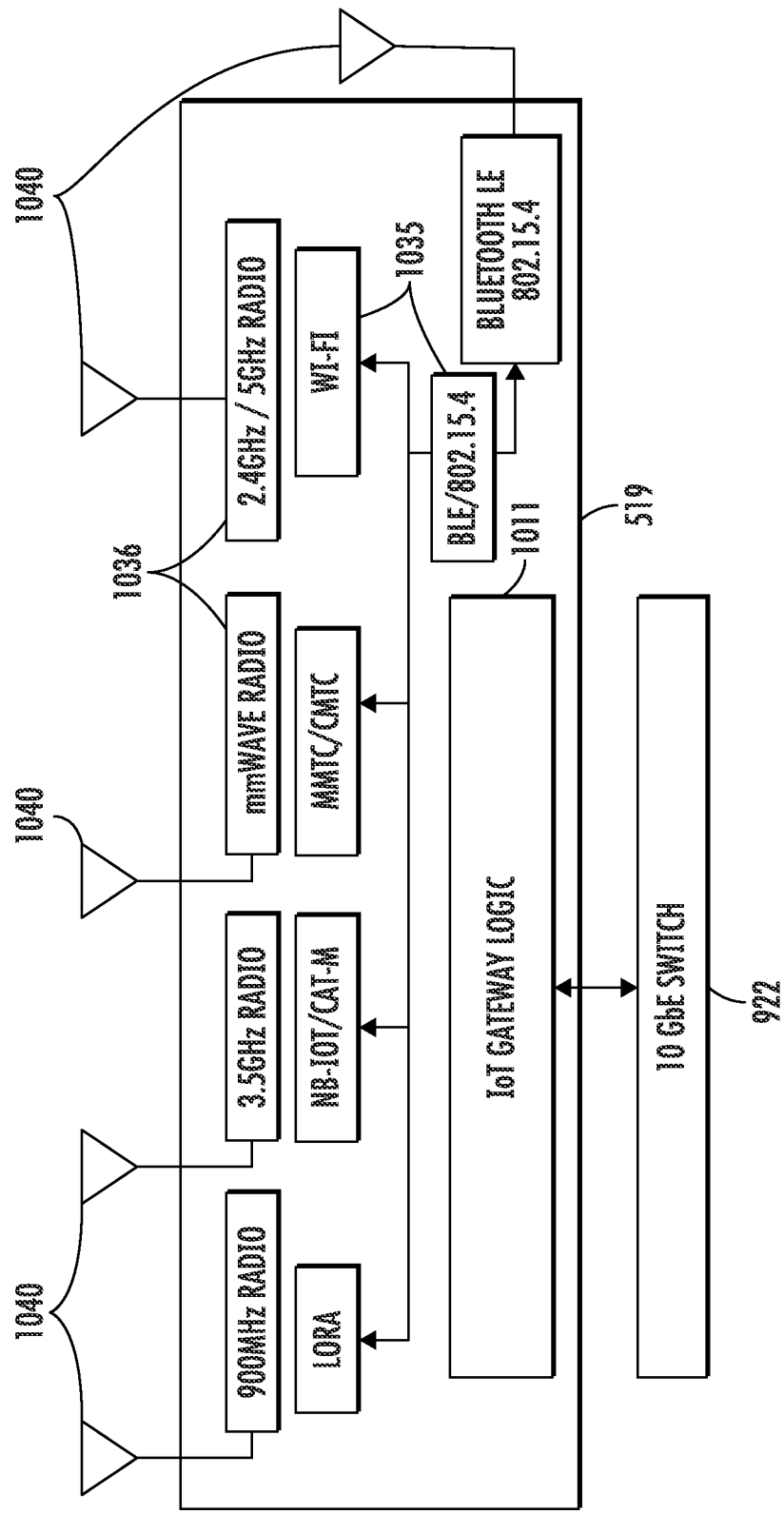
FIG. 10a is a functional block diagram illustrating an exemplary general configuration of a standalone IoTG apparatus according to the present disclosure.

FIG. 10a is a functional block diagram illustrating an exemplary general configuration of an IoTG Gateway according to the present disclosure.

As shown in FIG. 10a, the IoTG includes, a plurality of heterogeneous Rx/Tx RF front ends, antennae elements, baseband processing modules. It will be appreciated that while IEEE Std. 802.15.4, BLE, LoRA NB-IOT, MMTC, etc. interfaces are shown in the figure, literally any combination of interfaces may be used (so long as they are configured to be mutually non-interfering, whether by frequency band, spreading code, MCS used, TDD, or medium access contention resolution mechanisms).

In this and various embodiments, the IOT Gateway includes the functions of the IoTG server stack and the communication with relevant network entities such as the CPEe and upstream nodes 509. IOT gateway is connected to different IOT access front ends. The spectrum used will be the following for different RF front ends, 900 MHz for LORA, 3.5 GHz radio front end for NB-IOT/CAT-M, mmWave 37 GHz radio front end for MMTC/CMTC and Bluetooth LE. These all get consolidated in the IOT gateway which connects to either 4G/5G access via 10GE internal switch.

The IOT gateway will have an IOT stack where all the data from the different IOT modules will be combined.

As shown in the figure the data will be routed to 4G/5G interface via the 10GE switch which is being shared between the IOT gateway and 5G CPE.

The network interface(s) generally includes wireline data interfaces such as IEEE 802.3 Ethernet/GbE/10 GbE (via CAT-5/6 cabling), IEEE-1394, USB, or other, useful for transmitting data communications (such as the IoT "data") upstream for delivery to the CPEe and ultimately to the HFC network (FIG. 5), as well as for transacting data for control or access of the IoTG from the remote mobile device (see discussion of FIGS. 12 and 12b below). For example, in one embodiment, the interface comprises a 10 GbE interface between the IoTG and the CPEe via the 10GE switch It will be appreciated that while shown as separate components, two or more of the IoTG, 10GE switch and CPEe can be combined into a common device, thereby further simplifying the architecture.

Figure 10B:
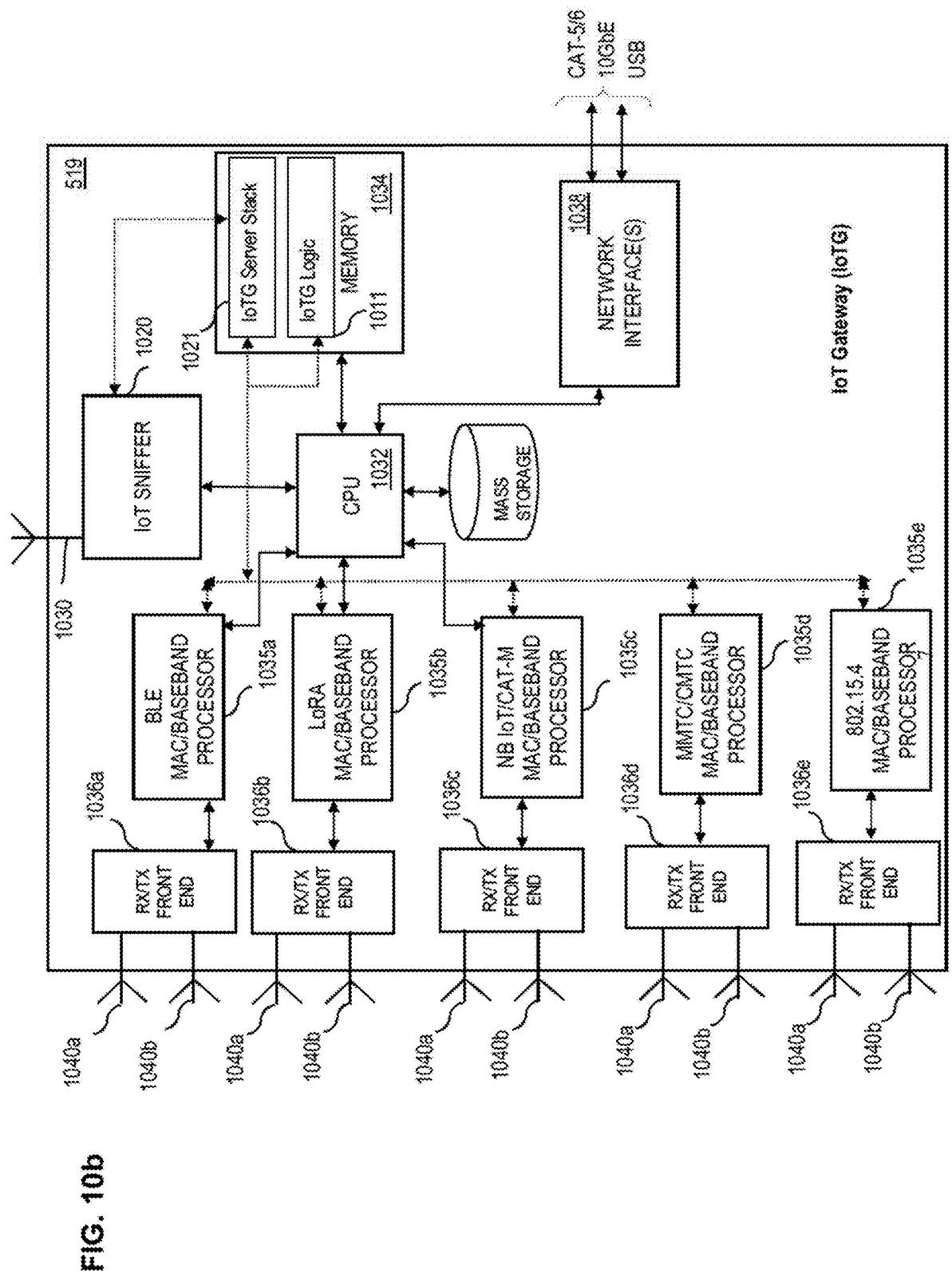

FIG. 10b is a functional block diagram illustrating an exemplary implementation of a standalone IoTG apparatus 519 according to the present disclosure.

As shown in FIG. 10b, the IoTG 519 includes, inter alia, a processor subsystem with CPU 1032, a memory module 1034, one or more network data interfaces 1038, and a plurality of heterogeneous Rx/Tx RF front ends 1036a-e, antennae elements 1040a-b, and MAC baseband processing modules 1035a-e for respective ones of the different air interfaces supported by the IoTG 519. It will be appreciated that while IEEE Std. 802.15.4, BLE, LoRA, etc. interfaces are shown in the figure, literally any combination of interfaces may be used (so long as they are configured to be mutually non-interfering, whether by frequency band, spreading code, MCS used, TDD, or medium access contention resolution mechanisms).

The processor subsystem 1032 of the IoTG 519 may include one or more of a digital signal processor (DSP), microprocessor (e.g., RISC core(s) such as ARM core), field-programmable gate array, or plurality of processing components mounted on one or more substrates (e.g., printed circuit board). The processor subsystem/CPU 1032 may also comprise an internal cache memory (e.g., L1/L2/L3 cache). The processor subsystem is in communication with a memory subsystem 1004, the latter including memory which may for example comprise SRAM, flash, and/or SDRAM components. The memory subsystem may implement one or more of DMA-type hardware, so as to facilitate data accesses as is well known in the art. The memory subsystem of the exemplary embodiment contains computer-executable instructions which are executable by the processor subsystem.

In this and various embodiments, the processor subsystem/CPU 1032 is configured to execute at least one computer program stored in program memory 1034 (e.g., a non-transitory computer readable storage medium), including functions of the IoTG server stack where equipped 1021, and to support the IoT sniffer 1020 is used, as well as communication with relevant network entities such as the CPEe and upstream nodes 509. In terms of the IoT sniffer 1020, see, e.g., co-pending U.S. patent application Ser. No. 15/821,218 filed Nov. 22, 2017 entitled "APPARATUS AND METHODS FOR PREMISES DEVICE EXISTENCE AND CAPABILITY DETERMINATION," and issued as U.S. Pat. No. 10,966,073 on Mar. 30, 2021, which is incorporated herein by reference in its entirety. As disclosed therein, the IoT sniffer function and module leverages the ability to passively canvass or assess a given premises as to its IoT profile, including both transparent and proxy-managed installations. Data obtained via this canvassing can be utilized by e.g., a network operator or service provider for any number of different functions, including (i) populating on-screen displays such as cloud-based EPGs or device setup UIs with data relating to all such IoT devices within the premises; and (ii) one-stop management of various aspects of the IoT devices (e.g., naming, interconnectivity functions, reporting, etc.). In one embodiment thereof, the passive canvassing of the premises is conducted by a software-defined radio (SDR) device incorporated into another MSO (host) device at the premises (here, the IoTG 519 and/or CPEe 513 depending on configuration). The SDR is controlled by logic operative to run on the host device, enabling the SDR to scan the RF environment within the premises in particular frequency bands typically associated with IoT devices and protocols, including those of the IoTG air interfaces. In one variant, the SDR and logic are configured to acquire and decode one or more broadcast channels of the IoT device(s) to obtain yet additional information regarding the particular device. The sniffer (if used) may also make use of the extant IoT air interfaces of the IoTG 519, such as for IoT device canvassing and detection, thereby avoiding any requirement or use of duplicative air interfaces.

Advantageously, by having the IoT sniffer module 1020 co-located with the IoTG 519, the typically centralized location of the IoTG can be leveraged for the characteristically shorter range of the IoT (PAN) interfaces. Moreover, even if the PAN interfaces use the same 2.4 GHz band as the WLAN interface 517 of the router, mutual interference to the WLAN modem and vice versa is mitigated by, for instance the reduced signal strength, different sub-band allocations, and CSMA-CD mechanisms of the exemplary 802.15.4 MAC/PHY of the typical IoT device. Notably, IEEE Std. 802.11g/n implementations use a 20 MHz channel width, with 16.25 MHz allocated to sub-carriers for the OFDM interface. Specifically, channels at 2412, 2437, and 2462 MHz are supported. Similarly, 40 MHz channels with 33.75 allocated to OFDM subcarriers may be used in certain modes of 802.11n for enhanced data throughput; e.g., centered at 2422 MHz.

Various other functions in support of the individual air interface modems are also performed by the device, including baseband management (e.g., transmit and receive functions via the baseband processor 1035 and associated Tx and Rx chains of the RF front end 1036 and their MIMO or spatially diverse antenna elements 1040a, 1040b).

As shown in FIG. 10b, the network interface(s) 1038 generally includes wireline data interfaces such as IEEE 802.3 Ethernet/GbE/10 GbE (via CAT-5/6 cabling), IEEE-1394, USB, or other, useful for transmitting data communications (such as the IoT "data") upstream for delivery to the CPEe 513 and ultimately to the HFC network (FIG. 5), as well as for transacting data for control or access of the IoTG from the remote mobile device (see discussion of FIGS. 12 and 12*b* below). For example, in one embodiment, the interface comprises a 10 GbE interface between the IoTG and the CPEe when configured as stand-alone devices.

It will be appreciated that while shown as separate components, two or more of the IoTG 519, WLAN router 517 and CPEe 513 can be combined into a common device, thereby further simplifying the architecture.

IoTG-Enabled Mobile Device—

Figure 11:
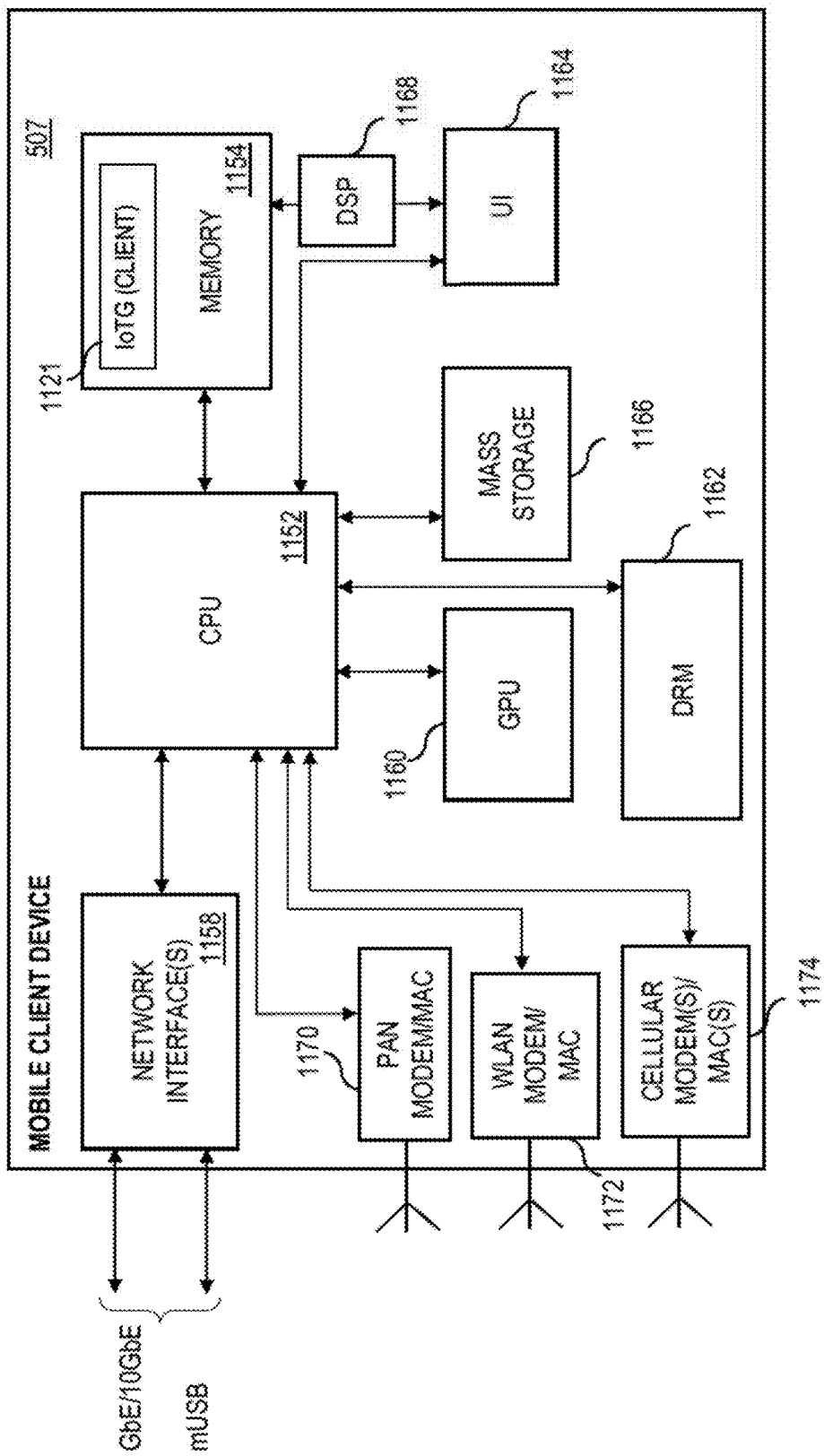
FIG. 11 is a functional block diagram illustrating an exemplary general configuration of a mobile client device with IoTG control and interface capability, according to the present disclosure.

FIG. 11 is a functional block diagram illustrating an exemplary general configuration of a mobile client device 507 with IoTG control and interface capability, according to the present disclosure. As shown in FIG. 11, the mobile client device 507 (e.g., the user mobile device shown in FIG. 5) includes, inter alia, a processor subsystem with CPU 1152, a memory module 1154, one or more network interfaces 1158, graphics co-processor (GPU) 1160, a DRM manager 1162, mass storage device 1166, DSP 1168, user interface (UI) 1164 and an RF baseband processing module 1116. The client device 507 also includes a PAN interface (e.g., Bluetooth or BLE) 1170, WLAN (802.11) interface 1172, and cellular data/voice interface(s) 1174.

In one exemplary embodiment, the processor subsystem/CPU 1152 may include one or more of a digital signal processor (DSP), microprocessor (e.g., RISC core(s) such as ARM core), field-programmable gate array, or plurality of processing components mounted on one or more substrates (e.g., printed circuit board). The processor subsystem/CPU 1152 may also comprise an internal cache memory (e.g., L1/L2/L3 cache). The processor subsystem is in communication with a memory subsystem 654, the latter including memory which may for example comprise SRAM, flash, and/or SDRAM components. The memory subsystem may implement one or more of DMA-type hardware, so as to facilitate data accesses as is well known in the art. The memory subsystem of the exemplary embodiment contains computer-executable instructions which are executable by the processor subsystem.

In this and various embodiments, the processor subsystem/CPU 1152 is configured to execute at least one computer program stored in program memory 1154 (e.g., a non-transitory computer readable storage medium). A GPU 1160 and DRM module 1160 are also in data communication with the processor subsystem 1152, and collectively the foregoing components include a plurality of computer programs/firmware configured to perform various functions such as conditional access/digital rights management, decryption, content decode and rendering, as well as communication with relevant network entities such as the IoTG server stack 1021 or the managed network proxy or application server (where used; see FIG. 12*a*). Various other functions useful for and typical in consumer electronics including user interface via the UI 1164 (e.g., capacitive touch-screen with soft function key generation) and speech recognition via the DSP 1168 are provided in the exemplary device.

In operation, the IoTG client application 1121 executes on the CPU 1152 to enable the user to access, visualize, and control as applicable the various IoT devices 565*a-c* within the controlled premises. The client application or "app" logically communicates with the IoTG server functionality (wherever disposed) so as to enable such functions by the user, including when mobile and away from the premises.

Figure 12A:
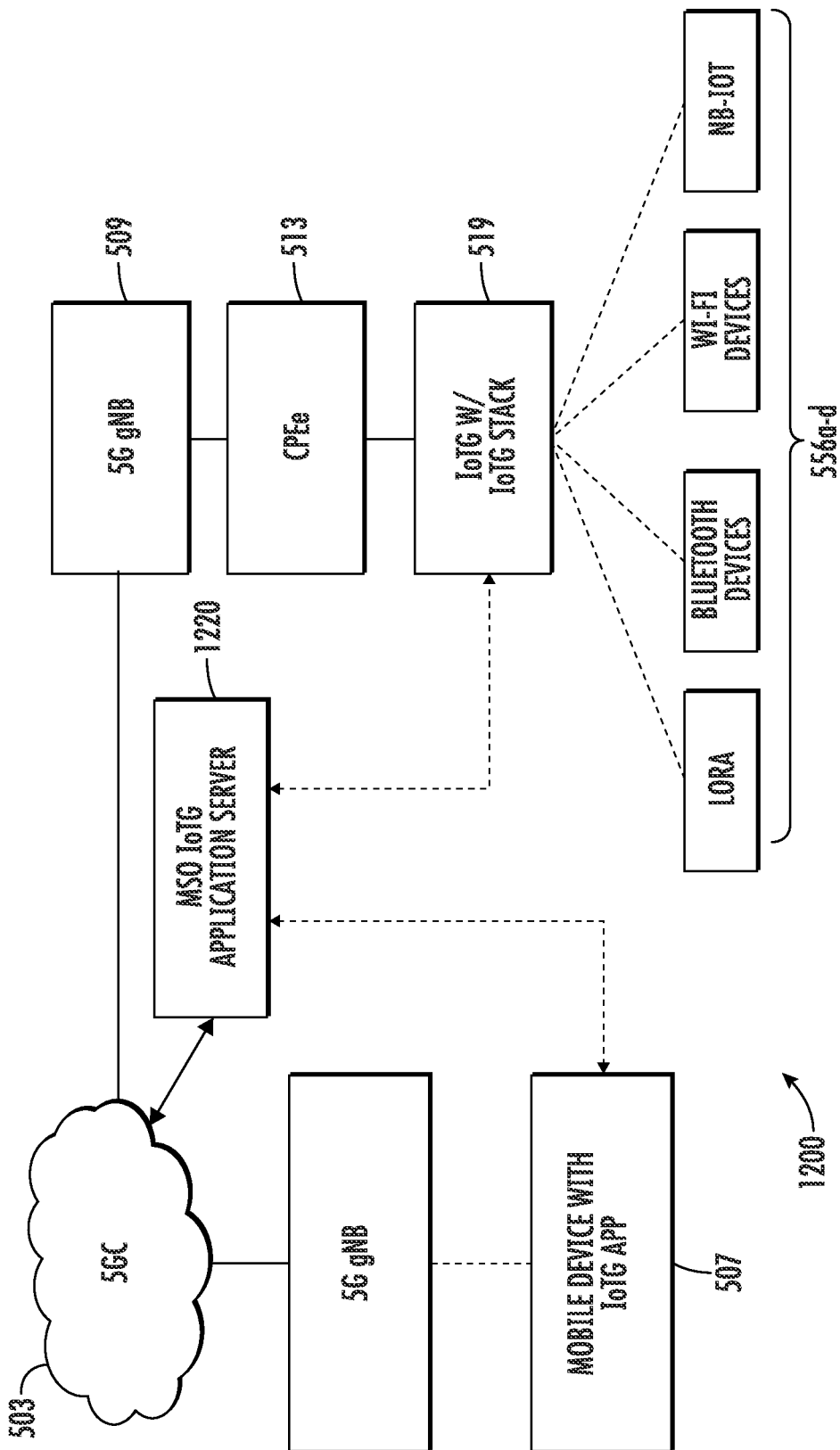
FIG. 12a is a functional block diagram illustrating a first exemplary network architecture for IoTG connectivity with the mobile device of FIG. 11.

FIG. 12*a* is a functional block diagram illustrating a first exemplary network architecture 1200 for IoTG connectivity with the mobile device of FIG. 11. Specifically, as shown, the architecture includes the aforementioned mobile device 507 (FIG. 11) which interfaces with a 5G gNB, WLAN AP, or other such access point via the relevant air interface (5G NR, IEEE Std. 802.11, etc.) for its PHY. In this embodiment, since the gNB is 5G NR compliant, 5G core functions and protocols may extend all the way to the mobile device 507, including use of 5G signaling, slicing, and other such functions afforded by Release 16 and beyond.

An MSO IoTG application server process 1220 is also in data communication with the 5GC (and hence the mobile device application 1121 via the gNB); the application server also is in logical communication with the IoTG process 1021 operative to run on the IoTG 519 at the controlled premises (via the 5G node 509, CPEe 513 and IoTG 519 as shown).

Figure 12B:
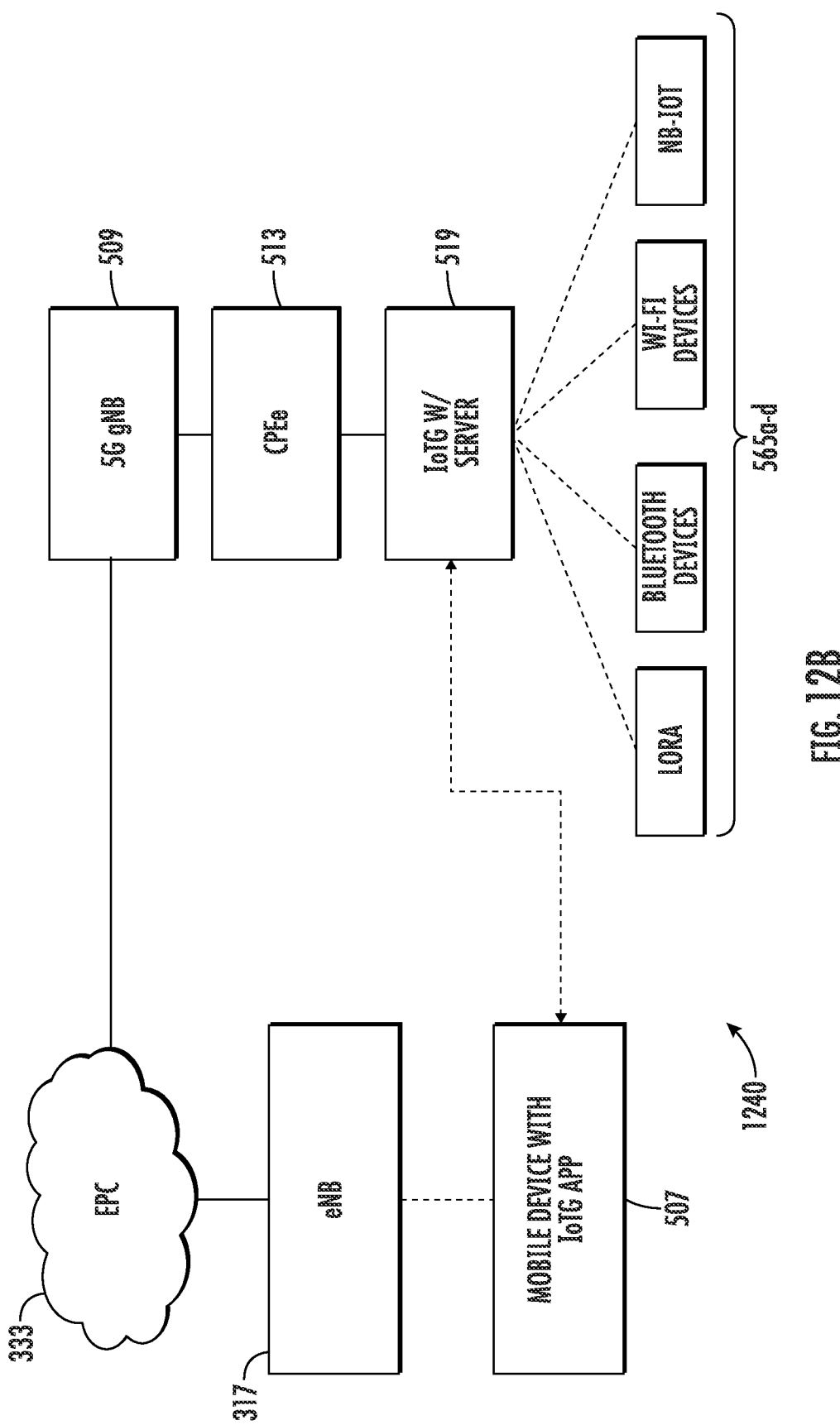
FIG. 12b is a functional block diagram illustrating a second exemplary network architecture for IoTG connectivity with the mobile device of FIG. 11.

FIG. 12*b* is a functional block diagram illustrating a second exemplary network architecture 1240 for IoTG connectivity with the mobile device of FIG. 11. In this approach, the mobile device 507 again communicates wirelessly with an access point, but here the exemplary access point is a 4G/4.5G eNB, which is served and communicative with the legacy EPC 333 (as in some NSA implementations). The 5G gNB is in user and control plane data communication with and is served by the EPC. The IoTG 519 in this embodiment is also configured to provide the functionality of the application server 1220 of FIG. 12*a*; the EPC or MSO maintains no dedicated IoTG server, but rather each user maintains logical connectivity with their respective IoTG 519 for control or access to the IoTG functions and connected devices 556*a-c*.

CPE/IoTG Control and IoT Data Services Using an Embedded Channel—

As previously described, at least the initial set of 3GPP 5G standards is based on an operating mode known as "non-standalone" or NSA. As discussed, in NSA mode the connection is anchored in LTE, while 5G NR carriers are used to boost data-rates and reduce latency.

Also, some initial NR equipment implementations may only support a connection to an LTE core network, since the 5G core network standardization may still be in progress. In such cases, for a 5G NR to operate, an LTE carrier must exist and be used for at least the system control channels (e.g. BCCH, PCCH, RACH, etc.). As technology migration from LTE/LTE-A toward 5G NR has evolved, other NSA configurations (including those involving a 5GC such as that shown in FIG. 5*d* herein) are supported. Advantageously, the various principles of the present disclosure are equally adaptable to both 5GC-based and EPC-based implementations.

The first generation of 5G capable end device chipsets will support an LTE anchor channel, since this will be the defacto mode of operation for some time. Hence, in one variant, the CPEe 513 for an evolved HFC network using 3GPP 5G waveforms is based on available device chipsets which support LTE anchor channels.

It is desired that the 5G NR portion of the network architecture 500 of FIG. 5 be tasked with delivering the data between the end user devices (e.g., UEs) and the core network (and on to the outside world). The LTE anchor channel is needed for system control information for all connected devices in such cases where the EPC core is utilized. A remaining portion of the anchor channel bandwidth can be used for command and control data, such as for the CPEe endpoints. This approach advantageously isolates the CPE control traffic from the end user traffic, and provides a means for issuing command and control (C&C) to the CPEe 513 along with other useful machine-to-machine (M2M) information for the service provider or a proxy. Moreover, the inventive CPEe 513 and/or IoTG 519 of FIG. 5 appear to the LTE (core) system as valid end user devices with subscription credentials (SIM, eSIM, etc.). A portion of the LTE traffic bandwidth is taken up in the C&C traffic between the CPEe and the MSO's OAM system. The remainder of the LTE traffic bandwidth may be used for other purposes, including additional bandwidth to the served UE(s), IoT device support, and/or yet other types of applications.

Figure 13B:
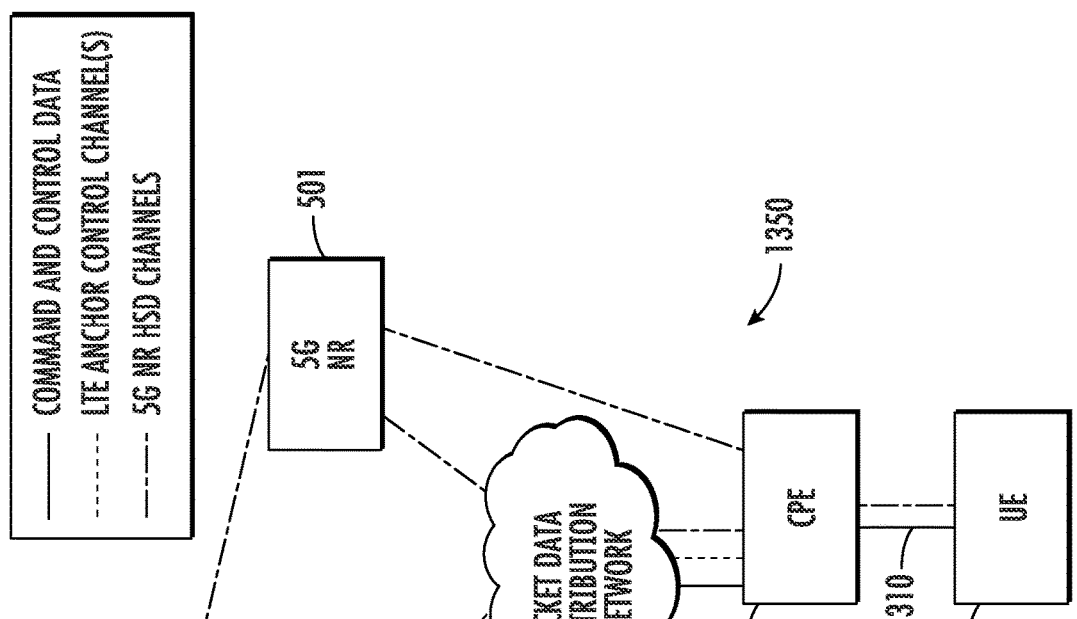
FIGS. 13a and 13b illustrate first exemplary NSA (non-standalone) architectures over which embedded LTE channels can be utilized according to the present disclosure.
Figure 13A:
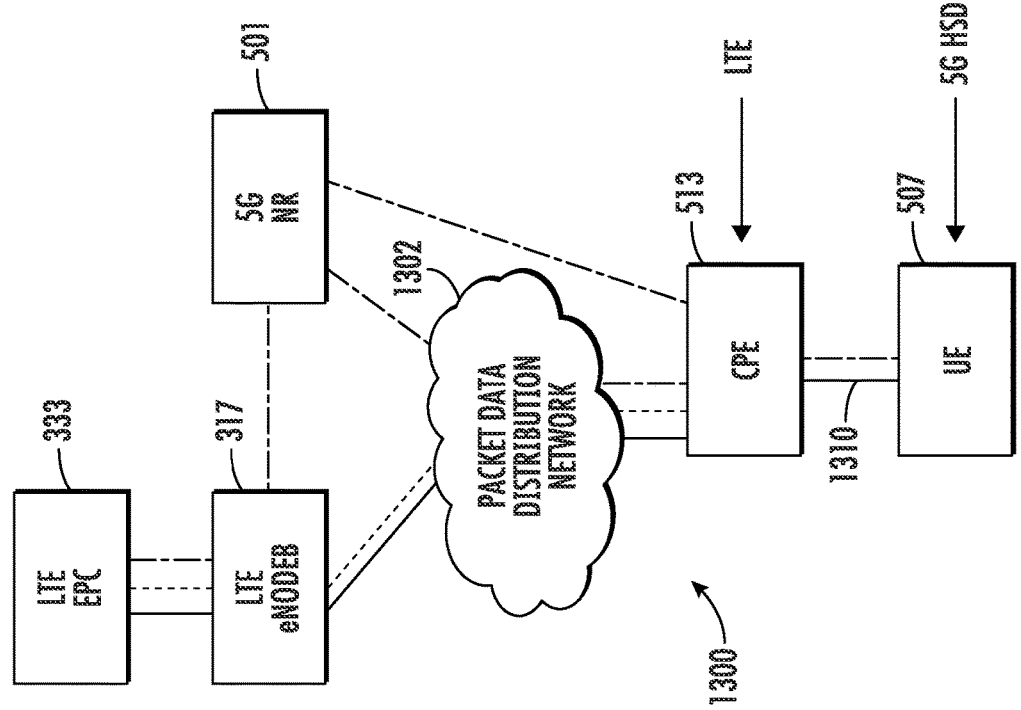

FIGS. 13a and 13b illustrate two exemplary NSA (non-standalone) architectures 1300, 1350 respectively, according to the present disclosure. The system control channels (dashed lines) required for the NSA LTE anchor channel are shown, as well as the command and control data embedded within the LTE channel (solid lines), which convey command and control information between the network OSS and the CPEe(s) 513. Also shown are 5G NR high-speed data (HSD) channels (thick lines) between the core network (in this instance, an EP Core 333) and the end user devices (e.g., 3GPP UE such as a laptop, smartphone, although the CPEe may also function as an end user device is certain configurations). The 5G NR gNBs 501 operate to provide, inter alia, connectivity between the CPEe 513 and the core via the architecture of FIG. 5 discussed supra (e.g., via the HFC infrastructure). The data connection between the CPEe and the UE can be Ethernet (e.g. Cat-6 UTP) or Wi-Fi, for example, although other wired and wireless interfaces may be substituted depending on the particular application.

The primary difference between the architectures 1300, 1350 shown is that in FIG. 13a, the gNB 501 utilizes the eNB 317 to support its user-plane data, whereas in FIG. 13b, the gNB 501 is in direct communication with the EPC for such purposes (see discussion of FIG. 6e supra). In each case, however, the command and control data 1310 terminate at the UE 507 via the CPEe 513.

Conversely, in a 5G network architecture operating in "stand-alone" mode (see e.g., FIGS. 6a-6c), a similar method may be employed; however, instead of an LTE channel being used as an anchor for command and control data, a "pure" 5G NR solution can be employed (i.e., without preservation of the anchor). The CPEe 513 in such case appear as 5G end devices (UE) with subscription credentials. The CPEe command and control traffic is a portion of the overall traffic bandwidth, and terminate at the CPEe 513.

Referring to the architectures 1400, 1450 of FIGS. 14a and 14b, respectively, the NSA-mandated LTE anchor channel is required for system control information, but a large amount of bandwidth for this function is neither necessary nor desirable, as it would remove bandwidth that could otherwise be used by the 5G NR portion of the spectrum. Accordingly, in this approach, a narrow bandwidth channel is used that is compatible with 3GPP IoT standards (i.e. eMTC, NB-IoT); a portion of the LTE anchor channel may be used for IoT transmissions with the CPEe 513 serving as the endpoint for the IoT connections (rather than the UE serving as the LTE endpoint as in FIGS. 13a-13b).

For example, eMTC/NB-IoT may occupy a 1 MHz edge band, while 5G users can use the remaining bandwidth. In some aspects, two edge 1 MHz bands may be used for eMTC/NB-IoT within an 80 MHz system, and 5G users may use the remaining center 78 MHz band. In some cases, 5G signals such as cell-specific reference signal (CRS) and channel state information reference signal (CSI-RS) may occupy only the remaining bandwidth (e.g., the center band of 78 MHz). In some aspects, 5G signals such as CRS and CSI-RS may occupy the whole bandwidth, and puncture eMTC/NB-IoT users.

For 5G systems, when NB-IoT or eMTC are present, the eNB 317 can indicate different control regions via master information block (MIB) or system information block (SIB) signaling. The different control regions may avoid collision with the NB-IoT/eMTC bandwidth. This may reduce the puncturing of NB-IoT/eMTC by the 5G systems. Once the control region is orthogonal to the NB-IoT/eMTC, the data region orthogonality can be maintained by scheduling.

In one embodiment, one or more coverage extension (CE) or coverage enhancement (CE) configurations are utilized in the random access with respective specific settings to serve UEs 507 and/or IoT devices 556a-c in different coverage conditions that have different ranges of path loss. That is, when UEs 507 and/or IoT devices 556a-c are located in the CE regions, they can have difficulty receiving the downlink channel, or the base station (e.g., eNB 317) can have difficulty receiving the uplink channel. Accordingly, the eNB selects the configuration of the radio resources; and the Modulation and Coding Scheme (MCS) and repetitions depend on UE's coverage. In one variant, a CE configuration includes performing bundle transmissions (i.e., repeated transmissions of uplink/downlink channels on a plurality of subframes). The specific settings of the CE configurations vary, and can include, e.g., how many repeated transmissions are allowed, how many subframes are used, etc.

NB-IoT defines three operation modes to provide deployment flexibility:

(i) Stand-alone (utilizing, for example, one or more GSM carriers);

(ii) Guard-band (utilizing the unused resource blocks within an LTE carrier's guardband); and (iii) In-band (utilizing resource blocks within an LTE carrier).

In certain aspects of the present disclosure, NB-IoT/eMTC can be deployed in the guardband of 5G systems. In one variant, the signaling for NB-IoT and eMTC can be extended to allow wider bandwidth support, e.g. indicating narrowband location within 80 MHz instead of 20 MHz. In certain aspects, NB-IoT/eMTC can be deployed at the edge of the narrow band.

NB-IoT provides the following physical signals and channels in the downlink:

(i) Narrowband Primary Synchronization Signal (NPSS);

(ii) Narrowband Secondary Synchronization Signal (NSSS);

(iii) Narrowband Physical Broadcast Channel (NPBCH);

(iv) Narrowband Reference Signal (NRS);

(v) Narrowband Physical Downlink Control Channel (NPDCCH); and (vi) Narrowband Physical Downlink Shared Channel (NPDSCH).

Unlike LTE, these NB-IoT physical channels and signals are primarily multiplexed in time.

NPSS and NSSS are used by an NB-IoT UE to perform cell search, which includes time and frequency synchronization, and cell identity detection. NPBCH carries the master information block (MIB).

NPDCCH carries scheduling information for both downlink and uplink data channels. It further carries the HARQ acknowledgement information for the uplink data channel as well as paging indication and random access response (RAR) scheduling information.

NPDSCH carries data from the higher layers as well as paging message, system information, and the RAR message.

NRS is used to provide phase reference for the demodulation of the downlink channels.

NB-IoT includes the following channels in the uplink.

(i) Narrowband Physical Random Access Channel (NPRACH); and (ii) Narrowband Physical Uplink Shared Channel (NPUSCH).

NB-IoT is designed to allow a UE to learn the deployment mode (stand-alone, in-band, or guard-band) as well as the cell identity (both NB-IoT and LTE) through initial acquisition. In one variant, the deployment scenario, stand-alone, in-band, or guard-band, however is transparent to a client device (e.g., UE 507, CPEe 513 or IoTG 519) when it is first turned on and searches for an NB-IoT carrier. Then the client device can determine which resource elements are used by LTE.

For the stand-alone and guard-band deployments, no LTE resource needs to be protected, thus NPDCCH, NPDSCH or NRS can utilize all the resource elements in one PRB pair (defined as 12 subcarriers over one subframe). However, for in-band deployment (see discussion of FIGS. 17-21 of the present disclosure), NPDCCH, NPDSCH or NRS cannot be mapped to the resource elements taken by the LTE Cell-Specific Reference Symbols (CRS) and LTE Physical Downlink Control Channel (PDCCH).

When the 5G stand-alone (SA) operating mode becomes available, operation of IoT channels without the LTE components will be supported, and hence the anchor channel can be obviated, and command and control of the CPEe (and other such applications) over the IoT channel alone maintained.

Figure 15B:
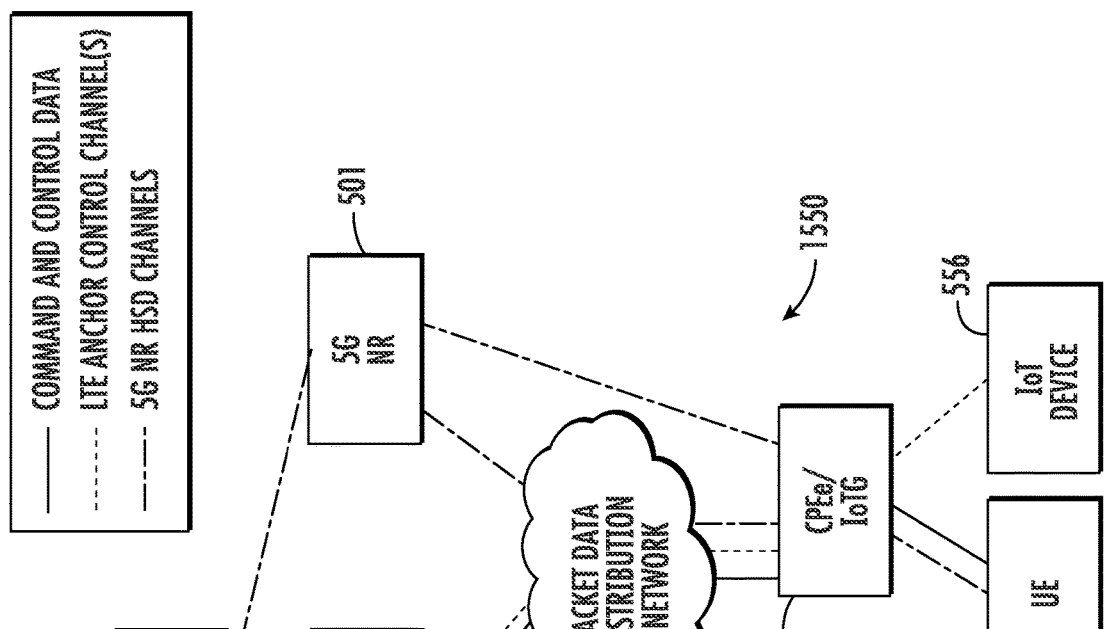
FIGS. 15a and 15b illustrate other exemplary NSA (non-standalone) architectures over which embedded LTE channels can be utilized for provision of IoT services, according to the present disclosure.
Figure 15A:
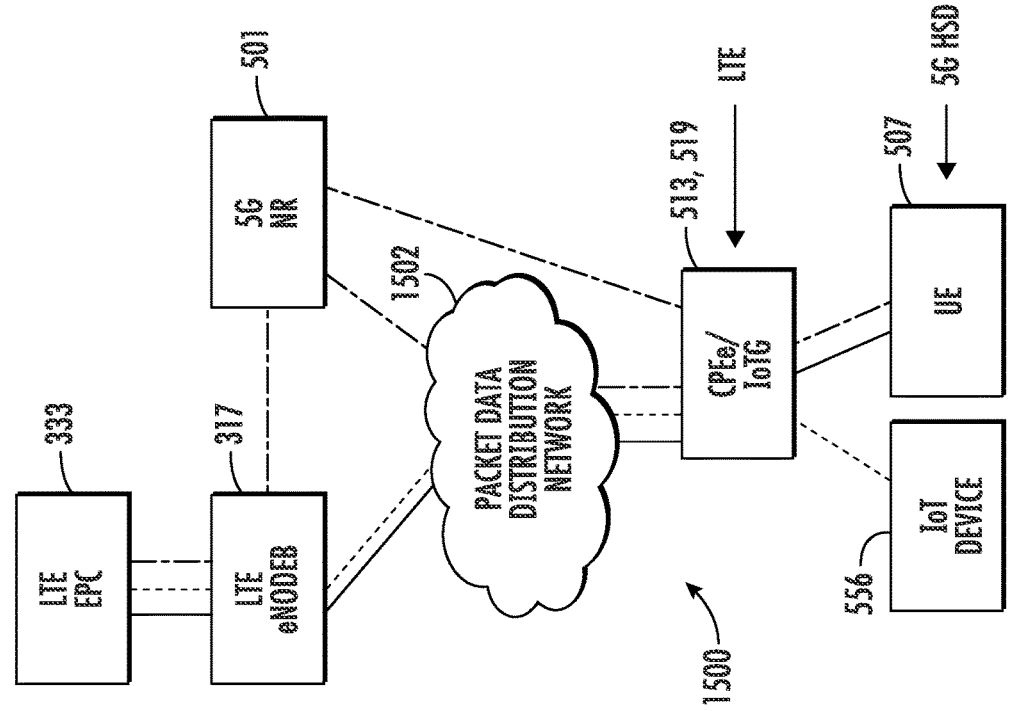

Referring to the architectures 1500, 1550 of FIGS. 15a and 15b, a narrow bandwidth channel is employed within the system that is compatible with 3GPP IoT standards (i.e. eMTC, NB-IoT), and this channel can be used for inter alia, IoT transmissions to standard IoT end devices 556. The HFC coax RF distribution network of the MSO (e.g., that of FIG. 5) serves as a "distributed antenna system" or DAS of sorts for the IoT channel, and the customer CPEe 513 and IoTG 519 (which may be separate or integrated, as in FIGS. 5a and 5b discussed above) transmits and receives the IoT RF signals on the desired RF frequency channel carried over the coaxial infrastructure of the MSO network in order to service the IoT end device(s) 556 via their respective air interfaces.

In some implementations, the coaxial RF distribution network is configured to distribute the IoT channel using the desired RF channel frequency (versus use of an intermediate frequency or IF which is then upconverted/downconverted), and the CPEe 513/IoTG 519 will not modify the IoT signal (i.e., a "pass through" configuration).

In other cases, the coaxial RF distribution network generates an intermediate frequency for distribution of the IoT channel, and the CPEe/IoTG upconverts/downconverts the IoT channel to the desired RF carrier frequency (see discussion of FIGS. 9a and 9b, and 17-21 below).

The foregoing methodologies advantageously may be applied to 3GPP LTE, 3GPP 5G NR, and non-3GPP (e.g. LoRa) IoT channels that are separate from any other channels used for eMBB and/or system control information. The 3GPP nomenclature for this configuration is "standalone" or "guardband" IoT channels.

Moreover, any number of modalities or PHYs may be used for data transmission between the IoT end device(s) 556 and the CPE. For example, the exemplary "IoT" air interface spectra (i.e., BLE and IEEE Std. 802.15.4) of FIGS. 16a and 16b and associated technologies may be employed for data exchange between the CPEe 513/IoTG 519 and the IoT device(s) 556, the latter generally consuming comparatively low data bandwidth as a general proposition.

Figure 16A:
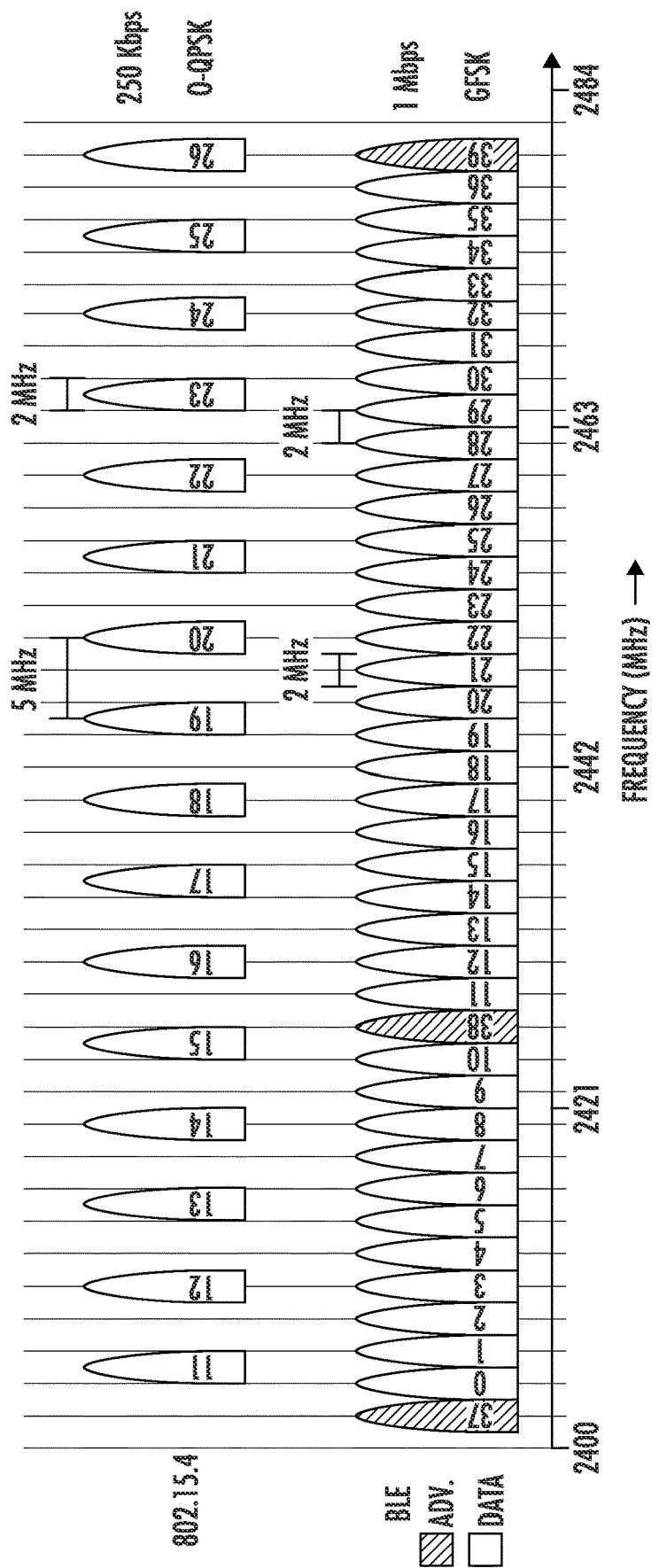
FIG. 16a is a graphical representation of frequency bands associated with prior art IEEE Std. 802.15.4 and Bluetooth Low Energy (BLE) wireless interfaces.
Figure 16B:
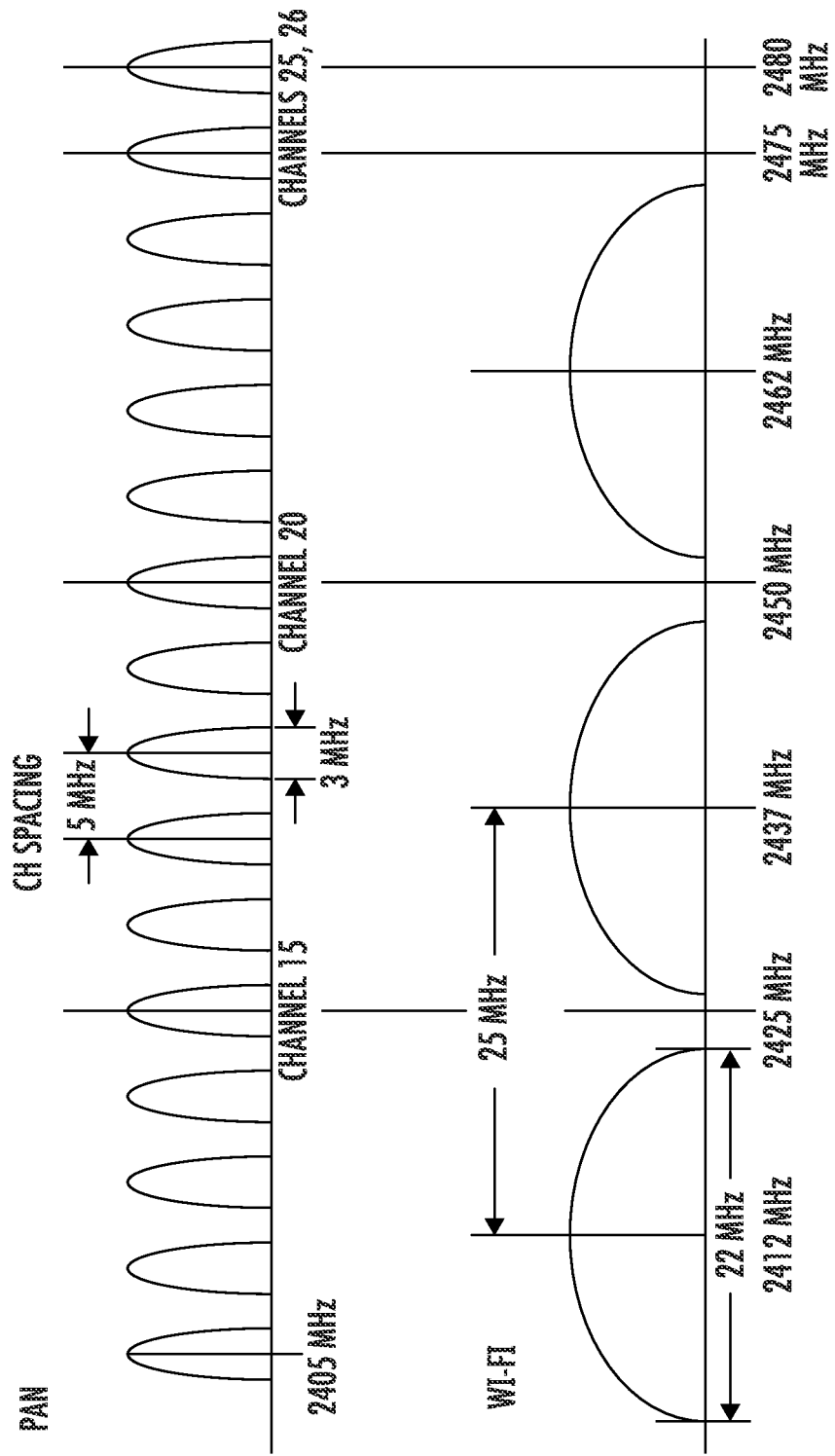
FIG. 16b is a graphical representation of frequency bands associated with prior art IEEE Std. 802.15.4 and Wi-Fi wireless interfaces.

FIG. 16a is a graphical representation of radio frequency bands associated with such IEEE Std. 802.15.4 and Bluetooth Low Energy (BLE) wireless interfaces, and their relationship. FIG. 16b shows the 5 MHz-spaced channels of 3 MHz width used by 802.15.4 in the same band(s) as IEEE Std. 802.11. Accordingly, the present disclosure contemplates use of one or more of multiple unlicensed premises air interfaces for data services to the IoT devices and the IoT devices 556 (and even the UE 507), consistent with their respective bandwidth requirements.

Figure 4:
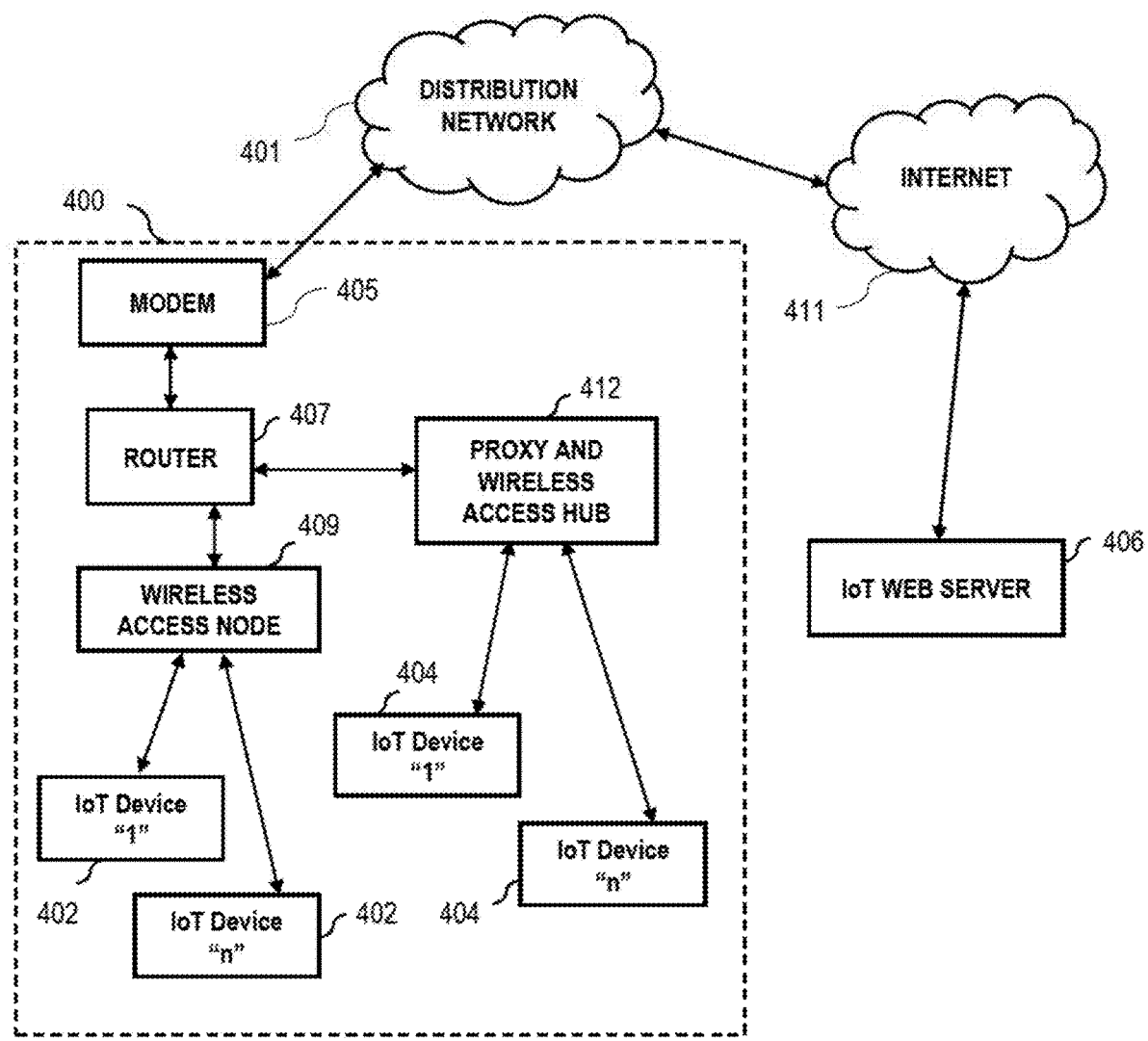
FIG. 4 is a functional block diagram of typical prior art IoT architectures for network connectivity.

It will be appreciated that while the present disclosure is cast largely in terms of delivery of 3GPP-based (4G/4.5G/5G) waveforms to the recipient CPEe 413 at the user's premises, and hence a requirement for additional processing at the premises to convert these 3GPP waveforms into waveforms compliant with other air interface standards (including those capable of consumption by IoT devices, such as IEEE Std. 802.15.4 and BLE), such as via the gateway apparatus described herein, the present disclosure also contemplates the creation of such IoT-compatible waveforms directly at the transmitting nodes (e.g., nodes 401 and 411 of FIG. 4 herein) such as via an IEEE Std. 892.15.4 or BLE chipset operative to modulate and create the waveforms for the transmitted IoT bands prior to transmission over the cable medium. Moreover, the IoT devices may be configured to use the (upconverted) received 3GPP waveforms directly in some cases.

FIG. 17 depicts a frequency domain representation of an exemplary IoT channel within the coaxial RF distribution network architecture of FIG. 5. It will be noted that while RF channels having "shoulders" are shown (indicative of energy rolloff at the edges of the band(s)), these frequency/energy profiles are merely exemplary, and other types of bands (including those with other shoulder profiles) may be used consistent with the present disclosure.

In the implementation of FIG. 17, the IoT channel bandwidth 1708 is centered at the intended carrier frequency and coexists with upstream (US) 1702 and downstream (DS) 1704, 1706 spectrum used to service the CPEe on the network. In this approach, the IoT channel 1708 can be simply radiated and received by the CPEe 513/IoTG 519 without any further processing or manipulation such as frequency upconversion/downconversion, since it is already at the target carrier frequency. The coaxial RF distribution network acts as an antenna distribution system for the IoT channel, and the CPEe as a pass-through device, as previously described.

FIG. 18 depicts another frequency domain representation that may be used consistent with the present disclosure, wherein the IoT channel 1808 occupies an otherwise unused portion of the RF distribution network (here, for example, below the US frequency band 1802), and is then frequency translated (upconverted or downconverted; in this example upconverted) to a band 1810 at the desired carrier frequency by the CPEe 513/IoTG 519 at the customer premises. Note that since the upconversion happens at the CPEe 513, there is no interference between the upconverted IoT band 1810 and the extant other bands on the HFC medium (e.g., the DS band which occupies a portion of the frequency spectrum that includes the newly upconverted IoT band 1810).

It will be recognized that in both of the above frequency domain diagrams (FIGS. 17 and 18), the IoT channel 1708, 1808 can be implemented as a 3GPP IoT channel (i.e. eMTC, NB-IoT), or may alternatively be configured according to a different IoT standard (e.g., LoRa). Moreover, aggregations of heterogeneous channel types may be used (such as where one portion of the allocated IoT bandwidth

1708, 1808 comprises a channel of the first type, and another portion a channel of second, different type). Hence, although description of use with 3GPP technology has been given with respect to the exemplary embodiments, this aspect of the disclosure is in no way limited to use with only 3GPP technologies.

Referring now to FIGS. 19a-21, yet another configuration of the frequency spectrum useful with the architecture of FIG. 5 herein is disclosed. In 3GPP LTE (and 5G NR) systems, a separate logical IoT channel can be embedded within an overall LTE (and 5G NR) channel. This is known as the "in-band" deployment scenario. The IoT channel occupies a number of physical resource blocks (PRBs) within the overall LTE channel, but is logically separate with its own set of broadcast, control, and data sub-channels.

Accordingly, such an in-band IoT channel can be employed within the system architecture 500 that is compatible with 3GPP IoT standards (i.e. eMTC, NB-IoT), and this channel can be used for IoT transmissions to standard IoT end devices such as those devices 556 in FIG. 5. The coaxial RF distribution network of FIG. 5 previously described serves as a distributed antenna system for the IoT channel and its "donor" or host channel, and the customer CPEe 513/IoTG 519 is used to transmit and receive the IoT RF signals on the desired RF frequency channel at the premises (i.e., to/from the IoT end device 556).

In some configurations, the coaxial RF distribution network will distribute the aforementioned in-band IoT channel along with its associated bearer channel (e.g., LTE channel) using the desired RF channel frequency, and the CPEe 513/IoTG 519 selectively filters the IoT signal from the associated carrier for transmission to the IoT end device 556. As such, no frequency conversion is required. This approach has the advantage of obviating the aforementioned upconversion/downconversion, but also requires the LTE or other host to coincide in frequency with the IoT carrier.

In other configurations, the coaxial RF distribution network uses an intermediate frequency (IF) for distribution, and the CPEe 513 upconverts/downconverts the selectively filtered IoT channel to the desired RF carrier frequency upon receipt over the coaxial infrastructure.

Figure 19A:
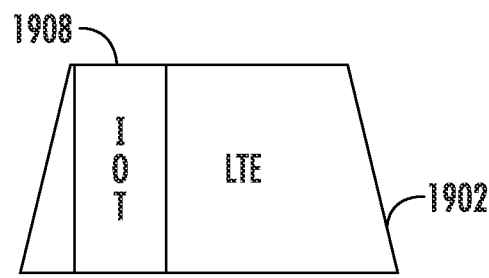
FIGS. 19a-c depict various implementations of one or more in-band IoT channels within one or more LTE channels, according to the present disclosure.
Figure 19B:
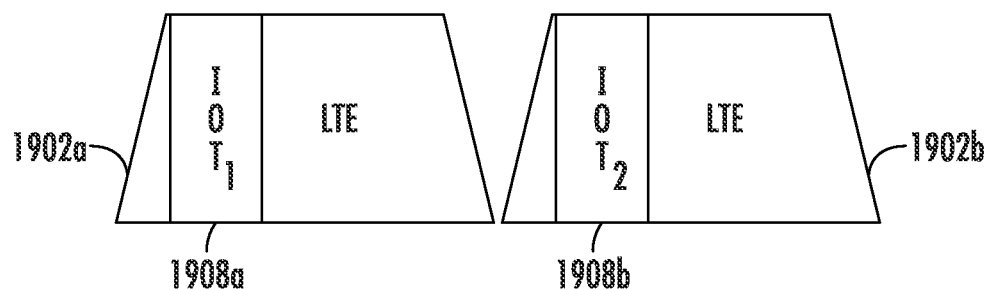
Figure 19C:
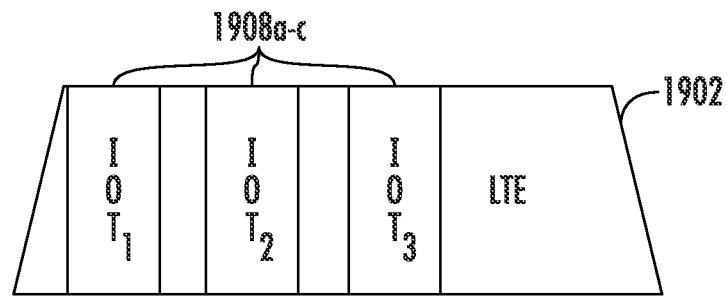

FIG. 19a depicts an exemplary in-band IoT channel 1908 within a host LTE channel 1902. The IoT channel is logically separate from the rest of the LTE channel having its own broadcast, control, and data sub-channels, as previously noted. Moreover, more than one IoT channel 1908a-c may be hosted by a given LTE/5G channel (FIG. 19c), and multiple LTE channels 1902a, 1902b (whether contiguous in frequency or not) may host separate ones or portions of a single, IoT channel 1908a, 1908b, as shown in FIG. 19b.

Figure 20:
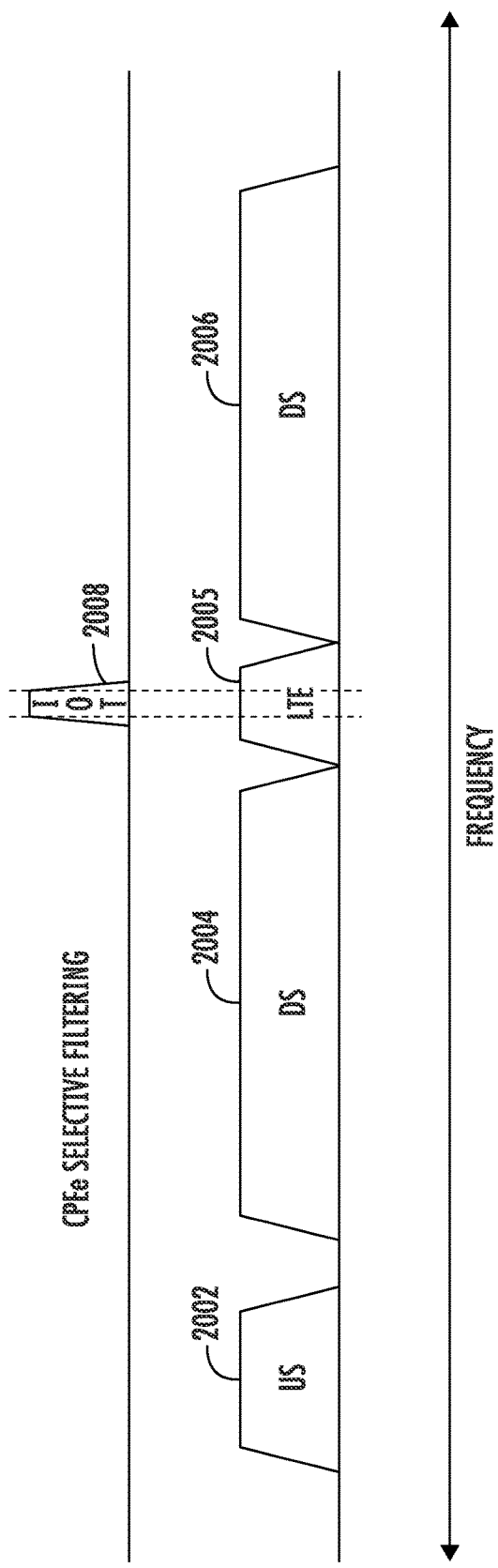
FIG. 20 depicts a frequency domain representation of an LTE channel within the coax RF distribution network.

FIG. 20 depicts a frequency domain representation of an exemplary LTE channel 2005 formed within the coaxial RF distribution network architecture 500 of FIG. 5 herein. In this case, the IoT channel 2008 exists at the intended carrier frequency, and hence can be selectively filtered (e.g., by the RF receiver or front end of the CPEe 513/IoTG 519), and then radiated to the IoT end user devices 556, and received from the devices 556 by the CPEe 513/IoTG 519, without any further processing or manipulation. As shown, the extant US band 2002, and DS bands 2004, 2006, co-exist with the LTE band 2005 on the RF coaxial bearer medium, with the IoT channel 2008 "nested" within the LTE channel.

It will also be appreciated that designation of the IoT channel bandwidth with such architectures (and in fact others herein) may also be dynamic in nature. For instance, if no IoT channel bandwidth is required (such as when no IoT devices operable on such frequencies are operational at the served premises), then the IoT bandwidth may be collapsed for at least a period of time and utilized as e.g., LTE bandwidth, or for other purposes. To the degree signaling/control/broadcast channels are required to be maintained, these can be maintained on a time-shared basis.

Figure 21:
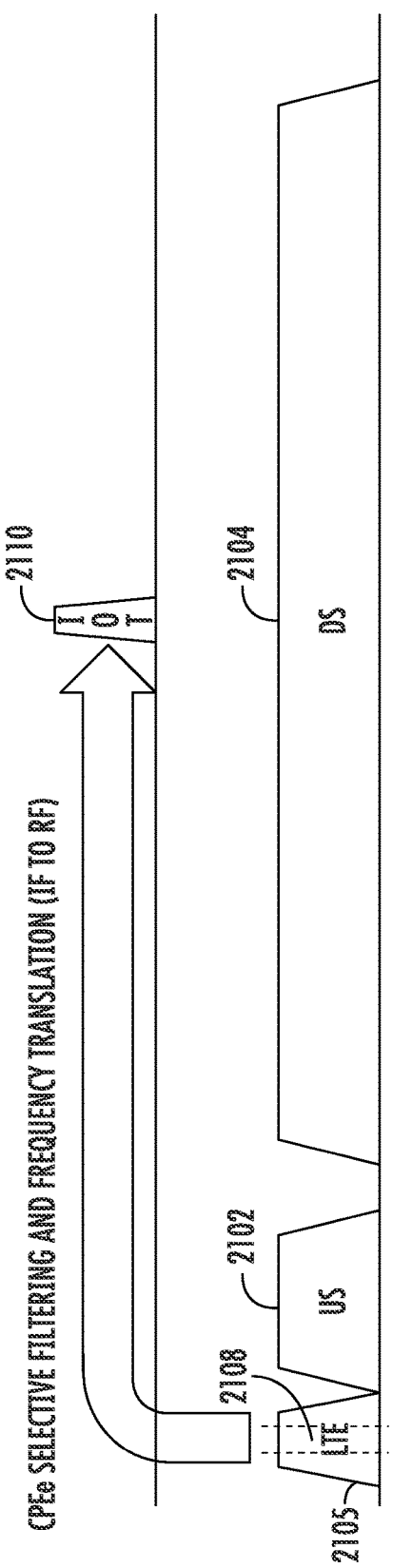
FIG. 21 depicts another frequency domain representation where the LTE channel occupies an otherwise unused portion of the RF distribution network and the IoT portion is selectively filtered and then frequency translated to the desired carrier frequency.

FIG. 21 depicts another frequency domain representation according to the present disclosure, wherein the LTE channel 2105 occupies an otherwise unused portion of the RF distribution network (here, at the lower end of the useable spectrum on the bearer medium), and the IoT portion 2108 is selectively filtered and then frequency translated to the desired carrier frequency 2110 by the CPEe 513/IoTG 519 at the customer premises.

Methods

Figure 22:
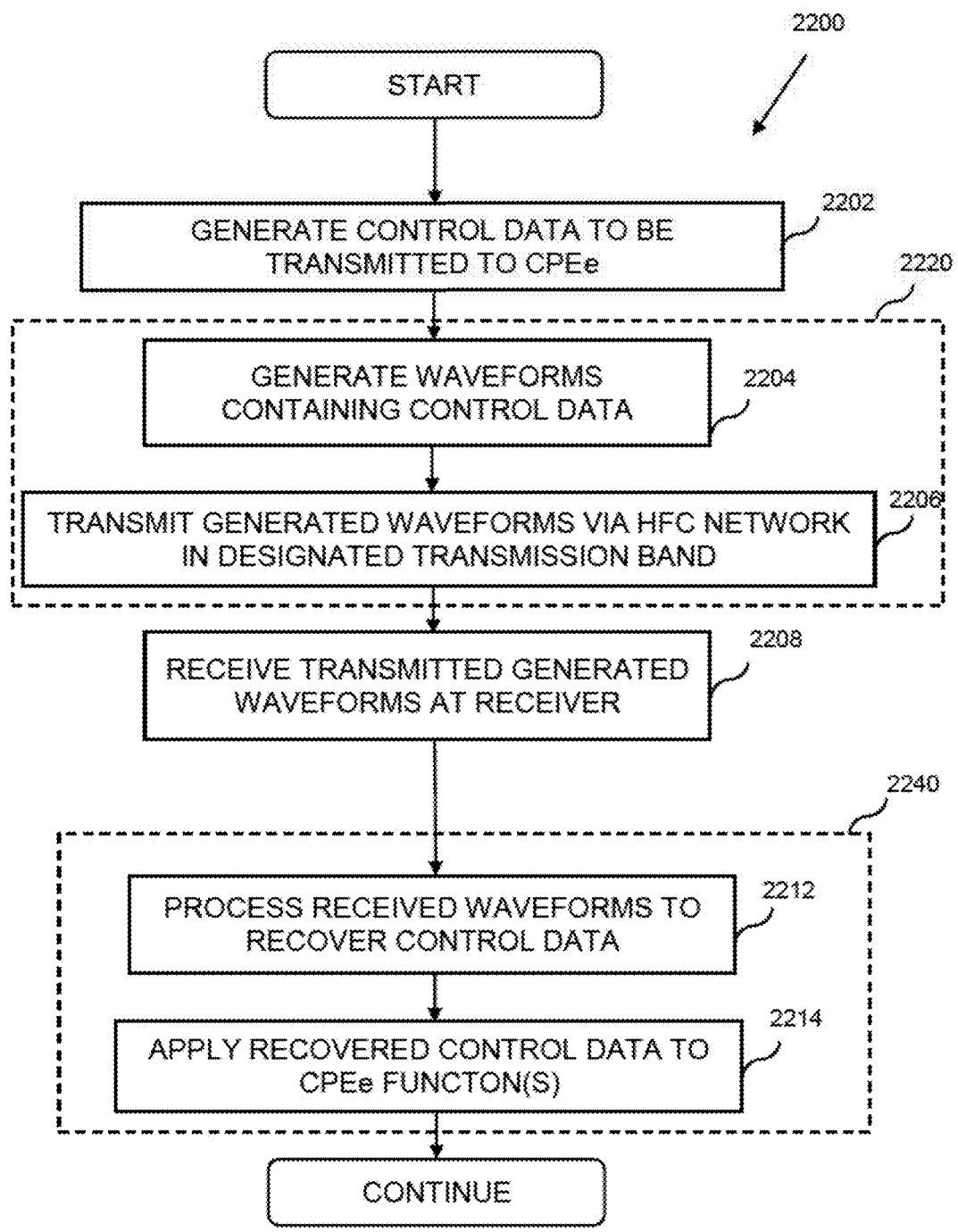
FIG. 22 is a logical flow diagram illustrating one embodiment of a generalized method of utilizing an existing network (e.g., HFC) for command and control data communication.
Figure 23:
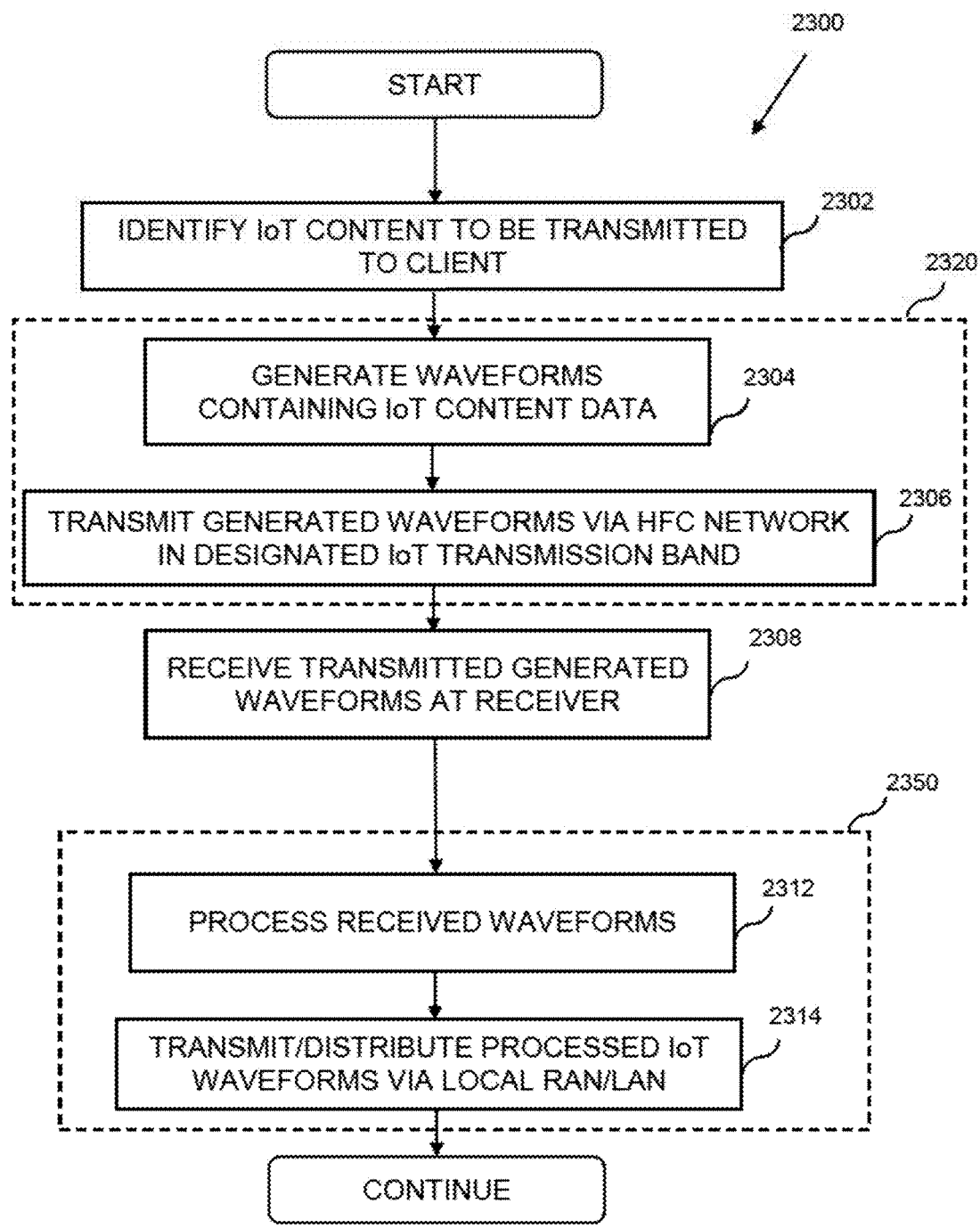
FIG. 23 is a logical flow diagram illustrating one embodiment of a generalized method of utilizing an existing network (e.g., HFC) for IoT data services to either a CPEe or IoT device endpoint, according to the present disclosure.
Figure 23A:
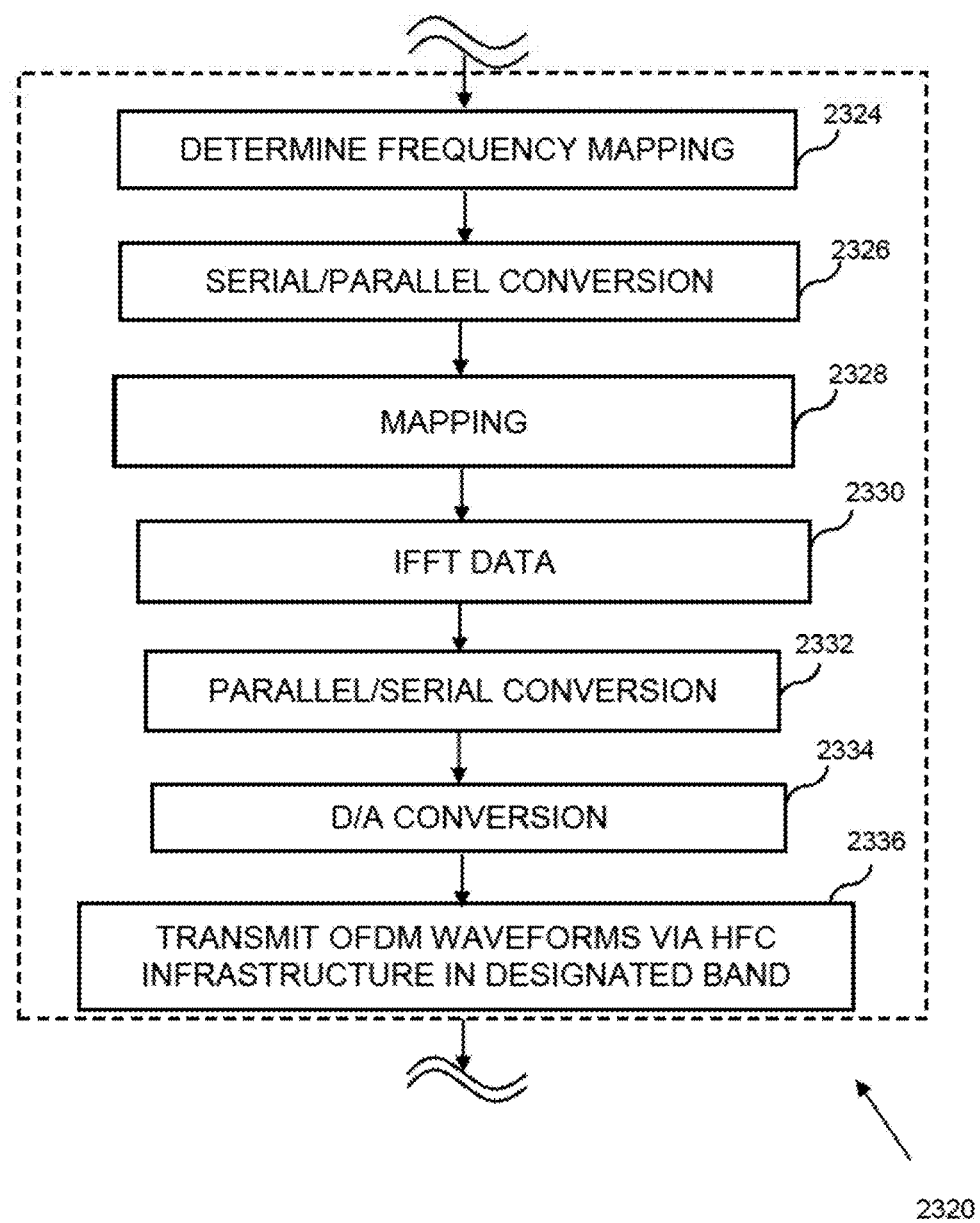
FIG. 23a is a logical flow diagram illustrating one particular implementation of waveform generation and transmission according to the generalized method of FIG. 23.
Figure 23B:
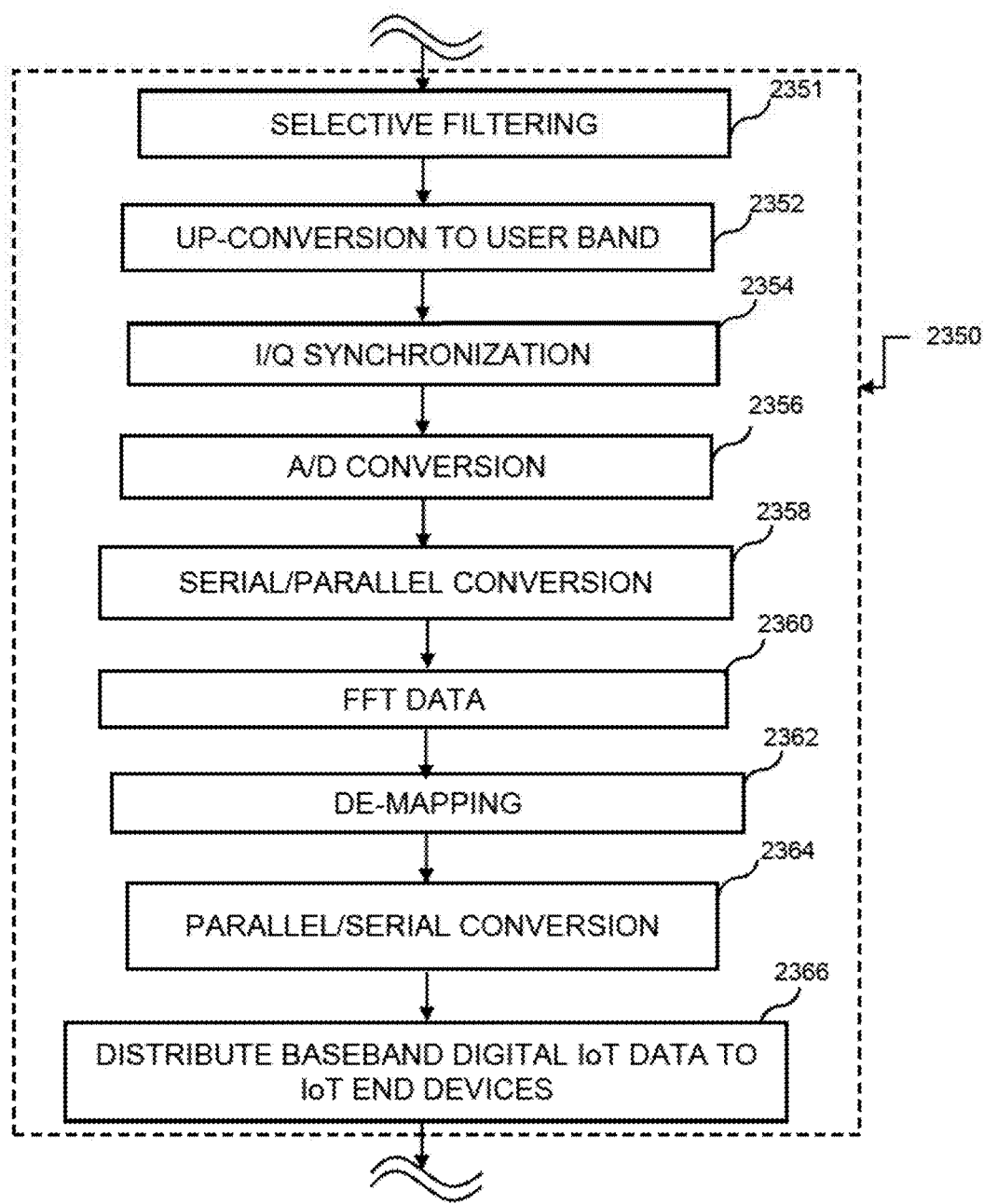
FIG. 23b is a logical flow diagram illustrating one particular implementation of content reception and digital processing by a receiver (e.g., CPEe) according to the generalized method of FIG. 23.
Figure 23C:
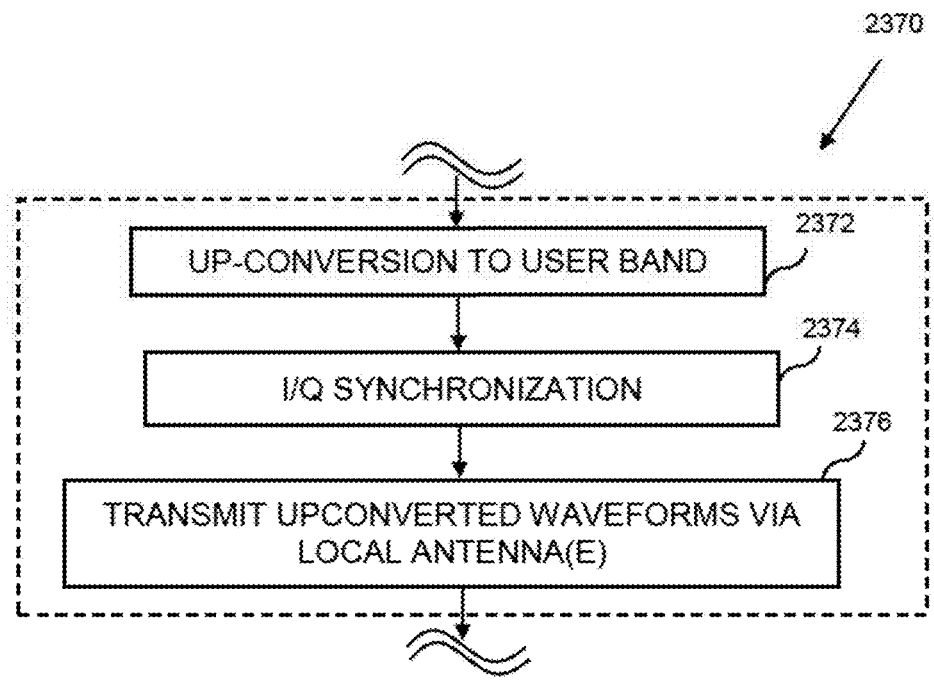
FIG. 23c is a logical flow diagram illustrating another implementation of content reception and transmission within a premises by a CPEe according to the generalized method of FIG. 23.

Referring now to FIGS. 22-23c, methods of operating the network infrastructure of, e.g., FIG. 5 herein are shown and described.

FIG. 22 is a logical flow diagram illustrating one embodiment of a generalized method 1800 of utilizing an existing network (e.g., HFC) for control data communication. As shown, the method includes first identifying or generating control data (e.g., digital data used for configuring, reconfiguring, and operating network CPEe 513, IoTG 519, or other downstream network node) to be transmitted to the recipient device or node (e.g., a target CPEe 513 or IoTG 519 in communication therewith) per step 2202. This may be performed at the enhanced CU (CUe) previously described with respect to FIGS. 6a-6f herein, or at another node or process (including one disposed further back toward the 5GC or EPC as applicable).

Next, per step 2204, the transmission node 509 generates waveforms "containing" the generated control data. As described elsewhere herein, in one embodiment, this includes generation of OFDM waveforms and time-frequency resources to carry the content data (e.g., PRBs) via one or more designated control channels, including those embedded within or using one or more LTE anchor channels. The overall waveform generation and transmission process may also include both: (i) application of frequency diversity in accordance with FIG. 8c herein, such as via allocation of MIMO Ports 0 and 1 to respective wideband TDD carriers 732 for the 5G NR or "in band" data and (ii) I-Q multiplexing onto one QPSK analog synchronization channel within the aforementioned "minor portion" 833 (FIG. 8c) from the signal generator 818 of the transceiver node 509 to the multiple inline amplifiers and CPEe 513 that may be sharing the coaxial bus.

Note that for control data (such as for control of the CPEe 413), the frequency diversity concept may still be applied, but depending on application may be unnecessary. As with 3GPP control data being sent using so-called "transmit diversity" (i.e., wherein the same control data is coded differently for transmission across two spatially separated layers, so as to provide diversity of signal reception at the user equipment (UE) and to improve the robustness of control signaling). the control data in some cases can be mapped to different frequency resources on the coaxial cable so as to provide such benefits if required.

Per step 2206, the waveforms are transmitted via the network infrastructure (e.g., coaxial cable and/or DWDM optical medium) to one or more recipient nodes. It will be appreciated that such transmission may include relay or transmission via one or more intermediary nodes, including for instance one or more N-way taps (FIG. 5), optical nodes, repeaters, etc.).

Per step 2208, the transmitted waveforms are received at the recipient node (e.g., CPEe 513 in one instance).

The waveforms are then processed to recover the transmitted control data per step 2212, and applied to the target device (e.g., CPEe 513 and/or IoTG 519) per step 2214. For instance, in one variant, the CPEe may be reconfigured via the control data to change one or more of its RF front end parameters such as MCS, frequency diversity scheme (FIG. 8c), TDD slot assignment, or to enable/disable premises data distribution functions, or even indigenous higher-layer processes on the CPEe or connected devices (e.g., to enable/disable a DCAS or other CA module, allow access to transmitted content, install software updates, etc.). The IoTG may similarly be reconfigured as to one or more of its air interfaces, multiplexing schedule/scheme (if used), use of any IoT sniffer as previously described, etc.

Figure 22A:
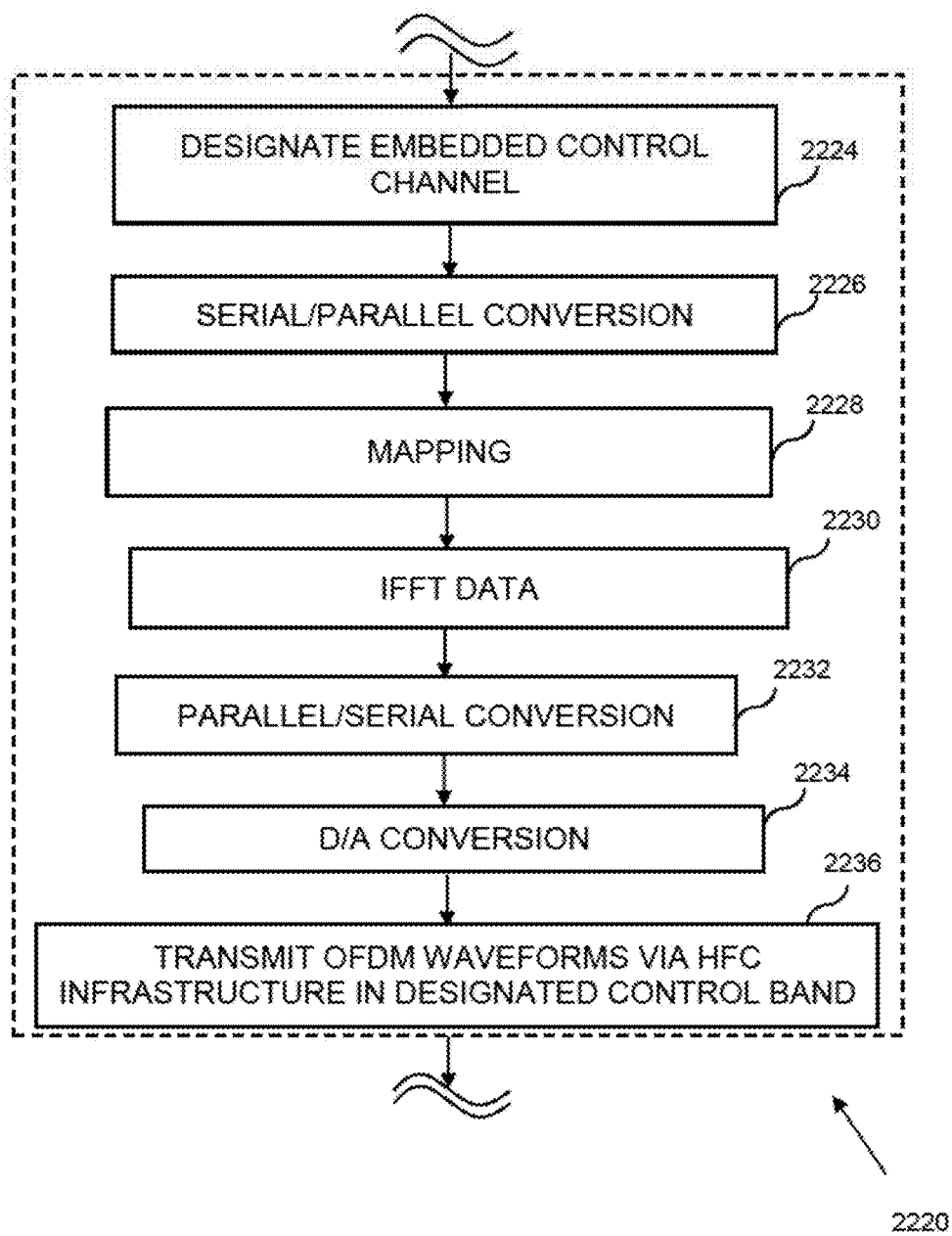
FIG. 22a is a logical flow diagram illustrating one particular implementation of waveform generation and transmission according to the generalized method of FIG. 22.

FIG. 22a is a logical flow diagram illustrating one particular implementation of control data processing and transmission methods 2220 according to the generalized method of FIG. 22. Specifically, as shown, the method 1820 includes first designating the frequency mapping plan or allocation for the control channel per step 2224. In one variant, this mapping is in accordance with the scheme shown in FIG. 17; i.e., one or more carriers are utilized within an LTE anchor band (such as one of those shown in FIG. 8c). For instance, an eMTC-type of format may be used (1.08 MHz of bandwidth within the 18 MHz LTE channel) within the LTE anchor for control data, the designated (e.g., 1.08 MHz) band disposed at a prescribed portion of the 18M MHz LTE anchor (including any guard bands as needed).

It will also be appreciated that the frequency mapping plan for the control channel may be varied on a temporal or other basis, including based on one or more TDD slots. For instance, the same mapping may be applied on two or more contiguous slots, or per individual slot. Individual mappings may be used for one or more subsets of CPEe's 513 as well, such as where the same subset of CPEe accesses the bearer medium according to a prescribed TDD schedule, and all utilize the common frequency mapping.

Likewise, IoTG TDD-based (or other) multiplexing may be used for serving the various IoTG air interfaces (and hence communicating IoT devices 556), as well as for different IoTGs (whether at the same or different premises).

A serial-to-parallel conversion of the content data is then applied per step 2226. Next, the parallelized data is mapped to its resources (step 2228), and an IFFT or other such transformation operation performed to convert the frequency-domain signals to the time domain (step 2230). The transformed (time domain) data is then re-serialized (step 2232) and converted to the analog domain (step 2234) for transmission over e.g., the RF interface such as a coaxial cable plant. In the exemplary embodiment, an LTE anchor such as that shown in FIG. 8c is used, although it will be appreciated that other frequency bands (and in fact multiple different frequency bands in various portions of the spectrum) may be used for this purpose.

Figure 22B:
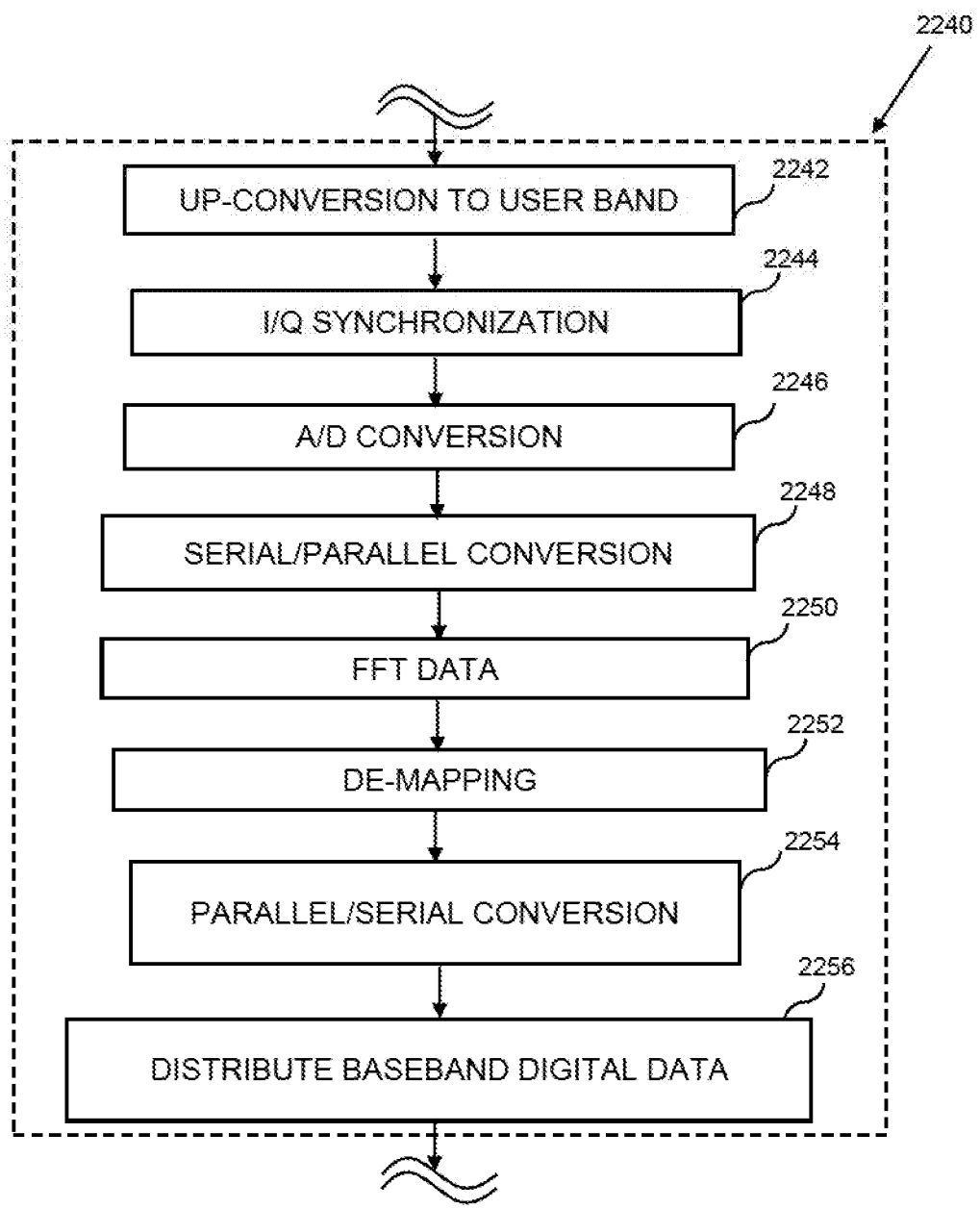
FIG. 22b is a logical flow diagram illustrating one particular implementation of content reception and digital processing by a CPEe according to the generalized method of FIG. 22.

FIG. 22b is a logical flow diagram illustrating one particular implementation of content reception and digital processing methods 2240 by a CPEe according to the generalized method of FIG. 22. In this method 2240, the CPEe 513 receives the transmitted waveforms (see step 2232 of the method 2220), and performs analog-domain upconversion to the target frequency (e.g., user band) per step 2242.

Per step 2244, the upconverted signals are synchronized via the recovered I/Q signals via the synchronization circuit of the CPEe, and the upconverted signals are converted to the digital domain for use by, e.g., the chipset 916 of the CPEe 513 (see FIG. 9a). Within the chipset, the digital domain signals are processed including inter alia serial-to-parallel conversion, FFT transformation of the data back to the frequency domain (step 2250), de-mapping of the physical resources (step 2252), parallel-to-serial conversion (step 2254), and ultimately distribution of the digital (baseband) data to e.g., the 10 GbE switch, Wi-Fi router, etc. (step 2256).

FIG. 23 is a logical flow diagram illustrating one embodiment of a generalized method 2300 of utilizing an existing network (e.g., HFC) for IoT data communication. As shown, the method includes first identifying IoT content (e.g., which may include IoT device control data, digitally rendered media, or other data) to be transmitted to the recipient device or node (e.g., a requesting IoT end device 556, or a CPEe 513 or IoTG 519 in communication therewith and acting as its proxy on the RF network) per step 2302.

Next, per step 2304, the transmission node 509 generates waveforms "containing" the identified IoT data. As described below, in one embodiment, this includes generation of OFDM waveforms and time-frequency resources to carry the content data (e.g., PRBs). As previously discussed, the waveform generation and transmission process may also include both: (i) application of frequency diversity in accordance with FIG. 8c herein, and (ii) I-Q multiplexing onto one QPSK analog synchronization channel within the aforementioned "minor portion" 833 (FIG. 8c) from the signal generator 818 of the transceiver node 509 to the multiple inline amplifiers and CPEe 513 that may be sharing the coaxial bus depending on the particular application and need for control data robustness as previously described.

Per step 2306, the waveforms are transmitted via the network infrastructure (e.g., coaxial cable and/or DWDM optical medium) to one or more recipient nodes (which as noted above may be the CPEe 513 and/or IoTG 519 (whether separate or aggregated) acting as an endpoint/proxy for the IoT end device 556, or the IoT device 556 itself acting as the endpoint if suitably equipped to receive and demodulate the transmitted OFDM signals in the transmission band.

It will also be appreciated that such transmission may include relay or transmission via one or more intermediary nodes, including for instance one or more N-way taps (FIG. 5), optical nodes, repeaters, etc.).

Per step 2308, the transmitted waveforms are received at the recipient node (e.g., CPEe 513 or IoTG 519 in one instance, or IoT end device 556 in another).

The waveforms are then processed (see discussion of FIG. 23a below) per step 2312, and transmitted per step 2314 as needed via the local (e.g., premises RAN or distribution medium such as the IoTG 519) for use by, e.g., consuming or requesting IoT end devices.

FIG. 23a is a logical flow diagram illustrating one particular implementation of IoT content processing and transmission methods 2320 according to the generalized method of FIG. 23. Specifically, as shown, the method 2320 includes first determining the frequency mapping plan or allocation for the transmission per step 2324. In one variant, this mapping is in accordance with the scheme 850 shown in FIG. 8c; i.e., a number of wideband carriers are utilized within an IF band (between $f_{lower}$ and $f_{upper}$), along with 4G/4.5G carriers and a synchronization band.

As with the control data previously described, it will also be appreciated that the frequency mapping plan for the IoT data may be varied on a temporal or other basis, including based on one or more TDD slots. For instance, the same mapping may be applied on two or more contiguous slots, or per individual slot. Individual mappings may be used for one or more subsets of CPEe's 513/IoTG 519 (and/or IoT end devices 556 acting as endpoints to terminate the IoT channel) as well, such as where the same subset of CPEe/IoT devices accesses the bearer medium according to a prescribed TDD schedule, and all utilize the common frequency mapping.

A serial-to-parallel conversion of the content data is then applied per step 2326. Next, the parallelized data is mapped to its resources (step 2328), and an IFFT or other such transformation operation performed to convert the frequency-domain signals to the time domain (step 2330). The transformed (time domain) IoT data is then re-serialized (step 2332) and converted to the analog domain (step 2334) for transmission over e.g., the RF interface such as a coaxial cable plant within the designated IoT band(s). Consistent with the exemplary embodiment, various schemes can be used (including for instance direct or pass-through transmission at the desired terminal carrier frequency, or transmission at another frequency followed by upconversion/downconversion to the desired terminal carrier), although it will be appreciated that other frequency bands (and in fact multiple different frequency bands in various portions of the spectrum) may be used for this purpose.

FIG. 23*b* is a logical flow diagram illustrating one particular implementation of content reception and digital processing methods 2350 by an exemplary receiver (e.g., CPEe 513 or IoTG 519) according to the generalized method of FIG. 23. In this exemplary method, the CPEe 513 receives the transmitted waveforms (see step 2336 of the method 2320), and first performs selective filtering of the signal band per step 2351 to isolate the IoT data band (e.g., within the host LTE anchor channel). In one variant, a bandpass filter is used to remove LTE anchor channel frequencies that are not utilized as part of the embedded IoT channel(s). For instance, the bandpass filtering may be applied in the signal path after the receipt of the waveforms from the network such that the LTE anchor channel data (i.e., that not used for IoT data transmission, but rather for maintenance and operation of the LTE user plane data/channel as required by the NSA configurations or 5G NR Option 3. Alternatively, the IoT data may occupy TDD slots within the designated embedded IoT channel(s) such that filtering need only be applied during those TDD slots, and the bandwidth used for other purposes (e.g., CPEe control data, LTE anchor channel functions, etc.) during the non-IoT allocated TDD slots. Various other schemes will be recognized by those of ordinary skill given the present disclosure.

In one particular implementation, an IoT channel which occupies a prescribed number of PRBs (e.g., either 1.08 MHz-6 PRBs, or 180 kHz-1 PRB) can be embedded within an LTE channel (e.g. 18 MHz with 100 PRBs total), and frequency domain bandpass filtering used to select the PRB(s) carrying the IoT channel.

Next, per step 2352, the receiver (e.g., CPEe) performs analog-domain upconversion to the target frequency (e.g., user band), although as noted above, direct or "passthrough" transmission may be utilized alternatively or in conjunction with upconversion (i.e., one band may be direct, and another contemporaneously require upconversion/downconversion).

Per step 2354, the upconverted signals are synchronized via the recovered I/Q signals via the synchronization circuit of the CPEe, and the upconverted signals are converted to the digital domain for use by, e.g., the chipset 916 of the CPEe 513 (see FIG. 9*a*). Within the chipset, the digital domain signals are processed including inter alia serial-to-parallel conversion, FFT transformation of the data back to the frequency domain (step 2360), de-mapping of the physical resources (step 2362), parallel-to-serial conversion (step 2364), and ultimately distribution of the digital (baseband) data to e.g., the 10 GbE switch, Wi-Fi router, BLE or IEEE Std. 802.15.4 air interface, etc. (step 2366).

FIG. 23*c* is a logical flow diagram illustrating one particular implementation of content reception and transmission within a premises by a CPEe/IoTG according to the generalized method of FIG. 23. Specifically, as shown in FIG. 23*c*, the method 2370 includes upconversion to the user band (step 2372) as in the method 2350 described above, but rather than conversion to the digital domain as in the method 2350, the upconverted analog domain signals are synchronized (step 2374) and provided to one or more repeater ports for transmission of the upconverted waveforms via the antenna(e) of the repeater module per step 2376 (see FIG. 9*a*). For example, in cases where the IoT device itself acts as the channel termination or endpoint, the received waveforms (whether as a direct pass-through, or upconversion as in the exemplary embodiment of FIG. 23*c*) can be transmitted in analog form over the local (short range) antennae of the CPEe 513 or CPEe/IoTG, in effect forming the "last mile" of the distributed antenna system afforded by the MSO HFC infrastructure.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

What is claimed is:

1. Computerized apparatus configured to use of one or more air interfaces within a premises for provision of IoT (Internet of Things) data services, the computerized apparatus comprising:

an RF (Radio Frequency) interface device configured to at least receive RF signals from a radio frequency distribution network;

processor apparatus in data communication with the RF interface device;

a plurality of radio apparatus in data communication with the processor apparatus; and storage apparatus in data communication with the processor apparatus and comprising at least one computer program, the at least one computer program comprising a plurality of instructions which are configured to, when executed by the processor apparatus, cause the computerized apparatus to:

process the received RF signals to extract data for respective ones of a plurality of IoT (Internet of Things) devices in data communication with the computerized apparatus via the plurality of radio apparatus; and utilize the respective radio apparatus to transmit the extracted data to the respective ones of the plurality of IoT devices via respective RF bands, each of the respective RF bands associated with a respective short-range communications protocol of a plurality of short-range communications protocols;

wherein the received RF signals comprise data configured according to a frequency mapping scheme that correlates one or more of the plurality of IoT devices to a respective portion of a single spectrum, the single spectrum exceeding a total bandwidth of 98 MHz.

2. The computerized apparatus of claim 1, wherein a first of the plurality of short-range communication protocols comprises an IEEE (Institute of Electrical and Electronics Engineers) Std. 802.15.4 protocol, and a second of the plurality of short-range communication protocols comprises a BLE (Bluetooth Low Energy) protocol.

3. The computerized apparatus of claim 1, wherein the radio frequency distribution network comprises a managed hybrid fiber coax (HFC) cable network, and the RF interface device is configured to interface with the managed HFC cable network via a single coaxial cable.

4. The computerized apparatus of claim 3, wherein the received RF signals comprise at least a portion of a 3GPP LTE (Long Term Evolution) anchor channel maintained as part of an NSA (Non-standalone) configuration utilized by at least the HFC cable network in delivering 5G NR (New Radio) services to the computerized apparatus via the single coaxial cable.

5. The computerized apparatus of claim 3, wherein the received RF signals comprise at least a portion of a 3GPP (Third Generation Partnership Project) 5G NR (New Radio) NB-IoT (narrowband Internet of Things) channel.

6. A computerized method for processing and transmission of data among a plurality of premises apparatus, the computerized method comprising:

detecting radio frequency (RF) signals transmitted over a wireline data network, the detected RF signals having been formed based at least on a frequency mapping scheme, the frequency mapping scheme correlating one or more of the plurality of premises apparatus to one or more corresponding portions of a prescribed frequency spectrum, the prescribed frequency spectrum comprising a total usable bandwidth of over 98 MHz;

processing the detected RF signals to obtain data from the detected RF signals, the data associated with respective ones of the plurality of premises apparatus; and transmitting the obtained data to the respective ones of the plurality of premises apparatus via respective frequency bands, each of the respective frequency bands associated with a different one of a plurality of short-range communications protocols.

7. The computerized method of claim 6, wherein the total usable bandwidth of the prescribed frequency spectrum is 1.6 GHz or greater, and each of the one or more corresponding portions of the prescribed frequency spectrum comprises a 5G NR (Fifth Generation New Radio) wideband having a bandwidth of approximately 98 MHz.

8. The computerized method of claim 6, wherein the wireline data network comprises a hybrid fiber coax (HFC), and the prescribed frequency spectrum has a bandwidth of approximately 1.6 GHz.

9. The computerized method of claim 6, further comprising converting at least a portion of the detected RF signals into a plurality of waveforms compliant with respective Personal Area Network (PAN) protocols, the respective PAN protocols comprising at least one of an IEEE (Institute of Electrical and Electronics Engineers) Std. 802.15.4 protocol or a BLE (Bluetooth Low Energy) protocol.

10. The computerized method of claim 6, wherein the detecting of RF signals from the wireline data network Generation Partnership Project) compliant waveforms transmitted by a node of a hybrid fiber coax (HFC) cable network.

11. The computerized method of claim 6, wherein the detecting the RF signals from the data services network comprises receiving waveforms from the data services network via a prescribed frequency band, the waveforms having been upconverted from a lower frequency so as to occupy the prescribed frequency band.

12. The computerized method of claim 6, wherein the prescribed frequency band comprises a frequency band within an operating range of a coaxial cable used to deliver the received waveforms to a gateway apparatus.

13. The computerized method of claim 11, wherein the plurality of premises apparatus comprises a plurality of IoT (Internet of Things) devices accessible via the gateway apparatus.

14. A non-transitory computer-readable apparatus comprising a storage medium, the storage medium comprising a plurality of instructions configured to, when executed by a processor apparatus of a computerized apparatus, cause the computerized apparatus to:

obtain radio frequency (RF) signals from a radio frequency distribution network;

obtain data from the obtained RF signals for respective ones of a plurality of premises devices in data communication with the computerized apparatus; and transmit the obtained data to the respective ones of the plurality of premises devices via respective RF bands, each of the respective RF bands associated with a respective short-range wireless communications protocol of a plurality of short-range communications protocols;

wherein the obtained RF signals have been transmitted according to a frequency mapping scheme configured to map one or more of the plurality of premises devices to the respective portions of a frequency spectrum designated for at least downstream communications within the radio frequency distribution network, the frequency spectrum comprising a total bandwidth exceeding 98 MHz.

15. The non-transitory computer-readable apparatus of claim 14, wherein at least one of the plurality of short-range wireless communication protocols comprises at least one of an IEEE (Institute of Electrical and Electronics Engineers) Std. 802.15.4 protocol, or a Bluetooth-based protocol.

16. The non-transitory computer-readable apparatus of claim 15, wherein the obtained RF signals comprise 3GPP (Third Generation Partnership Project)-based waveforms; and wherein the plurality of instructions are further configured to, when executed by the processor apparatus, cause the computerized apparatus to:
   convert the 3GPP-based waveforms to at least a second type of waveforms; and
   transmit the at least the second type of waveforms to the plurality of premises devices via one or more wireless air interfaces configured to transmit via one of the at least the IEEE Std. 802.15.4 protocol or the Bluetooth-based protocol.

17. The non-transitory computer-readable apparatus of claim 14, wherein each of the respective portions of the frequency spectrum comprises a carrier bandwidth of at most 98 MHz.

18. The non-transitory computer-readable apparatus of claim 14, wherein the transmission of the extracted data to the respective ones of the plurality of premises devices comprises enablement of modification of at least one operational aspect associated with the respective ones of the premises devices.

19. The computerized apparatus of claim 1, wherein the RF signals received from the radio frequency distribution network comprises 3GPP (Third Generation Partnership Project)-compliant signals, and the radio frequency distribution network comprises at least a portion of a hybrid fiber coax (HFC) network.

* * * * *